US00RE37603E

(19) United States
(12) Reissued Patent
Coney

(10) Patent Number: US RE37,603 E
(45) Date of Reissued Patent: Mar. 26, 2002

(54) GAS COMPRESSOR

(75) Inventor: Michael W. E. Coney, Swindon (GB)

(73) Assignee: National Power PLC, Wiltshire (GB)

(21) Appl. No.: 09/610,703

(22) PCT Filed: May 28, 1993

(86) PCT No.: PCT/GB93/01137

§ 371 Date: Nov. 29, 1994

§ 102(e) Date: Nov. 29, 1994

(87) PCT Pub. No.: WO93/24754

PCT Pub. Date: Dec. 12, 1993

Related U.S. Patent Documents

Reissue of:
(64) Patent No.: 5,771,693
Issued: Jun. 30, 1998
Appl. No.: 08/343,499
Filed: Nov. 29, 1994

(30) Foreign Application Priority Data

| | | |
|---|---|---|
| May 29, 1992 | (GB) | 9211405 |
| Jun. 29, 1992 | (GB) | 9213775 |
| Jul. 20, 1992 | (GB) | 9215404 |
| Mar. 10, 1993 | (GB) | 9304853 |

(51) Int. Cl.[7] ..... F16D 31/02; F04B 9/08
(52) U.S. Cl. ..... 60/407; 60/595; 417/381
(58) Field of Search ..... 60/407, 595; 417/380, 417/381

(56) References Cited

U.S. PATENT DOCUMENTS

| | | | | |
|---|---|---|---|---|
| 1,242,057 A | | 10/1917 | Slawter | |
| 2,280,845 A | | 4/1942 | Parker | |
| 2,659,194 A | * | 11/1953 | Huber | 60/595 |
| 2,960,818 A | * | 11/1960 | Horgen | 60/595 X |
| 2,970,433 A | | 2/1961 | Endres | |
| 3,006,146 A | | 10/1961 | Jackson | |
| 3,608,311 A | | 9/1971 | Roesel | |

(List continued on next page.)

FOREIGN PATENT DOCUMENTS

| | | |
|---|---|---|
| DE | C 38703 | 3/1887 |
| DE | C 52528 | 6/1890 |
| DE | C 357858 | 9/1922 |

(List continued on next page.)

OTHER PUBLICATIONS

Japanese Patent Abstract—vol. 8, No. 26 (M–273) (1463)—Feb. 3, 1984—Laid–Open Pub. No. JP 58–183880 (Oct. 27, 1983).

Japanese Patent Abstract—vol. 10, No. 326 (M–532) (2382) Nov. 6, 1986—Laid–Open Pub. No. JP–A–61–132727 (Jun. 20, 1986).

(List continued on next page.)

*Primary Examiner*—Hoang Nguyen

(57) ABSTRACT

A gas compressor is provided comprising a chamber (9) to contain gas to be compressed, a piston (12) and the chamber (9) and an apparatus to drive the piston into the chamber (9) to compress the gas. The compressor also comprises another apparatus (5) to form a spray of liquid in the chamber (9) to cool the gas on compression therein, so that the gas may be compressed approximately isothermally. Valve (17) are provided to allow compressed gas to be drawn from the chamber. The apparatus to drive the piston (12) comprises another apparatus to deliver driving energy stored in the fluid directly to the piston. In one embodiment, the driving energy is provided by a combustible fuel. The heat of compression is rejected at the lowest temperatures and the hot exhaust gas from the combustion process may be used to preheat the isothermally compressed gas.

8 Claims, 24 Drawing Sheets

U.S. PATENT DOCUMENTS

| | | | | |
|---|---|---|---|---|
| 3,751,905 | A | | 8/1973 | McKinley |
| 3,879,945 | A | | 4/1975 | Summers |
| 3,897,173 | A | | 7/1975 | Mandroian |
| 3,932,987 | A | | 1/1976 | Munzinger |
| 3,998,049 | A | | 12/1976 | McKinley |
| 4,148,195 | A | | 4/1979 | Gerstmann et al. |
| 4,195,481 | A | | 4/1980 | Gregory |
| 4,205,638 | A | * | 6/1980 | Vlacancinch ..... 417/380 X |
| 4,307,997 | A | | 12/1981 | Richards et al. |
| 4,326,373 | A | | 4/1982 | Giles |
| 4,415,313 | A | | 11/1983 | Bouthors et al. |
| 4,481,772 | A | * | 11/1984 | Benaroya ..... 60/595 |
| 4,492,085 | A | | 1/1985 | Stahl et al. |
| 4,569,194 | A | | 2/1986 | Giles |
| 4,700,542 | A | * | 10/1987 | Wang ..... 60/595 X |
| 4,751,814 | A | | 6/1988 | Farrell |
| 4,785,621 | A | | 11/1988 | Alderson et al. |
| 5,311,739 | A | | 5/1994 | Clark |

FOREIGN PATENT DOCUMENTS

| | | |
|---|---|---|
| DE | C 916482 | 8/1954 |
| DE | C 940683 | 3/1956 |
| DE | A 1401218 | 10/1968 |
| DE | A 2355734 | 6/1974 |
| DE | A 2506040 | 9/1976 |
| DE | A 2925091 | 1/1981 |
| DE | A 3229940 | 6/1984 |
| EP | A 0037218 | 10/1981 |
| EP | A 0043879 | 1/1982 |
| EP | A 0389036 | 9/1990 |
| FR | 474000 | 6/1914 |
| FR | A 903471 | 10/1945 |
| FR | A 1467142 | 1/1967 |
| FR | 1604037 | 6/1971 |
| GB | 18107 | 6/1914 |
| GB | A 722524 | 1/1955 |
| GB | A 2006327 | 5/1979 |
| GB | 2017223 | 10/1979 |
| RU | 13340 | 3/1930 |
| RU | 27251 | 7/1932 |
| RU | 120087 | 10/1959 |
| RU | 1550212 | 3/1990 |
| RU | 1610208 | 11/1990 |
| WO | A 8800279 | 1/1988 |
| WO | A 8805223 | 9/1988 |

OTHER PUBLICATIONS

Japanese Patent Abstract—vol. 9, No. 11 (M–351) (1734) Jan. 18, 1985—Laid–Open Pub. No. JP–A–59–160032 (Sep. 10, 1984).

Japanese Patent Abstract, vol. 011, No. 44 (M560) Feb. 10, 1987 of Laid–Open Pub. No. Jp–A–61–207862 (Sep. 16, 1986).

J. Gerstmann and W.S. HIll, "Isothermalization of Stirling Heat–Actuated Heat Pumps Using Liquid Pistons," vol. 1 of 3, 21st Intersociety Energy Conversion Engineering Conference—Advancing toward Technology Breakout in Energy Conversion, Aug. 25–29, 1986.

Richard T. Morash and Otis W. Marshall, "The Roesel Closed Cycle Heat Engine," Proceedings of the 9th Intersociety Energy Conversion Engineering Conference, Aug. 1974, paper No. 749154, pp. 1117–1124.

PCT/WIPO Published Application Abstract for Publication No. WO 93/24754, Dec. 9, 1993.

W. Rice, "Performance of Hydraulic Gas Compressors," Journal of Fluids Engineering, pp. 645–653, Dec. 1976.

D. L. Ayers, "Efficient Hydraulic Air Compression For Base Loaded Combustion Turbines," Proceedings of the American Power Conference 1991, pp. 406–412.

S.C. Kranc, "A Dynamic Model for the Humphrey Pump," Alternative Energy Sources VIII, vol. 2, pp. 281–294, Dec. 1987.

F. Du P. Thomson, "The Humphrey Gas Pump," Mechanical Engineering, Jun. 1934, pp. 337–340.

Denis Smith, "The Humphrey Pump and its Inventor," Transactions of the Newcomen Society, vol. XLIII, 1971, pp. 67–92.

Marc de Piolenc, "LES 'iced' Inlet Nets Utility Another 14 NW of Peaking at Zero Fuel Cost," Gas Turbine World, Jan.–Feb. 1992, pp. 20–25.

"Low Cost 'Air Bottoming Cycle' for Gast Turbines™,"—Engineering New and Trends—Gas Turbine World, May–Jun. 1991, p. 61.

* cited by examiner

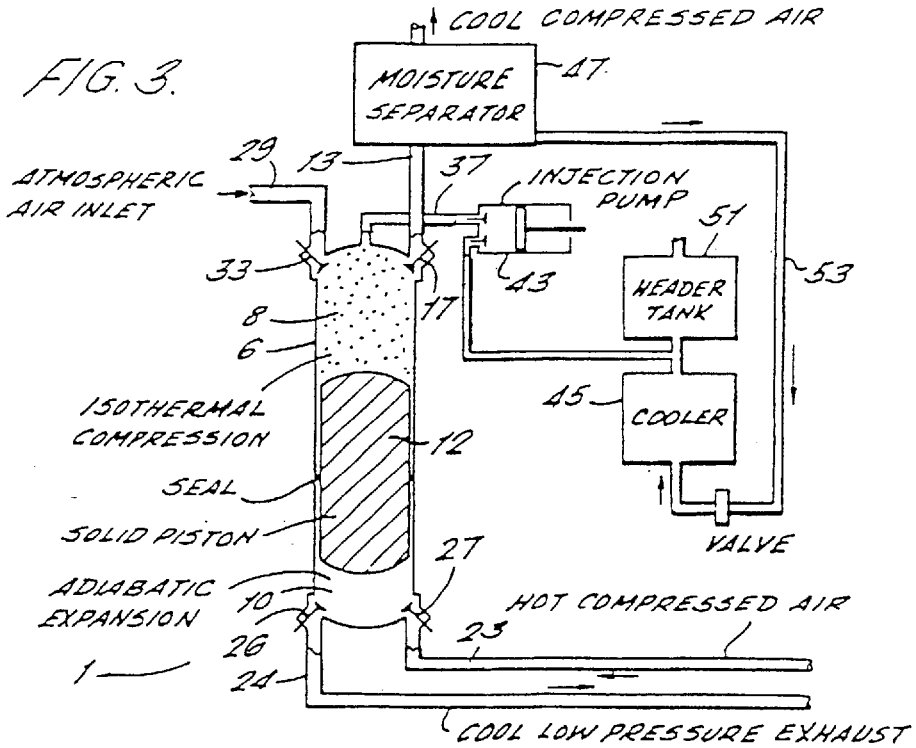
FIG. 3.
COOL COMPRESSED AIR
MOISTURE SEPARATOR
47
29
13
37
ATMOSPHERIC AIR INLET
INJECTION PUMP
51
33
43
HEADER TANK
53
8
17
6
45
ISOTHERMAL COMPRESSION
COOLER
12
SEAL
SOLID PISTON
VALVE
27
ADIABATIC EXPANSION
10
HOT COMPRESSED AIR
26
23
1
24
COOL LOW PRESSURE EXHAUST

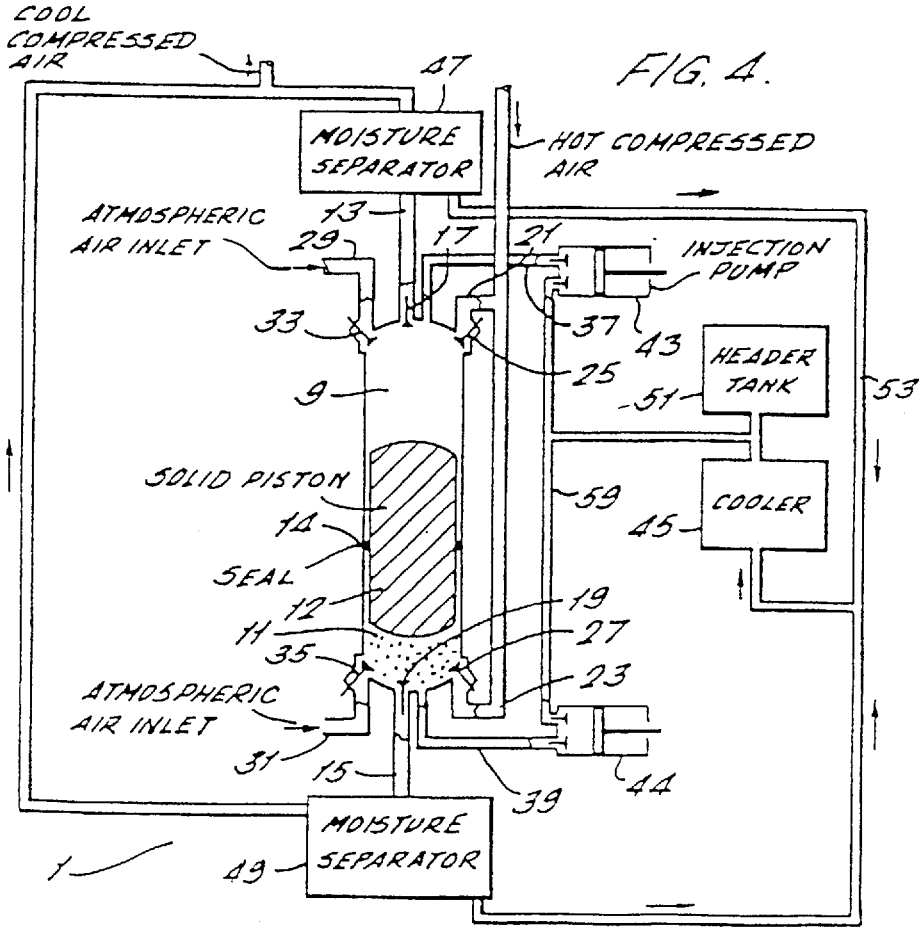
COOL COMPRESSED AIR
FIG. 4.
47
MOISTURE SEPARATOR
HOT COMPRESSED AIR
ATMOSPHERIC AIR INLET
13
29
17
21
INJECTION PUMP
33
37
43
HEADER TANK
25
9
51
53
SOLID PISTON
59
COOLER
45
14
SEAL
12
19
11
27
35
23
ATMOSPHERIC AIR INLET
31
15
44
39
MOISTURE SEPARATOR
1
49

REFRIGERATION SYSTEM
213
ICE-WATER THERMAL STORAGE TANK
215
ISOTHERMAL COMPRESSOR
203
COOLING SYSTEM
217
LARGE CAVITY FOR STORAGE OF COMPRESSED AIR
211
200
GAS-AIR HEATER
205
HOT AIR
FUEL
COMBUSTION CHAMBER
207
COMBUSTION GAS
GAS TURBINE
201
GENERATOR 50 Hz
209
COMBUSTION GAS
TO STACK

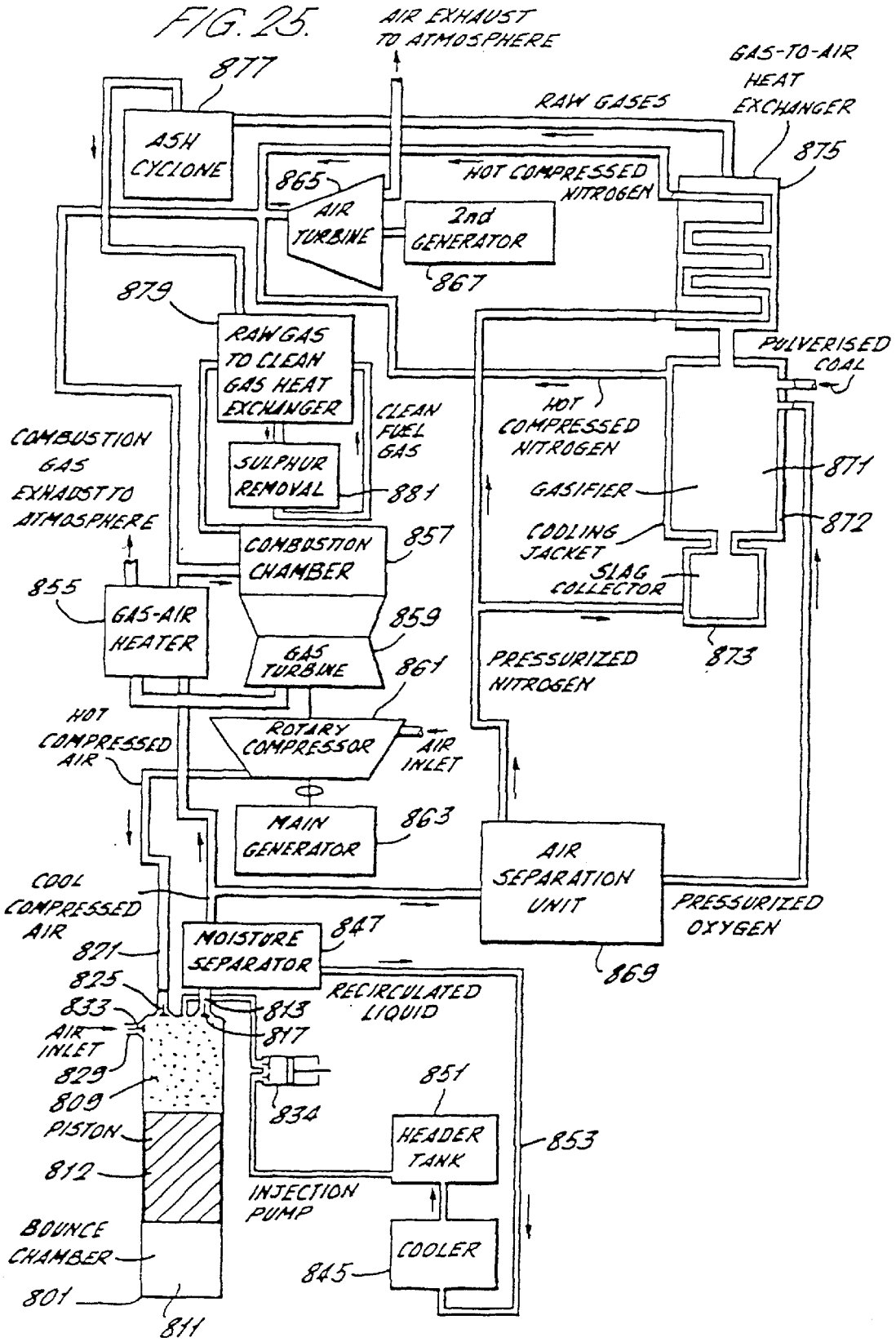
FIG. 25.
AIR EXHAUST TO ATMOSPHERE
877
ASH CYCLONE
RAW GASES
GAS-TO-AIR HEAT EXCHANGER
875
865
HOT COMPRESSED NITROGEN
AIR TURBINE
2nd GENERATOR
867
879
RAW GAS TO CLEAN GAS HEAT EXCHANGER
CLEAN FUEL GAS
SULPHUR REMOVAL
881
PULVERISED COAL
HOT COMPRESSED NITROGEN
COMBUSTION GAS EXHAUST TO ATMOSPHERE
GASIFIER
871
COOLING JACKET
872
COMBUSTION CHAMBER
857
SLAG COLLECTOR
855
GAS-AIR HEATER
859
GAS TURBINE
861
PRESSURIZED NITROGEN
873
HOT COMPRESSED AIR
ROTARY COMPRESSOR
AIR INLET
MAIN GENERATOR
863
AIR SEPARATION UNIT
COOL COMPRESSED AIR
PRESSURIZED OXYGEN
MOISTURE SEPARATOR
847
871
869
825
RECIRCULATED LIQUID
833
813
AIR INLET
817
829
851
809
834
PISTON
HEADER TANK
853
812
INJECTION PUMP
BOUNCE CHAMBER
COOLER
845
801
811

GAS COMPRESSOR

Matter enclosed in heavy brackets [ ] appears in the original patent but forms no part of this reissue specification; matter printed in italics indicates the additions made by reissue.

This invention relates to gas compressors for supplying compressed gas and in particular to compressors for supplying compressed air or other gas turbine plants for the generation of electricity.

Compressors for producing hot compressed gas, such as air for burning with fuel in the combustion chamber of a gas turbine are well known. The gas produced by the compressor is heated as it is compressed by the adiabatic nature of the compression cycle. Because the gas is heated during compression, more energy is required to achieve the desired compression than if the temperature of the gas during compression was maintained constant, i.e. if the gas was compressed isothermally. It is also generally inefficient to use the mechanical energy of the compressor to heat the body of gas being compressed.

One example of a known apparatus designed to compress gas more efficiently is the hydraulic gas compressor in which gas is compressed in a downward moving column of liquid. The gas which is in the form of bubbles is cooled by the liquid during compression. The gas is then separated from the liquid at the bottom of the column where it is conveniently stored providing a supply of cool compressed gas which may subsequently be used for power generation.

A heat engine whose operation is based on the Carnot cycle is described in U.S. Pat. No. 3,608,311. Isothermal compression of the working fluid in the cycle is achieved by spraying a liquid into the chamber containing the working fluid so that the temperature of the gas is maintained constant during compression. However, this apparatus relates to heat engines and consists of a closed cycle heat engine in which each volume of working fluid remains permanently within a respective chamber. It is not concerned with gas compressors, which supply compressed gas.

In conventional gas turbine plants the exhaust gas from the gas turbine is generally much hotter than the ambient temperature of the surrounding atmosphere so that the excess heat of the exhaust gas may be wasted unless it can be converted back into useful energy for example to generate electricity. In one particular type of gas turbine plant, the combined-cycle gas turbine and steam plant (CCGT), the excess heat in the exhaust gas from the gas turbine is converted into steam to drive a second turbine. Although the CCGT is efficient, it does require additional plant such as a heat recovery steam generator and an associated steam turbine.

According to one aspect of the present invention there is provided a gas compressor comprising a chamber to contain gas to be compressed, a piston in the chamber and means to drive the piston into the chamber to compress the gas, means to form a spray of liquid in the chamber to cool the gas on compression therein, and valve means to allow compressed gas to be drawn from the chamber, wherein said means to drive the piston comprises means to deliver driving energy stored in a fluid directly to the piston.

Thus, the invention provides a useful source of compressed gas, in which the gas temperature is controlled by the liquid spray. The heat of compression is transferred to the droplets in the spray so that during compression, the gas temperature may be controlled to remain constant or to decrease. If the temperature of the gas is held constant, the energy required for compression is much less than it is if the temperature is allowed to rise. Advantageously, the piston is driven directly by the energy stored in a fluid, which may be the energy stored in a compressed gas or a combustible fuel/air mixture or the potential energy of a liquid. This enables the isothermal compression to be driven directly from a very high temperature heat source, while heat in the system is rejected at the lowest temperatures in the cycle. The piston enables large energies released from the fluid to be very efficiently converted into compression energy of the gas, and provides the opportunity of temporarily storing the energy released from the fluid as kinetic energy in such a way that large energies can be transferred to the piston, and therefore large volumes of gas can be compressed, but the rate at which the piston moves into the chamber can be controlled by the inertia of the piston so that the compression process is as near isothermal as possible. The invention also provides the opportunity of recovering excess heat released from the fluid to preheat the isothermally compressed gas. Furthermore, because the piston is driven directly, more complex mechanical arrangements involving rotating parts such as crankshafts are not required.

In a preferred embodiment, the compressor comprises kinetic energy storage means coupled to the piston and to which sufficient kinetic energy can be imparted to enable the piston to compress the gas. Advantageously, the kinetic energy storage means may comprise a mass arranged to move in phase with the piston, and in a preferred embodiment the mass may be provided by the piston itself. Advantageously, the kinetic energy storage means may have a large inertia to control the rate of compression to allow sufficient time for the heat of compression to be transferred to the spray so that the compression is isothermal. The kinetic energy storage means may comprise a rotatably mounted mass, e.g. a fly wheel, which is coupled to the piston so that rotational energy of the mass is converted into compression energy of the gas by the piston. The rotatable mass may be arranged to reverse direction with the piston or to rotate in one direction only, independently of the direction of movement of the piston. In the former case, the piston may be mounted on a rotatable disc, movement of the piston into the chamber being along an arc produced by rotation of the disc or along a linear path, with the piston being allowed to swivel relative to the disc.

Alternatively, a rack may be connected to the piston, the rack being arranged to drive a pinion, which either provides the rotating mass or to which a rotating mass is connected. In the latter case, the piston may be coupled to the rotating mass via a crankshaft. Advantageously, the compressor may include coupling means coupled to the piston to enable power to be drawn from or supplied to the piston directly. An output drive from the piston may be used to drive, for example, valves and liquid spray injection pumps associated with the compressor and mechanical compressors, supplying hot compressed gas to drive the compressor. Power from the piston may be extracted via any suitable mechanical coupling.

In a preferred embodiment, the compressor comprises means to impart kinetic energy to the kinetic energy storage means. If the kinetic energy storage means is provided by the mass of the piston, then the means to impart may be arranged to impart kinetic energy directly to the piston. The compressor may comprise means to convert the kinetic energy used to impart movement to the piston in one direction into kinetic energy to impart movemement to the piston in the other direction. The means to convert enables, for example, kinetic energy to be imparted to the kinetic energy storage means such that the piston moves out of the compression chamber and subsequently such that the piston moves into the compression chamber to compress the gas. Alternatively, the means to convert may be used to convert some of the kinetic energy used to drive the piston into the chamber to compress the gas, to drive the piston in the other direction out of the chamber. The means to convert may include means to convert the kinetic energy used to impart movement to the piston into potential energy. For example, the kinetic energy may be converted into potential energy by arranging a mass to displace vertically on movement of the piston. This could be a separate mass or the mass could be provided by the piston itself.

In a preferred embodiment, the compressor comprises a second chamber and a second piston, each arranged such that on movement of the piston into the chamber, the second piston moves out of the second chamber. The first and second pistons may be indirectly mechanically coupled together, for example by a crankshaft. Such coupling may be adapted to preset the relative phasing of the pistons to any phase angle. Alternatively, the first and second pistons may be directly connected together and may comprise a unitary body, i.e. be formed as a single piston. The kinetic energy storage means may be provided by the mass of the second piston either alone or jointly with the mass of the first piston.

In one embodiment, the means to convert includes a body of gas contained in the second chamber. Thus, the kinetic energy stored, for example in the mass of the first and second pistons may be absorbed by the adiabatic compression of the gas in the second chamber and then allowing the relatively hot compressed gas to expand adiabatically to impart kinetic energy to the pistons in the other direction, driving the first piston into the first chamber to compress the gas therein.

In one embodiment, the gas compressor comprises containing means for containing a body of liquid and including a conduit forming the piston. The containing means may be formed as a generally U-shaped conduit with the chamber formed in one arm of the conduit and the second chamber (if there is one) formed in the other arm. Advantageously, the liquid in the liquid piston makes a perfect seal between the piston and the walls of the chamber. This form of compressor may include a piston comprising a solid material arranged in the conduit between the liquid piston and the chamber. Another piston comprising a solid material may also be arranged in the conduit on the other side of the liquid piston away from the chamber. Each of the solid pistons may have a greater density than the liquid in the liquid piston, so that, advantageously, the size of the composite piston comprising the solid and liquid components can be reduced for a given mass. Furthermore, the use of solid pistons above the liquid piston prevent direct contact between the liquid and gas and these parts of the chamber which may be relatively hot. Solid pistons also prevent interfacial disturbances at the liquid surface and the entrainment of liquid into the gas.

In another embodiment, the piston comprises a solid material and may in its construction include a number of different solid materials and may enclose, as part of its bulk mass, a liquid material. The piston and the chamber may be arranged such that movement of the piston into the chamber is in a substantially vertical plane or in a substantially horizontal plane. In the latter arrangement, low friction bearing means may be provided to support the piston to facilitate movement of the piston relative to the chamber. Advantageously, if the piston is arranged to move vertically and linearly, no bearing means may be required. Alternative arrangements in which the piston moves in other planes are also contemplated.

In one embodiment, the means to deliver driving energy comprises second valve means operable to admit hot compressed gas into the second chamber to drive the second piston out of the second chamber. Thus, if the hot compressed gas is allowed to expand adiabatically, most of the energy of the gas will be transferred to the kinetic energy storage means, which may be provided by the mass of the first and second pistons, the stored kinetic energy then being used to achieve isothermal compression of the gas in the first chamber. Since the energy released by the expansion of hot compressed gas is greater than the energy required to achieve isothermal compression of that gas, the mass of gas compressed in the first chamber can be greater than the mass of hot gas expanded in the second chamber. The kinetic energy storage means enables the energy released by the expansion of hot compressed gas to be used for isothermal compression of gas in a thermodynamically efficient way. After compression of gas in the first chamber the expanded gas in the second chamber may subsequently be compressed by driving the second piston into the second chamber. This may be achieved for example in a vertical arrangement by allowing the piston to fall under its own weight.

The compressor may include third valve means operable after compression of gas in the second chamber by movement of the piston into the second chamber, to allow compressed gas to be drawn from the second chamber. Preferably, in this embodiment, the compressor includes means to form a spray of liquid in the second chamber to cool the gas during compression. Thus, the hot compressed gas introduced into the second chamber and allowed to expand adiabatically, may subsequently be compressed isothermally. The gas compressor may further comprise fourth valve means operable after expansion in the second chamber of hot compressed gas introduced by the second valve means, to draw in additional low pressure gas before the velocity of the second piston in the direction out of the second chamber reaches zero. Thus, some of the kinetic energy imparted from the hot compressed gas is used to draw in an additional mass of gas into the second chamber before the gas is compressed.

In another embodiment, either with or without a second chamber, the means to deliver driving energy comprises further valve means operable to admit hot compressed gas into the first chamber to drive the piston out of the first chamber. In this embodiment, the same gas used to drive the piston out of the chamber in the first half of the cycle, is compressed in the chamber in the second half of the cycle. This embodiment may comprise means to convert the kinetic energy imparted by movement of the piston out of the chamber into kinetic energy to impart movement to the piston into the chamber to compress the gas. A second chamber and a second piston may be provided, the second chamber containing a body of gas which converts the kinetic energy imparted by the hot compressed gas introduced into the first chamber into kinetic energy to drive the piston back into the first chamber to compress the gas. Thus, as the second piston moves into the second chamber, the gas therein is compressed adiabatically and then subsequently expands adiabatically, driving the second piston out of the second chamber and the first piston into the first chamber. Alternatively, the compressor may comprise a second chamber having second, third and fourth valve means as mentioned above. The compressor may also include valve means, operable after expansion in the first chamber of hot compressed gas introduced by the further valve means, to draw in additional low pressure gas, before the velocity of the piston in the direction out of the chamber reaches zero.

Advantageously, if the hot compressed gas introduced alternately into the first and second chamber is expanded adiabatically, the thermal energy of the gas is conveniently converted into mechanical energy, e.g. the kinetic energy of the piston, so that an additional mass of gas can after each expansion, be admitted into each chamber as the free volume of the chamber increases. The piston then momentarily comes to rest in one of the chambers and its motion is reversed by the injection and expansion of hot compressed gas in the same chamber, driving the piston into the other chamber which compresses the gas at a much lower temperature than the initial temperature of the hot compressed gas previously introduced. Thus, a given mass of compressed gas is converted into a larger mass of compressed gas, whereby the additional mass is effectively provided by the thermal energy of the hot compressed gas introduced into the chamber.

In another embodiment, the means to deliver driving energy comprises means to provide a combustible fuel mixture in the second chamber, whereby combustion thereof imparts kinetic energy to the piston or other kinetic energy storage means. In another embodiment, the means to deliver driving energy comprises means to admit compressed gas into the second chamber and further means to form a spray of hot liquid to heat the gas in the second chamber. Alternatively, the means to deliver driving energy comprises means to admit a gas producing medium together with a reaction gas for gasification into the second chamber. In each of these embodiments the means to deliver driving energy may further include means to feed compressed gas from the first chamber into the second chamber. Advantageously, heat exchanger means may be arranged to preheat cool compressed gas from the first chamber with hot expanded gas from the second chamber. Some of the preheated compressed gas leaving the heat exchanger may be used to drive a gas turbine. Use of some of the cool compressed gas to drive a turbine is particularly beneficial, if more heat is available in the hot expanded gas leaving the second chamber than is needed to preheat the volume of cool compressed gas required to drive the compressor. The compressor may be designed to produce additional cool compressed gas to recover this excess heat. In this way, the surplus heat may be recovered so that it can be converted into useful power.

The compressor may comprise a third chamber to contain gas to be compressed and a third piston to compress the gas by movement of the third piston into the third chamber and include further valve means to allow compressed gas to be drawn from the third chamber. The third chamber and third piston may be arranged such that when the second piston moves out of the second chamber, the third piston moves into the third chamber. Thus, the processes which drive the second piston out of the second chamber may be used to drive the compression of gas in the third chamber. Where the compressor comprises a U-shaped conduit containing a liquid piston forming the first and second pistons, the third piston may be formed by, for example arranging the third chamber in the same arm of the conduit as the first chamber. A piston comprising a solid material may be arranged between the third piston and the third chamber. If a solid piston is also provided above the liquid piston in the first chamber, the solid pistons may be arranged to move independently of one another or connected together and, for example may comprise a unitary body. Where the first, second and third pistons all comprise a solid material, the pistons may be effectively formed as a unitary body and collectively serve to provide the kinetic energy storage means. The gas in the third chamber may be compressed adiabatically and the compressed gas may be used to drive a gas turbine. If a separate gas turbine is used to recover excess heat in the hot expanded gas from a process in the second chamber, exhaust gas from the separate turbine (which may be still relatively hot) may be used to preheat some of the cold compressed gas from the first chamber, for example in a heat exchanger, and this preheated compressed gas may be used to drive the gas turbine driven by adiabatically compressed gas from the third chamber. Alternatively, adiabatically compressed gas from the third chamber and preheated compressed gas used to recover excess heat from the exhaust gas, may both be directed to a single turbine, thereby advantageously avoiding the need for more than one turbine.

In an alternative arrangement, the second chamber and second piston may each be arranged such that on movement of the first and third pistons into a respective chamber, the second piston moves into the second chamber. A process in the second chamber then drives the first, second and third pistons out of their respective chambers imparting kinetic energy to the kinetic energy storage means, which may advantageously be the combined mass of the pistons. Means to convert the kinetic energy into kinetic energy to drive the pistons back into their respective chambers is provided and may comprise an adiabatic compression/expansion chamber, containing a body of gas, and an associated piston coupled to the other pistons so that on movement of the second piston out of the second chamber, the further piston moves into the adiabatic/expansion chamber.

In another embodiment, the second chamber and second piston are each arranged such that on movement of the first and third pistons into their respective chambers, the second piston moves out of the second chamber. The gas compressor may comprise a fourth chamber and a fourth piston each arranged such that on movement of the second piston into the second chamber, the fourth piston moves out of the fourth chamber. In addition to driving energy being delivered by a process in the second chamber to drive the first and third pistons into their respective chambers to compress the gas therein, a process including any of those mentioned above in connection with the second chamber may be arranged to occur in the fourth chamber to drive the second piston back into the second chamber, and consequently the first and third pistons out of their respective chambers.

The gas compressor may further comprise a fifth piston and a fifth chamber to contain gas to be compressed by movement of the fifth piston into the fifth chamber, the fifth piston and fifth chamber being arranged such that on movement of the second piston into the second chamber, the fifth piston moves into the fifth chamber and the compressor includes further valve means to allow compressed gas to be drawn from the fifth chamber. The fifth chamber may be used to compress gas adiabatically which may be subsequently used to drive a gas turbine which may be the same gas turbine driven by adiabatically compressed gas from the third chamber. The adiabatic compression in the fifth chamber is driven by a process in the fourth chamber.

Further, the compressor may comprise a sixth piston and a sixth chamber to contain gas to be compressed by movement of the sixth piston into the sixth chamber, the sixth piston and sixth chamber being arranged such that on movement of the second piston into the second chamber, the sixth piston moves into the sixth chamber, and the compressor comprises further means to form a spray of liquid in the sixth chamber to cool the gas on compression therein and further valve means to allow compressed gas to be drawn from the sixth chamber. The sixth chamber thus provides a second isothermal compression chamber to produce cool compressed gas. The isothermal compression in the sixth chamber is also driven by the process in the fourth chamber. Thus, in this form of the compressor, a process in the second chamber drives the isothermal and adiabatic compression processes in the first and third chamber, respectively, during one half of the cycle, and a process in the fourth chamber drives the adiabatic and isothermal compression processes in the fifth and sixth chambers, respectively, in the other half of the cycle. The means to deliver driving energy may further include means to feed compressed gas from the sixth chamber into the second and/or fourth chamber and may further include heat exchanger means to preheat compressed gas from the sixth chamber with gas from the second and/or fourth chamber. The heat exchanger means may comprise the same heat exchanger means arranged to preheat compressed gas from the first chamber with gas from the second chamber. Heat which is not required to preheat the cool compressed gas from the sixth chamber required to drive the process in the second and/or fourth chamber may be recovered by passing additional cool compressed gas from the first and/or sixth chambers through the heat exchanger means, whereupon the excess heat is used to preheat the additional compressed gas and then this gas may be used to drive a gas turbine. In any of the above embodiments, any two or more of the pistons may be arranged in tandem and for example, inter-connected by one or more sealed shafts passing from one chamber to the next. Alternatively, any two or more of the pistons may be spaced laterally relative to their direction of motion into and out of their respective chambers.

Where hot compressed gas is used to drive the compressor, the gas may be provided by a conventional mechanical compressor, or from cool compressed gas produced in the isothermal compressor itself which is then preheated with hot expanded gas from the second and/or fourth chambers by means of a heat exchanger, and which is then heated further in a main heater by for example combustion of fuel. In general, the resulting hot compressed gas will be at a much higher temperature than the gas produced by a mechanical compressor. The very hot compressed gas is then introduced into the second and/or fourth chamber in which it expands to drive the compressor. Advantageously, the hot compressed gas introduced into the second and/or fourth chamber drives the compressor by simple adiabatic expansion and is therefore a much cleaner process than either combustion or gasification.

In another embodiment, the compressor may comprise in addition to a first chamber and a second chamber, if there is one, a further chamber to contain gas to be compressed, a further piston to compress the gas by movement of the further piston into the further chamber, valve means to allow compressed gas to be drawn from the further chamber and means to feed compressed gas from the further chamber to the first and/or second chamber. The further piston is independent of the first piston and the compressor may comprise second kinetic energy storage means coupled to the further piston, and to which sufficient kinetic energy can be imparted to enable the further piston to compress the gas in the further chamber. The second kinetic energy storage means may comprise a mass arranged to move in phase with the further piston and the mass may conveniently be provided by the further piston. The gas contained in the further chamber is compressed adiabatically and may used to drive the isothermal compression process in the first chamber and the second chamber (if there is one). Adiabatically compressed gas may also be used to drive a gas turbine.

This form of the compressor may further comprise means to impart kinetic energy to the second kinetic energy storage means and may also comprise means to convert the kinetic energy used to impart movement to the further piston in one direction into kinetic energy to impart movement to the further piston in the other direction. The means to convert may include means to convert kinetic energy used to impart movement to the piston into potential energy, for example by providing a mass arranged displaced vertically on movement of the further piston, which may be provided by the mass of the further piston itself.

The compressor may also comprise a fourth chamber and a fourth piston each arranged such that on movement of the further piston into the further chamber, the fourth piston moves out of the fourth chamber, and the further and fourth pistons together may comprise a unitary body. Although in this embodiment there may not be a second chamber and a second piston the fourth chamber and fourth piston are so termed for the purpose of distinguishing one chamber and piston from another. The means to convert the kinetic energy used to impart movement to the further piston may include a body of gas contained in the fourth chamber, which is alternately compressed and allowed to expand adiabatically, to drive the further piston into the further chamber to compress the gas. This is particularly advantageous where the means to impart kinetic energy to the second kinetic energy storage means comprises a process in the further chamber. For example, the means to deliver driving energy to the further piston and impart kinetic energy to the second kinetic energy storage means may comprise means to provide a combustible fuel mixture in the further chamber, whereby combustion thereof imparts the kinetic energy. Alternatively, the means to impart kinetic energy to the second kinetic energy storage means may comprise means to admit compressed gas into the further chamber and further means forming a spray of hot liquid to heat the gas in the further chamber. In another embodiment, the means to deliver driving energy to the further piston comprises means to admit a gas producing medium together with a reaction gas for gasification into the further chamber and in another embodiment the means to deliver driving energy to the further piston may comprise valve means operable to admit hot compressed gas into the further chamber. Thus, in any of the above embodiments, the adiabatic compression in the further chamber is driven by a process which takes place in the same chamber. As a result of the process, hot gas in the further chamber expands and drives the further piston out of the further chamber. Valve means, operable after expansion of gas in the further chamber, may be provided to draw gas into the chamber which is subsequently to be compressed adiabatically. The valve means may be positioned so that the gas is drawn in directly above the piston. In this embodiment, the compressor further comprises valve means operable after induction of gas into the further chamber, to allow the hot expanded gas to be expelled from the chamber on movement of the piston into the further chamber. The valve means is operable, after expulsion of hot expanded gas from the chamber, to close to allow the gas drawn into the chamber after the expansion process to be compressed. The kinetic energy imparted to the second kinetic energy storage means by the process in the further chamber may be converted into kinetic energy to impart movement to the further piston into the further chamber by adiabatic compression and expansion of gas in the fourth chamber.

In another embodiment, the fourth chamber may incorporate any of the features described above in relation to the further chamber, so that a process in the fourth chamber drives the adiabatic compression in the further chamber and the process in the further chamber drives adiabatic compression in the fourth chamber. Advantageously, this embodiment produces adiabatically compressed gas twice during one complete operating cycle. The separation of the gas to be compressed adiabatically and the process gas in the further chamber and the fourth chamber is effected by natural thermal stratification.

In another embodiment, adiabatic compression and a process to drive the adiabatic compression may take place in separate chambers. Thus, adiabatic compression only may take place in the further chamber and the process to drive the adiabatic compression may take place in the fourth chamber.

In another embodiment, the fourth chamber and the fourth piston may each be arranged such that on movement of the further piston into the further chamber, the fourth piston moves into the fourth chamber. Henceforth, the further piston and further chamber will be referred to as the third piston and third chamber, respectively, although there may not be a second piston and a second chamber. Likewise, the terms fourth, fifth and sixth distinguish one piston or chamber from another although there may not be a second chamber. The compressor may further comprise a fifth chamber and a fifth piston, each arranged such that on movement of the third piston into the third chamber, the fifth piston moves out of the fifth chamber. In this embodiment, means to impart kinetic energy to the second kinetic energy storage means may comprise a process in the fourth chamber which drives the fifth piston into the fifth chamber. The fifth chamber may contain a body of gas which converts the kinetic energy into kinetic energy to impart movement to the fifth piston so as to drive the third piston into the third chamber to compress the gas contained therein.

In another embodiment, the gas compressor may comprise means to provide a process in the fifth chamber so as as impart kinetic energy to the second kinetic energy storage means, thereby to drive the further piston into the further chamber to compress the gas therein. Thus, the means to impart kinetic energy to the second kinetic energy storage means may comprise means to provide a combustible fuel mixture in the fifth chamber, whereby combustion thereof imparts the kinetic energy. Alternatively, the kinetic energy storage means may comprise means to admit compressed gas into the fifth chamber and further means to form a spray of hot liquid to heat the gas in the fifth chamber. In another embodiment, the means to impart kinetic energy to the second kinetic energy storage means may comprise means to admit a gas producing medium together with a reaction gas for gasification into the fifth chamber. In another embodiment, the means to impart kinetic energy to the second kinetic energy storage means may comprise valve means operable to admit hot compressed gas into the fifth chamber.

The gas compressor may further comprise a sixth chamber to contain gas to be compressed, a sixth piston arranged with the sixth chamber such that on movement of the fifth piston into the fifth chamber, the sixth piston moves into the sixth chamber and may further include valve means to allow compressed gas to be drawn from the sixth chamber. Thus, in this embodiment, adiabatic compression is performed in two chambers and the process to drive the compression is performed in two other chambers. The process in the fifth chamber drives the compression in the third chamber and the process in the fourth chamber drives the adiabatic compression in the sixth chamber. Thus, advantageously, the adiabatically compressed gas is kept completely separate from the process gas. Furthermore, this embodiment is symmetric and produces adiabatically compressed gas twice per cycle. The adiabatically compressed gas from each of the third chamber and sixth chamber may be used to drive the isothermal compression in the first chamber (and second chamber if any) and may also be used to drive a gas turbine.

In a preferred embodiment, the means to impart kinetic energy to the second kinetic energy storage means further comprises means to feed compressed from the first and/or second chamber to the third, fourth or fifth chambers, as required, to drive a process therein. Preferably, heat exchanger means are provided to preheat compressed gas from the first and/or second chamber with heat from the hot expanded process gas leaving any one of the third, fourth or fifth chambers.

In another embodiment of the compressor, energy required for isothermal compression may be provided by a reservoir of liquid. One form of a liquid driven gas compressor comprises a conduit and a further piston arranged within and to move along the conduit and to drive the first piston into the first chamber to compress the gas therein. A reservoir for containing liquid is connected at one end of the conduit and the compressor further includes a main flow valve operable to control flow of liquid from the reservoir into the conduit to drive the further piston along the conduit, and discharge valve means operable, after compression of gas in the first chamber, to allow liquid to discharge from the conduit. The further piston may comprise a liquid or solid piston or a combination of both and may be formed integrally with the first piston. The compressor may comprise a plurality of chambers to contain gas to be compressed and pistons to compress the gas in each chamber, each of the pistons driven independently by an associated further piston, each of which is driven along a separate conduit one end of which is connected to a common reservoir. Preferably, the compressor includes means to return liquid discharged through the or each valve discharge means to the reservoir and the means to return may comprise a pump. Where the compressor comprises a plurality of conduits and associated pistons driving compression processes in a plurality of chambers, the main flow valves and discharge valves may be timed to operate so that liquid is being returned to the reservoir at the same time as liquid is being discharged therefrom so that the inventory of the reservoir is maintained substantially constant. In a preferred embodiment, the compressor further comprises means to pressurize the liquid in the reservoir. The reservoir may comprise a chamber enclosing a body of pressurized gas above the liquid. Where the means to return liquid to the reservoir comprises a pump, it will be appreciated that by arranging the main flow valve means in each conduit to control the pistons to operate out of phase, the pump can operate continuously and at optimum efficiency, since it is required to continuously supply liquid to the reservoir.

Conveniently, where the compressor comprises a liquid piston, the compressor may include means to supply the or each spray forming means with liquid from the liquid piston as liquid in the spray.

Preferably, the compressor includes cooling means for cooling the liquid used in the spray. The compressor preferably also includes means for controlling the size of droplet in the spray. The spray forming means may include a pump timed to operate only while gas in the or each chamber is being compressed. The spray forming means is preferably arranged to provide a spray of constant flow rate while gas in the or each chamber is being compressed and the spray forming means may include a positive displacement pump.

One embodiment may include means to mechanically couple a piston to the spray pump. Advantageously, such mechanical coupling may facilitate the timing of spray liquid injection and allow transfer of mechanical power from the piston to the pump and vice versa. The mechanical coupling may comprise for example a crankshaft driven by the piston or a rack, connected to the piston and arranged to drive a pinion. Rotation of the crankshaft or pinion may be used to drive a rotary pump or may be translated into reciprocating motion to drive a reciprocating pump. In some embodiments spray liquid is expelled from the compression chamber with the compressed gas. Such liquid is at a relatively high pressure, and may be, for part of the cycle at a higher pressure than is required to inject the spray liquid into the chamber. In this case, the pump may produce positive power, which may be used to drive the piston. Alternatively, the compressor may be designed without a mechanical pump, the pressure for injecting the spray being provided by the piston itself. Alternatively, the pump may be driven electrically or by some other means. If the pump provides a net power output, then it may be appropriate to connect the pump to drive a generator.

In a preferred embodiment, the compressor includes means to extract liquid from the compressed gas drawn from the or each chamber, if any, and may comprise a moisture separator. Preferably, the compressor also includes means to feed liquid from the means to extract to the or each spray forming means. Thus, advantageously the spray liquid recovered after isothermal compression (or in some embodiments after isothermal expansion) is continuously recycled.

The compressor may include means for controlling any one or more of the valve means to open or to close depending on any one or more of a number of parameters such as the position of the piston in a respective chamber, the pressure of gas in one of the chambers, time dependency or when a predetermined mass or volume of gas has either left or entered a chamber. Such parameters may be measured or detected by sensors, which provide corresponding output signals used to control the valves, for example, hydraulically, electromagentically and/or mechanically. The sensor or sensors may be for example electromagnetic, inductive, capacitive, electrical contact, ultrasonic or piezoelectric. A microprocessor or other type of computer may be arranged to process and interpret output signals from the sensor(s).

In one embodiment, one or more of the valve means may be mechanically coupled to one or more pistons, so that the piston drives the valve means to open and/or to close. An appropriate mechanical coupling may be provided by a rack connected to the piston arranged to drive a pinion mounted, for example, on the wall or base of the chamber. The pinion may be arranged to rotate a cam or drive a camshaft which opens and/or closes one or more valves at the appropriate time.

Where the compressor includes a liquid piston, a float of solid material may be arranged to float on the surface of the liquid piston in at least one of the chambers. The float may be either rigid or flexible and is effective to suppress turbulance at the surface of the piston and entrainment of liquid into the gas above the liquid piston, both of which are potential loss mechanisms. Advantageously, the float may be made of porous material to facilitate the spray liquid to combine with the liquid in the liquid piston.

In some circumstances, cooling of the chamber walls is desirable, depending on the heat generated by the various processes occurring in the chambers. The chamber walls may be cooled by cool compressed gas from one or more of the isothermal compression chambers. The chamber walls, may have a plurality of holes formed therein so that the cooling gas, after taking up heat from the chamber walls, may pass into the chamber and expand with the other expanding gas in the chamber. Alternatively, the heated compressed cooling gas may be passed to and expanded in a turbine. Advantageously, either method enables excess heat to be recovered from the chamber walls in such a way as to be convertable into useful mechanical power.

Where the compressor includes heat exchanger means to cool the exhaust gas from a process in one of the chambers with cool compressed gas from the isothermal compression chamber, it may be desirable to provide moisture removing means to remove liquid from the cool exhaust gas leaving the heat exchanger means. Such an arrangement may include second heat exchanger means to cool the exhaust gas from the first heat exchanger means, means to remove moisture from the cooler exhaust gas leaving the second heat exchanger means, a cooler to reduce the temperature of the cooler exhaust gas leaving the moisture removing means, second moisture removing means to remove moisture from the cold gas leaving the cooler and means to feed the cold exhaust gas from the second moisture removing means to the second heat exchanger in which it is heated with the cool exhaust gas leaving the first heat exchanger.

Another aspect of the invention provides a gas turbine plant comprising a gas turbine, an isothermal compressor producing cold compressed gas, means to preheat the cold compressed gas, a main heater to generate hot high pressure gas from the preheated compressed gas and means to feed the hot high pressure gas to drive the turbine. Preferably, the means to preheat comprises a heat exchanger arranged to preheat the cold compressed gas from hot low pressure gas leaving the gas turbine.

In one embodiment of this aspect of the present invention, the main heater comprises a combustion chamber burning fuel in the preheated pressurized gas and producing combustion gas as the hot high pressure gas.

In another embodiment of this aspect of the present invention, the main heater comprises an external source of heat. This external source of heat may be for example a coal or oil fired furnace, a chemical or industrial process, a nculear reactor or a solar furnace.

Advantageously, the gas turbine plant may include means for feeding part of the cold compressed gas to the gas turbine blades for cooling thereof. This enables any upper limit of the temperature inside the turbine set by the turbine blades to be increased.

In one embodiment, the gas turbine plant may include a further gas turbine and means for feeding part of the hot compressed gas from the heat exchanger to drive the further gas turbine. This is especially advantageous when the heat exchanger exchanges heat between a cooler gas having a higher specific heat and a hotter gas having a lower specific heat, so that not all the heat in the hotter gas is need to raise the temperature of the cooler gas. The residual heat can conveniently be used to heat part of the cool gas from the compressor to drive a further gas turbine.

The above embodiments may further include a third gas turbine, a second heat exchanger to preheat part of the cold compressed gas from hot low pressure gas leaving the further gas turbine and means to feed the preheated gas to drive the third gas turbine. Preferably, the isothermal compressor is driven by one of the gas turbines. The isothermal compressor may comprise the gas compressor or any embodiments thereof mentioned above.

In another embodiment of this aspect of the present invention, the gas turbine plant may further include a vessel for storing cold compressed gas from the isothermal compressor and means for recovering the stored compressed gas for driving the turbine when required.

According to another aspect of the present invention, there is provided an energy storage plant comprising an isothermal gas compressor as described and claimed, a storage vessel for storing cold compressed gas from the compressor and means to feed gas from the compressor to the storage vessel.

Preferably the energy storage plant includes an isothermal expander comprising a chamber to contain gas to be expanded, a piston to allow the gas to expand by movement of the piston out of the chamber, means to form a spray of liquid in the chamber to heat the gas on expansion therein, and valve means to admit compressed gas into the chamber from the storage vessel. The isothermal expander may further comprise a second chamber to contain gas to be compressed by movement of the piston into the second chamber, and valve means to allow compressed gas to be drawn from the second chamber. Advantageously, the hot compressed gas, which may be air, may be used to drive a gas turbine.

The gas compressor according to various aspects of the present invention, may be driven in reverse as an isothermal gas expander, the difference being that cool compressed gas is introduced into the chamber and allowed to expand by movement of the piston out of the chamber, and the means to form a spray of liquid in the chamber transfers heat to the gas during expansion so that the expansion may be approximately isothermal. The energy imparted to or via the piston may be used to compress the expanded gas in the chamber adiabatically or if there is a second chamber, to compress gas in the second chamber adiabatically. The adiabatically compressed gas may then be used to drive a gas turbine, for example an air turbine. Thus, the gas compressor/expander provides a means of converting cold compressed gas stored in a storage vessel into useful power.

According to another aspect of the present invention, there is provided a gas compressor comprising a chamber to contain gas to be compressed, a piston to compress the gas by movement of the piston into the chamber, valve means to allow compressed gas to be drawn from the chamber, wherein the mass of the piston is sufficient to enable all the energy required to compress the gas to be stored in the piston.

Kinetic energy would normally be imparted to the piston by some process which involves the expansion of gas. The energy released in the process may continuously vary over time. Advantageously, by providing a massive piston, all the energy released during the process is transferred to kinetic energy of the piston. Furthermore, because the piston is sufficiently massive to store the kinetic energy released by the process, a fly wheel is not required which removes the need for mechanical linkages and couplings which are susceptible to wear.

According to another aspect of the present invention, there is provided a gas compressor comprising a piston, means forming a chamber to contain gas to be compressed and to compress the gas by movement of the chamber over the piston, means to form a spray of liquid in the chamber to cool the gas on compression therein and valve means to allow compressed gas to be drawn from the chamber. In this aspect of the present invention, the piston is arranged to remain stationary relative to the movement of the chamber. As will be appreciated by those skilled in the art, the various embodiments described in relation to a compressor comprising a moveable piston and a stationary chamber may be modified, mutatis mutandis, so that motion is imparted to the or each chamber and the piston remains stationary.

The terms "hot" or "cool" or "cold" used throughout the specification and claims are used in a relative sense to distinguish that which is at a higher temperature from that which is at a lower temperature and are not intended to limit the temperatures to any particular value or range. Thus, the term hot includes temperatures which may normally be considered cold, and the term cold includes temperatures which may normally be considered hot.

Examples of embodiments of the present invention will now be described with reference to the drawings in which:

FIG. 3 shows a third embodiment of a gas driven compressor including a solid piston;

FIG. 4 shows a fourth embodiment of a gas driven compressor including a solid piston;

FIG. 25 shows an embodiment of a gas driven compressor incorporated in a power generation and gasification cycle;

Gas-Driven Liquid Piston Compressor

Symmetric

Figure 1:
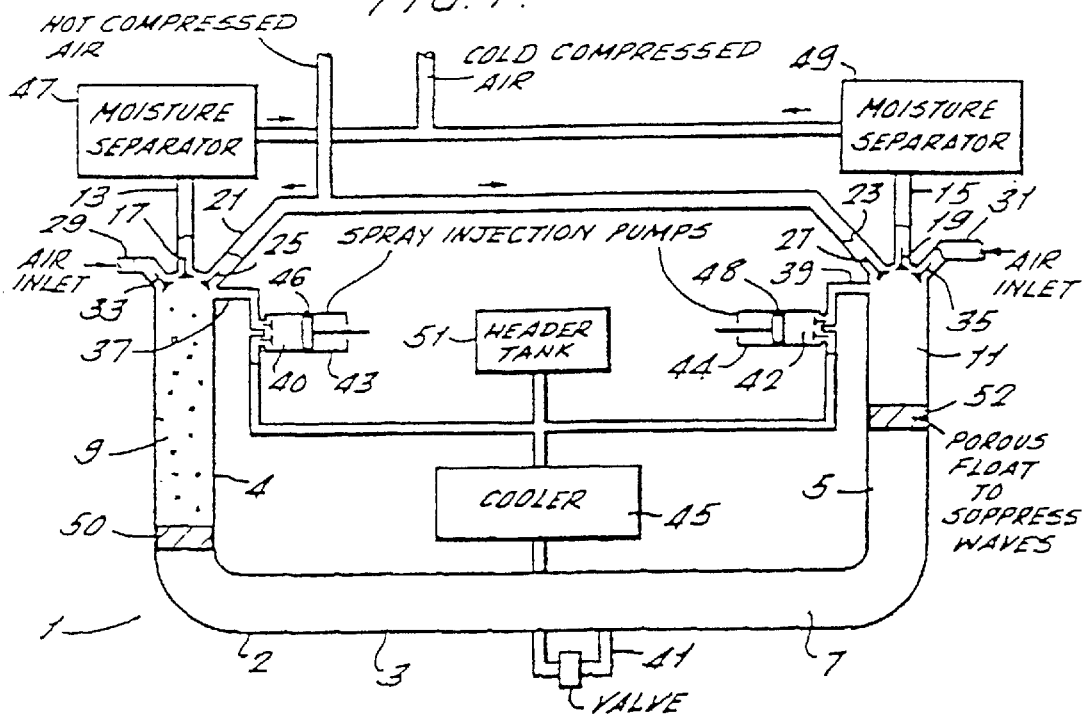
FIG. 1 shows an embodiment of a gas driven compressor including a liquid piston.

Referring to FIG. 1, a liquid piston isothermal compressor generally shown at 1 comprises a long, generally U-shaped conduit or pipe 2 having an elongate linear mid-section 3 which is horizontal or near horizontal and two arms 4 and 5 which extend vertically upwards. The conduit 2 is partially filled with water or with some other liquid thus forming a liquid piston 7. The conduit 2 is of sufficient length and diameter to provide the liquid piston with the required mass to control the rate of compression. Chambers 9 and 11 are formed in the vessel arms 4 and 5. Each chamber is provided with a number of inlet and outlet ports for controlling the input and output of gas to and from each chamber. Ports 13 and 15 each have valves 17 and 19 to allow cold compressed gas to be drawn from each chamber. Ports 21 and 23 each have valves 25 and 27 to admit a controlled mass of hot compressed gas into each chamber, and ports 29 and 31 are controlled by valves 33 and 35 for admitting an additional mass of gas into each chamber. Each chamber 9 and 11 is provided with a further port 37 and 39 to enable a liquid spray to be injected into each chamber. A spray injection pump 43, 44 is connected to a respective spray injection port 37, 39. An outlet port 41 is formed in the mid-section 3 of conduit 2 and connected to each pump 43, 44 for supplying liquid from the liquid piston to ports 37 and 39 for the spray. In this embodiment, each pump is a positive displacement pump in which liquid is drawn into the pump chamber 40, 42 by a displacer 46, 48 over the period of the compressor operating cycle in which the liquid piston is moving out of the chamber 9, 11; and in which liquid is continuously forced out of the pump chamber 40, 42 by the displacer 46, 48 when gas is being compressed in chamber 9, 11, on movement of the liquid piston into that chamber 9, 11. A cooler 45 is connected between outlet port 41 and the pumps 43, 44 to cool the liquid drawn from the liquid piston before the liquid is injected into each chamber 9 and 11 as a spray.

A reservoir or tank 51 of liquid for use in the liquid spray is provided to replace liquid which is lost to the moisture separators 47, 49 in order to maintain the inventory of the liquid piston constant during operation. Liquid collected by the moisture separators 47, 49 may be returned to the liquid piston or to the sprays via the tank 51, as required. The tank of liquid 51 also provides liquid for the spray during start-up of the compressor.

Floats 50 and 52 may be provided to float on the surface of the liquid pistons in each chamber 9, 11 and may comprise a porous or fibrous material, through which the liquid used in the liquid piston can diffuse. The floats may be rigid or flexible. The floats suppress waves at the surface of the piston and the entrainment of liquid into the ports through which cool compressed gas is drawn. In addition the porous nature of the floats 50, 52 facilitates the re-combination of liquid from the liquid sprays with the liquid in the piston.

In operation, a quantity of hot compressed gas from an external source such as a conventional rotary compressor, is injected into chamber 9 through port 21. At this point valves 17 and 33 are already closed and the liquid piston 7 is at the top of its stroke in chamber 9. The hot compressed gas expands in chamber 9 causing the liquid piston 7 to accelerate towards the opposite end of the long pipe 2. As the gas expands it cools, so that both the thermal and pressure energy of the gas is converted to kinetic energy of the piston 7. When the pressure of the gas falls to atmospheric pressure (or to some other pressure at which additional relatively unpressurised gas is available), valve 33 opens and allows an additional volume of the gas to enter through port 29. The liquid piston 7 continues its motion drawing gas into the expanding volume of chamber 9.

At the time that the liquid piston 7 was at the top of its stroke in chamber 9, chamber 11 contained a volume of gas comprising a quantity of cool expanded gas previously introduced as a quantity of hot compressed gas through port 23 and an additional quantity of relatively unpressurised gas introduced through port 31. As the liquid piston 7 moves out of chamber 9 into chamber 11, the gas in chamber 11 is compressed. As the gas is compressed liquid is sprayed en the form of small droplets into chamber 11 to maintain the gas at a near constant temperature. The liquid in the spray falls through the gas space and mixes with the liquid forming the liquid piston 7. In this embodiment, the spray liquid is drawn from the liquid in pipe 2 and is pumped back to spray inlets 37 and 39 by pumps 43 and 44 via the cooler 45.

At a certain stage of the compression, the gas in chamber 11 will reach the desired pressure, at which point the liquid injection is stopped and valve 19 opens to allow the gas to exit from the chamber. Separators 47 and 49 are provided to remove any liquid which has been entrained in the gas.

As the liquid piston 7 in chamber 11 reaches the top of its stroke, exit valve 19 closes, and valve 27 opens injecting a quantity of hot compressed gas into chamber 11 to drive the liquid piston 7 to the other end of the pipe 2. Simultaneously, valve 33 closes and the volume of gas in chamber 9, comprising a cooled expanded quantity of gas admitted through port 21 and the additional quantity of gas admitted through port 29, is compressed in chamber 9. As the gas is compressed, liquid is sprayed in the form of droplets into chamber 9 to maintain the gas at a near constant temperature. The liquid in the spray falls through the gas space and mixes with the liquid forming the liquid piston 7. At a certain stage of the compression, the gas will reach the desired pressure, at which point valve 17 opens to allow the gas to exit from the chamber. The gas passes through separator 47 to remove any liquid which has been entrained in it. Exit valve 13 closes as the liquid piston approaches the top of its stroke in chamber 9, and another quantity of hot compressed gas is injected into the small residual volume remaining in chamber 9. This gas drives the liquid piston 7 back to the other end of the pipe 2 and the cycle is repeated.

Under steady operation, the hot compressed gas inlet valves 25 and 27 are timed to open when the liquid level reaches the top of its travel in chambers 9 and 11. They close again when a set volume of gas has entered one of the chambers. This could be when the liquid piston has fallen by a set distance.

The cooled compressed gas outlet valves 17 and 19 only open during the part of the cycle when the liquid piston is moving into one of the chambers 9 and 11. The valves open when the pressure in the system exceeds that of the outlet pipe work but close before the hot gas inlet valves 25 and 27 open. Non-return valves (check valves) could be used, provided that they are controlled to operate only when the liquid piston is moving upward in that particular chamber. Low pressure gas inlet valves 33 and 35 open when the pressure in the appropriate chamber 9 or 11 falls below that of the source of the low pressure gas. Non-return valves can be used for this purpose.

The operation of the valves may be determined by pressure and water level changes. With regard to the pressure, an internal mechanical system may be used, such as exists for a non-return valve. Alternatively, pressure sensors may be used to provide an electrical signal which may be used to trigger a valve actuator. With regard to liquid level, although a mechanical system would be possible, a sensor providing an electrical signal is a more practical alternative. The liquid level sensor might operate in a number of alternative ways, such as detection of the buoyancy of a float, the use of a conductivity or capacitance meter, an optical method or the use of ultrasonics. The valves themselves might be actuated (i.e. powered) electrically or by compressed air.

The liquid spray system is intended to produce a large number of droplets in a particular size range which maximises the heat transfer between the liquid and the gas, while minimising the power consumption of creating the spray. Also it is important that the droplets are not too small, from the point of view of separating the droplets from the gas either by gravity or by the action of the separators 47 and 49. The separators remove any liquid droplets which are carried upwards into the off-take pipe on the other side of the outlet port 13 and 15. The separators can be of various kinds. For example, inertial or centrifugal separators may be used or some combination of these.

The spray pumps 43 and 44 circulate water from pipe 2 through external cooler 45 and the injection sprays 37 and 39 back into pipe 2. A positive displacement pump may be used for this purpose in order to maintain a constant flow rate while the pressure differential in chambers 9 and 11 is varying. The positive displacement pump may be a piston-type pump, which is timed to work in phase with the movement of the liquid piston 7 so that injection only occurs while gas is being compressed. In this case, it would not be necessary to have valves to control the injection of the spray. Alternatively, if centrifugal or mixed-flow pumps were used and run continuously, then spray valves would be needed. The external cooler 45 rejects the heat which has been absorbed by the liquid sprays. Reduction of the spray temperature reduces the energy needed to compress a given mass of gas. To achieve the lowest possible temperature of the spray, the spray liquid is passed through the coolers immediately prior to injection. The cooling may be performed by forced draft air cooling, by using cooling towers or by re-circulating water from a lake, a river or the sea.

Floats 50 and 52 which float on the surface of the liquid piston in each chamber suppress waves and the entrainment of liquid into the ports through which cool compressed gas is drawn. The advantage of incorporating a float is that the suppression of the liquid entrainment allows more cycles of the liquid piston in a given time. Consequently, this will increase the output of cold compressed gas from a given size of machine.

Liquid/Solid Piston Gas-Driven Compressor

In addition to liquid providing the large mass of the piston, the mass may be provided by solid material. The material can be chosen to have a much higher density than the liquid so that, advantageously, the dimensions of the compressor can be greatly reduced. The piston may consist entirely of a solid material, or may comprise a combination of a number of solid and liquid pistons. An example of a gas compressor having both liquid and solid pistons is shown in FIG. 2.

Figure 2:
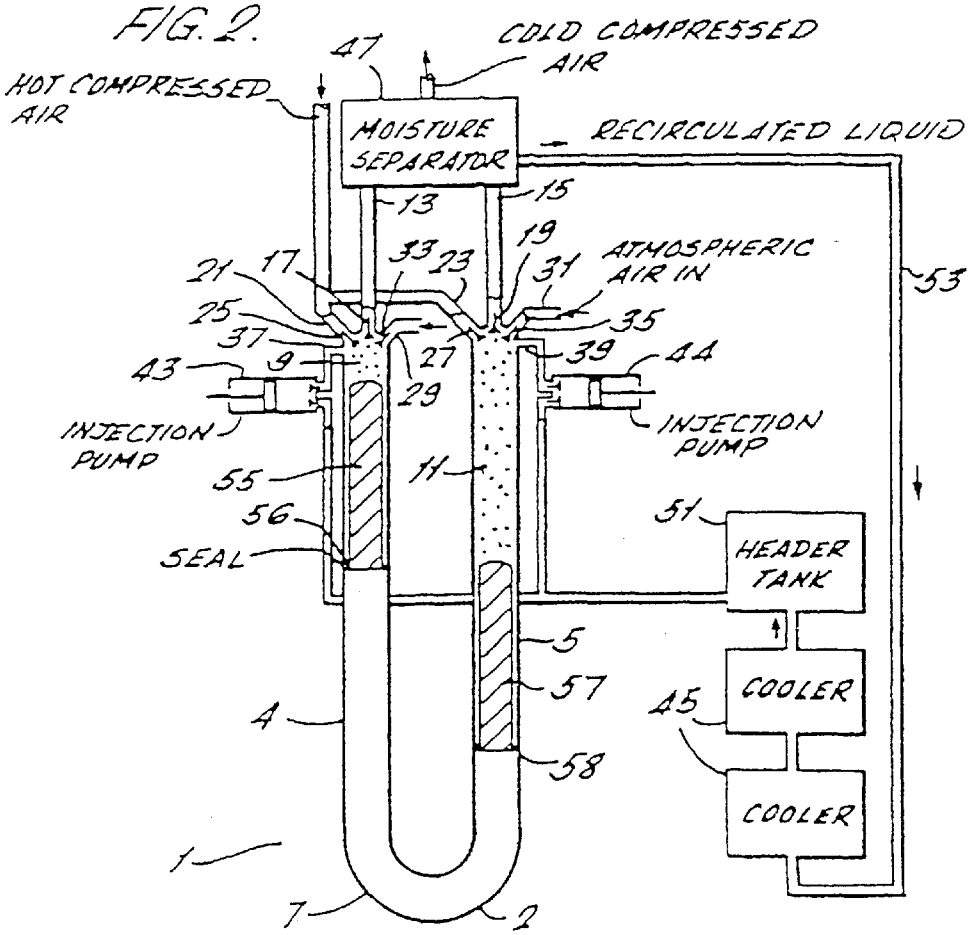
FIG. 2 shows another embodiment of a gas driven compressor including both solid and liquid pistons.

Referring to FIG. 2, the compressor 1 comprises a generally U-shaped conduit 2 partially filled with liquid forming a liquid piston 7. A solid piston 55, 57 is supported by the liquid piston in each arm 4, 5 of conduit 2. Each arm 4, 5 is elongate, linear and arranged so that the solid pistons 55, 57 are free to execute vertical linear motion into and out of the chambers 9, 11.

The density of the solid pistons 55, 57 is greater than that of the liquid in the liquid piston 7, so that the overall size of the composite piston including its solid and liquid components may be relatively compact. Seals 56, 58 for sealing the gap between the solid pistons 55, 57 and the arms 4, 5 of the conduit 2 are provided on and near the bottom of the solid pistons 55, 57. Although the purpose of the seals 56, 58 is to prevent the liquid escaping from under the solid pistons 55, 57, some leakage may inevitably occur, in which case it will be necessary to replace the lost liquid. This may be done by pumping liquid directly into the section of conduit containing the liquid piston.

The solid pistons 55, 57 conveniently suppress interfacial disturbances at the surface of the liquid piston 7 and also prevent the entrainment of liquid from the liquid surface into the gas. However, the solid pistons 55, 57 and their respective seals 56, 58 will prevent liquid used in the liquid spray from combining with liquid in the liquid piston. Therefore, liquid for the spray is provided by a separate source and not by the liquid piston itself as for the previously described embodiment. In die present embodiment, the liquid is held in a tank or reservoir 51 which supplies liquid to the spray injection pumps 43 and 44. The spray liquid is removed from the chambers 9, 11 by the action of the solid pistons 55, 57, which simply push the liquid out through the respective compressed gas outlet ports 13, 15 along with the isothermally compressed gas. The liquid is then separated from the compressed gas in an external moisture separator 47. The separated liquid in the moisture separator 47 is returned to the tank 51 via one or more coolers 45, to be recirculated.

Apart from the way in which the spray liquid is removed from the chambers, the operation of the gas compressor shown in FIG. 2 is essentially the same as that of the compressor previously described with reference to FIG. 1.

The compressors described so far are essentially symmetric, in that they all have a piston which is driven back and forth between two chambers, in each of which the same processes occur, namely alternate expansion and compression of gas. However, in alternative embodiments compression may take place on one side of the piston only so that compression is done by displacement of the piston in one direction only. Also the expansion of hot compressed gas to impart kinetic energy to the piston for the compression of gas may also take place on one side of the piston only, i.e. on the same side as compression or on the opposite side. Such an embodiment may be described as asymmetric.

In an asymmetric compressor having a liquid piston, the pipe could be formed in the shape of a 'U' shown in FIGS. 1 and 2 or in the form of a 'J'. One arm of the pipe would comprise the compression chamber while the other arm could be open ended and exposed to atmospheric pressure, or closed and having a gas space enclosed therein. In operation, a quantity of hot compressed gas is injected into the chamber where it expands and cools forcing the liquid piston to the other end of the pipe. The pressure and thermal energy of the gas is converted into kinetic energy of the liquid piston, and a volume of relatively low pressure gas is admitted into the chamber as the liquid piston is in motion. As the liquid piston rises in the other end of the pipe, the kinetic energy is converted into potential energy due to the height of the piston in the pipe, if the pipe is open ended or into a combination of potential energy due to the height of the liquid piston and the pressure and thermal energy of gas compressed above the liquid piston if the end of the pipe is closed. The latter option may be preferable since the arm of the pipe would not have to be so high. The potential energy is then converted to kinetic energy of the piston in the direction of the compression chamber. If the gas at the end of the closed pipe is compressed adiabatically, then the potential energy of the gas will be converted back to kinetic energy as the liquid piston reverses and enters the compression chamber to compress the volume of gas. The gas is compressed isothermally by activating the liquid sprays.

Solid Piston Gas-Driven Compressor

Asymmetric Version

As mentioned above, it may be advantageous to use a solid piston made of a high density material to reduce the size of the compressor. FIG. 3 shows an embodiment of the compressor having a single solid piston and which is designed to operate in the asymmetric mode.

With reference to FIG. 3, the gas compressor comprises an upper chamber 8 to contain gas to be compressed, disposed substantially vertically above a lower chamber 10. A piston 12 comprising a solid material is free to move up and down, into and out of the upper and lower chambers 8, 10. The upper chamber 8 has a gas inlet port 29 controlled by a gas inlet valve 33 and a compressed gas outlet port 13 controlled by a gas outlet valve 17. A liquid spray injection port 37 is provided to inject a liquid spray into the upper chamber 8. The lower chamber 10 has a gas inlet port 23 controlled by a gas inlet valve 27 and a gas outlet port 24 controlled by a gas outlet valve 26.

A typical cycle of the operation of the compressor will now be described, beginning with the solid piston 12 at rest and supported by a cushion of compressed gas just above the base of the lower chamber 10.

At this point, the upper chamber 8 contains a fresh 3 quantity of gas to be compressed and both the gas inlet and outlet valves 33 and 17 are closed A quantity of hot compressed gas from a suitable source, for example a conventional compressor, is injected into the lower chamber 10 via the gas inlet port 23. The hot compressed gas expands, imparting kinetic energy to the piston and forcing the piston 12 upwards into the upper chamber 8. As the piston 12 moves into the upper chamber 8, the gas in the upper chamber is compressed. Liquid is sprayed into the upper chamber 8 via the spray injection port 37 during the compression process to cool the gas, so that compression may be approximately isothermal. At some point during the upward movement of the piston 12, the gas inlet valve 27 in the lower chamber 10 closes and the gas in the lower chamber expands adiabatically.

When the gas in the upper chamber 8 reaches a certain pressure, the compressed gas outlet valve 17 opens, the liquid spray is stopped and compressed, gas together with the spray liquid is drawn from the chamber via the gas outlet port 13. As the piston 12 reaches the top of its stroke in the upper chamber 8, the compressed gas outlet valve 17 closes and any residual gas in the upper chamber 8, may serve to absorb any kinetic energy of the solid piston before it comes to rest at the top of the chamber. This residual gas is compressed adiabatically so that the energy stored therein may be released by allowing the gas to expand adiabatically, thereby imparting kinetic energy to the piston 12 in the other direction, out of the upper chamber.

Once the piston 12 has reversed direction, the gas outlet valve 26 in the lower chamber 10 opens and the relatively cool expanded gas in the lower chamber is exhausted through the gas outlet port 24. When the pressure in the upper chamber falls to the gas inlet pressure, the gas inlet valve 33 in the upper chamber 8 opens and relatively low pressure gas is drawn into the upper chamber 8 as the piston 12 moves downward out of the chamber.

As the piston 12 approaches the base of the lower chamber 10, the gas outlet valve 26 closes and the residual gas in the lower chamber is compressed adiabatically, retarding the downward motion of the piston and serving as a cushion between the piston 12 and the base of the chamber. The timing of closure of the gas outlet valve 26 may be such that the pressure of gas in the lower chamber at the time of piston reversal is equal to the inlet pressure of the hot compressed gas. When the piston comes to rest in the lower chamber, the compressed gas inlet port 27 opens, a fresh charge of hot compressed gas is injected into the lower chamber, and the cycle is repeated.

In this embodiment, gravity alone may provide the means to convert the kinetic energy of the piston in one direction into potential energy to impart kinetic energy to the piston in the other direction. In this case the operating frequency of the compressor would be limited by the gravitational restoring force. However, the frequency may be increased by providing some means to absorb and impart kinetic energy of the piston at a greater rate than provided by gravity, for example by providing a pocket of gas above the piston which is compressed and expands during reversal of the motion of the piston in the upper chamber, as mentioned above.

Solid Piston Gas-Driven Compressor

Symmetric Version

In another embodiment of the gas compressor in which a solid piston is arranged to move linearly and vertically, means also may be provided to inject hot compressed gas into the upper chamber as well as the lower chamber, so that energy is imparted to the piston in both directions by the injection and expansion of gas. Also, the compressor may be adapted so that isothermally compressed gas is produced in the lower chamber as well as the upper chamber. Furthermore, the compressor may be arranged so that an additional mass of relatively low pressure gas is drawn into each chamber after expansion of the hot compressed gas, so that the compressor produces a greater mass of compressed gas than is required to drive it. Such a compressor is symmetric in the sense that the same processes occur either side of the piston, but is asymmetric in the sense that the driving and restoring forces are biased by gravity. An example of this form of gas compressor is shown in FIG. 4.

Referring to FIG. 4, a gas compressor 1 comprises an upper chamber 9 arranged substantially vertically above a lower chamber 11 and a solid piston 12 which is free to move up and down, into and out of the upper and lower chambers. Sealing means 14 is arranged to prevent gas leaking from each chamber between the piston 12 and the chamber walls. Each chamber 9, 11 has a hot compressed gas inlet port 21, 23 controlled by a compressed gas inlet valve 25, 27 for introducing a charge of hot compressed gas into the chamber, a compressed gas outlet port 13, 15 controlled by a compressed gas outlet valve 17, 19 to enable cool compressed gas to be drawn from the chamber, a gas inlet port 29, 31 controlled by a gas inlet valve 33, 35 to admit an additional mass of gas into the chamber, and a liquid spray injection port 37, 39 for introducing a spray of liquid into the chamber during compression.

Liquid sprayed into each compression chamber is recovered and recirculated. The liquid recovery system comprises a moisture separator 47, 49 connected to each of the compressed gas outlet ports 13, 15, for separating spray liquid from the cool compressed gas; a cooling system 45 connected to each of the moisture separators 47, 49, for cooling the spray liquid, and separate pumps 43, 44 connected between the cooling system and each spray injection port 37, 39, to pump liquid from the moisture separators 47, 49 through the cooling system 45 and into the compression chambers 9, 11. The pumps are preferably designed to pump spray liquid into the chambers at a constant rate as the pressure in the compression chambers increases during compression. A header tank 51 is provided to replace any liquid which is not recovered or that is lost from the recovery system.

A typical operating cycle of the gas compressor 1 shown in FIG. 4, proceeds as follows, beginning with the solid piston 12 momentarily at rest just above the base of the lower chamber 11 and supported by a cushion of compressed gas. At this point, all the gas inlet and outlet valves in both the upper and lower chambers 9, 11 are closed, and the upper chamber contains a mass of cool expanded gas previously introduced via the hot compressed gas inlet port 21, together with an additional mass of gas previously introduced via gas inlet port 29.

As the piston 12 comes to rest in the lower chamber 11, the hot compressed gas inlet valve 27 opens and a charge of hot compressed gas is introduced into the lower chamber. After a predetermined time the inlet valve closes. The gas then expands adiabatically, forcing the piston 12 out of the lower chamber 11 and into the upper chamber 9. Thus, the energy of expansion of the hot compressed gas is transferred to kinetic energy of the massive solid piston which is thrust upwards and gains potential energy. In turn, the kinetic energy of the piston is converted in part to the compression energy of the compressed gas in the upper chamber 9. As the piston 12 moves into the upper chamber 9, the gas in the upper chamber 9 is compressed and a cool liquid spray is injected into the upper chamber 9 to prevent the gas from heating so that the compression may be approximately isothermal.

The adiabatic expansion of the hot compressed gas introduced into the lower chamber 11, imparts sufficient kinetic energy to the piston 12 in the direction of the upper chamber 9, so that when the upward thrust produced by the expanding gas in the lower chamber 11, acting on the piston 12 becomes less than the downward force acting on the piston (due to its mass and the weight and pressure of gas in the 4 upper chamber), the piston 12, by virtue of its large inertia, will continue its upward motion into the upper chamber 9. When the gas pressure in the lower chamber falls below that of the supply of additional gas, the gas inlet valve 35 in the lower chamber opens and an additional mass of gas is drawn into the lower chamber as the piston continues to move upward.

When the gas pressure in the upper chamber reaches the desired value, the compressed gas outlet valve 17 opens and cool compressed gas together with the spray liquid is drawn from the upper chamber through the compressed gas outlet port 13. The compressed gas passes through the moisture separator 47 in which the spray liquid is removed from the compressed gas and the extracted liquid is passed to the cooler 45 in which it is cooled before re-use in the liquid spray.

As the piston 12 reaches the limit of its travel in the upper chamber 9, the compressed gas outlet valve 17 closes, and any residual gas remaining in the upper chamber will bring the piston 12 to rest, the timing of the closure of the gas outlet valve 17 is preferably such that at the point of piston reversal in the upper chamber 9, the gas pressure in the chamber is equal to the hot compressed gas inlet pressure. As the piston comes to rest the gas inlet valve 35 in the lower chamber closes so that, at this point, all the gas inlet and outlet valves in the lower chamber 11 are closed. The hot compressed gas inlet port 25 then opens and a charge of hot compressed gas is introduced into the upper chamber via the hot compressed gas inlet port 21. After a predetermined time, the gas inlet valve closes and the gas then expands adiabatically forcing the piston 12 out of the upper chamber 9 and into the lower chamber 11. Thus, the energy of expansion of gas in the upper chamber is transferred to kinetic energy of the piston in the direction of the lower chamber. The potential energy of the piston due to its mass and height is also converted into kinetic energy. The gas in the lower chamber (which consists of a mass of cool expanded gas previously introduced via the hot compressed gas inlet port 23 and a mass of additional gas introduced via gas inlet port 31) is compressed on movement of the piston 12 into the lower chamber 11 and a spray of liquid is injected into the lower chamber to absorb the heat of compression from the gas, thereby preventing the gas temperature from increasing so that the compression process may be approximately isothermal. Thus, the kinetic energy of the piston is converted into compression energy of the gas in the lower chamber 11.

When the gas pressure in the upper chamber 9 falls below that of the supply of additional gas, the gas inlet valve 33 opens and an additional mass of gas is drawn into the upper chamber 9 as the piston 12 continues its downward motion out of the upper chamber 9.

When the gas pressure in the lower chamber 11 reaches the desired value, the compressed gas outlet valve 19 opens and the compressed gas together with the spray liquid is drawn from the lower chamber through the compressed gas outlet port 15. The compressed gas and spray liquid are passed to the moisture separator 49 in which the spray liquid is removed from the compressed gas and the liquid is then passed to the cooler 45 before being re-used in the liquid spray.

Just before the piston 12 reaches the limit of its travel in the lower chamber 11, the compressed gas outlet valve 19 closes, trapping the remaining compressed gas in the lower chamber which serves to bring the piston to rest. The closure of the gas outlet valve is preferably timed such that the pressure of gas in the lower chamber at the point of piston reversal is equal to the hot compressed gas inlet pressure. When the piston comes to rest, the gas inlet valve 33 in the upper chamber closes so that all the gas inlet and outlet valves in the upper chamber 9 are closed. The hot compressed gas inlet valve 27 opens introducing a fresh charge of hot compressed gas into the lower chamber. The cycle is then repeated.

As mentioned above, the vertical linear gas compressor shown in FIG. 4 is only approximately symmetric due to of the weight of the piston which biases the restoring forces towards the lower chamber. In general, it may be desirable for the compressed gas outlet pressure to be the same in both the upper and lower chambers so that compressed gas can be supplied at constant pressure over the cycle. Furthermore, it may also be desirable for the hot compressed gas inlet pressure in both the upper and lower chambers to be the same. Each of the above objects may be achieved by providing gas flows in the upper and lower chambers of different masses. The throughput of gas into the upper and lower chambers may be controlled according to the size of the gas inlet and outlet ports and/or the period during which the gas inlet and outlet valves are open.

Because of the finite gap which is always left between the piston and the top of the upper chamber when the piston comes to rest, not all the spray liquid in the upper chamber will be expelled and some liquid always remains in the upper chamber. However, the residual liquid is not expected to seriously affect the performance of the compressor. Some liquid may also remain in the lower chamber after each compression cycle but removal of the spray liquid can be assisted by, for example, shaping the base of the chamber and positioning the gas inlet and outlet ports so that liquid can drain out of the chamber.

Solid Piston Gas-Driven Compressor

Asymmetric Version

Figure 5:
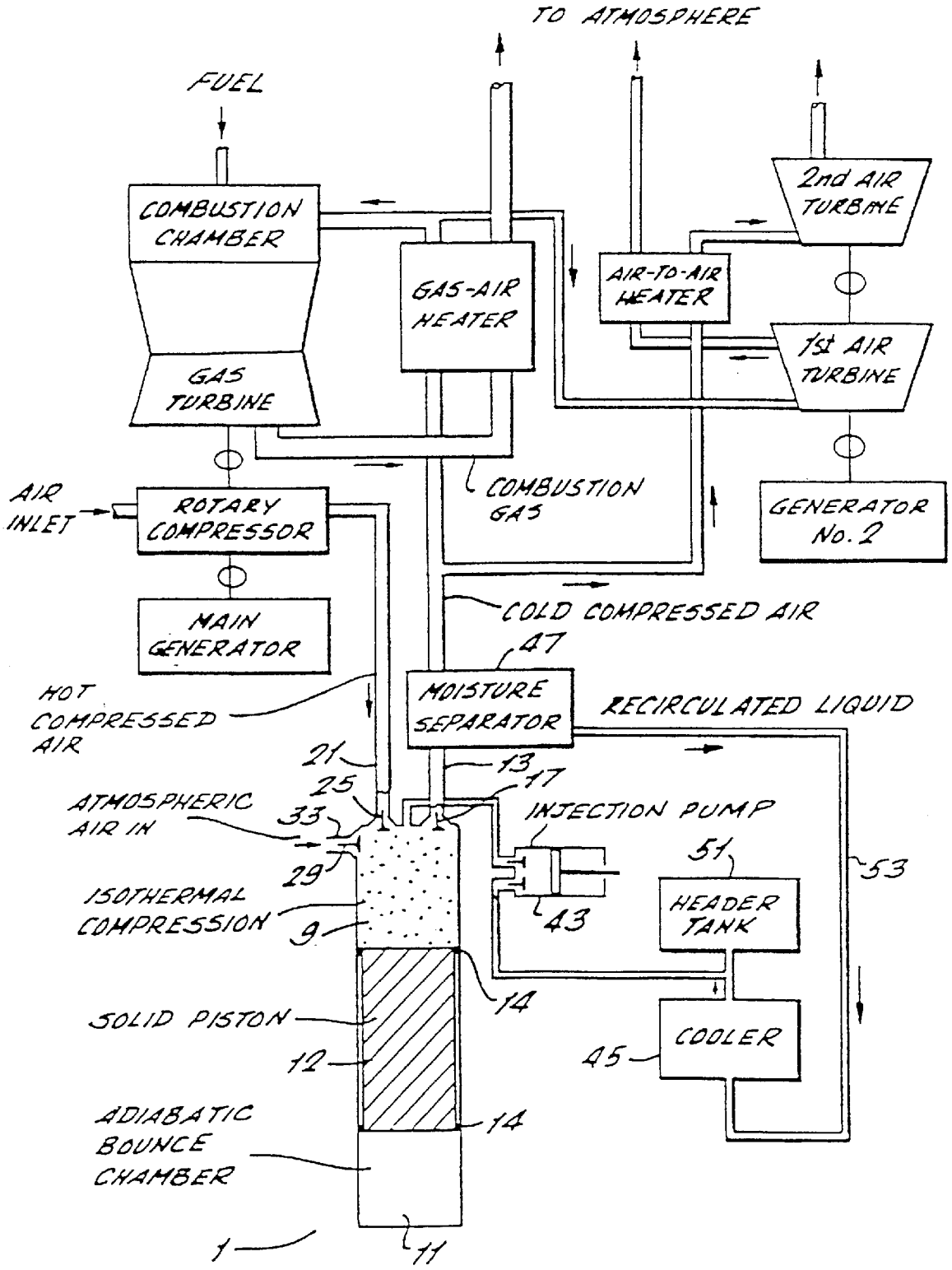
FIG. 5 shows a fifth embodiment of a gas driven compressor including a solid piston.

Another embodiment of the gas compressor with a linearly and vertically moving solid piston, implemented in a gas turbine plant is shown in FIG. 5. In this embodiment, cool compressed gas is produced in the upper chamber and in this respect the compressor is similar to the embodiments shown in FIGS. 3 and 4. However, unlike the previous embodiments, the lower chamber is closed and contains a body of gas which serves as a spring to absorb the kinetic energy of the piston as it travels downward, out of the upper chamber, and to re-impart kinetic energy to the piston in the opposite direction into the upper chamber.

Referring to FIG. 5, the gas compressor 1 comprises an upper chamber 9, positioned substantially vertically above a lower chamber 11 and a solid piston 12 which is arranged to oscillate freely between the two chambers. The compressor 1 includes sealing means 14 to prevent gas leaking from either chamber between the piston and chamber walls. The upper chamber 9 has a hot compressed gas inlet part 21 controlled by a valve 25, to allow hot compressed gas into the chamber a cool compressed gas outlet port 13 controlled by a valve 17, to allow cool compressed gas to be drawn from the chamber, and a gas inlet port 29 controlled by a valve 33 to admit an additional mass of gas into the upper chamber 9 when the gas pressure in the chamber falls below a certain value.

A spray injection port 37 is also formed in the upper chamber for the injection of a liquid spray during compression. A recovery system is arranged to recover and cool spray liquid from the compression chamber after compression. The recovery system includes a moisture separator 47 connected to the output port 13 of the upper chamber, to remove spray liquid from the cool compressed gas leaving the chamber; a cooling system 45 connected to the moisture separator 47 to cool the spray liquid, and a pump 43 connected between the cooling system 45 and the spray injection port 13 of the upper chamber 9 to pump liquid from the moisture separator 47, through the cooling system 45 and into the upper chamber 9 via a spray nozzle (not shown). A header tank containing spray liquid is arranged to replace any liquid which is not recovered or is lost from the recovery system.

The lower chamber 11 contains a volume of gas which is, as far as possible, permanently sealed within chamber 11. Some gas may inevitably leak from the lower chamber through the seal 14 between the solid piston and the chamber walls, but measures can be taken to replace any gas lost from the lower chamber by, for example providing a gas inlet port in the lower chamber controlled by a valve to admit replacement gas from a suitably pressurized source.

Atypical operating cycle of the compressor shown in FIG. 5 proceeds as follows beginning with the solid piston 12 momentarily at rest at the top of its stroke in the upper chamber 9. At this time the compressed gas outlet valve 17 and the gas inlet valves 25 and 33 are closed and the chamber may contain a pocket of compressed gas.

As the piston reverses direction, the hot compressed gas inlet valve 25 opens, introducing a charge of hot compressed gas into the upper chamber. After a predetermined time interval, the hot compressed gas inlet valve 25 closes and the hot compressed gas expands adiabatically driving the piston 12 downward out of the upper chamber. As the piston 12 moves into the lower chamber 11, the gas in the lower chamber is compressed adiabatically, so that the kinetic energy imparted to the piston 12 in the direction of the lower chamber is absorbed by the gas both as pressure energy and thermal energy, the latter resulting in a concomitant increase in the gas temperature. When the pressure of the expanding gas in the upper chamber 9, falls to the inlet pressure of the supply of additional gas, the gas inlet valve 33 opens and a additional mass of gas is drawn into the upper chamber on continued downward movement of the piston 12. When all the kinetic energy of the piston has been absorbed by the gas in the lower chamber the piston momentarily comes to rest and the gas inlet valve 33 in the upper chamber closes. The now hot compressed gas in the lower chamber then expands adiabatically, imparting kinetic energy to the piston 12 toward the upper chamber 9. As the piston moves back into the upper chamber 9, the gas in the upper chamber, which consists of the mass of gas previously introduced as hot compressed gas through gas inlet port 13 and an additional mass of relatively low pressure gas introduced via gas inlet port 29, is compressed. As the gas is compressed, liquid is sprayed into the upper chamber in the form of small droplets to absorb the heat of compression from the gas so that the compression process may be approximately isothermal. Injection of the spray may be timed to start when the temperature of gas in the upper chamber reaches the temperature of the spray liquid. When the gas pressure in the upper chamber 9 reaches the desired value, the compressed gas outlet valve 17 opens and the cool compressed gas together with the spray liquid is drawn from the upper chamber via the gas outlet port 13. The compressed gas and spray liquid are passed to the moisture separator 47 in which the spray liquid is removed from the gas.

Before the piston reaches the limit of its travel in the upper chamber, the compressed gas outlet valve 17 closes and the gas remaining in the upper chamber assists in bringing the piston to rest. As the piston comes to rest, the hot compressed gas inlet valve 25 opens and a fresh charge of hot compressed gas is introduced into the upper chamber 9 via gas inlet port 21 to repeat the cycle.

As this embodiment only has one chamber for producing cool compressed gas, compressed gas is only produced once per cycle. To produce gas at a more constant rate over the period of the cycle, one or more further such gas compressors can be provided which operate out of phase from each other. For example, if one further compressor was provided, their operating cycle could be separated by 180°. Depending on how the compressors are arranged, the phase separation may be used to assist in preventing mechanical vibration produced by acceleration and deceleration of the massive solid pistons.

In an alternative embodiment of the compressor having a linearly and vertically moving solid piston, the lower chamber could be adapted to produce isothermally compressed gas, and for the introduction of hot compressed gas to impart kinetic energy to the piston in the upward direction. The upper chamber may serve to enclose a body of gas which is compressed adiabatically by the piston on the upward stroke to absorb the kinetic energy of piston and then expands to impart kinetic energy to the piston downward in the direction of the lower chamber. In this embodiment, which is essentially an inverted form of the embodiment shown in FIG. 5, the kinetic energy of the piston in the direction of the upper chamber would be converted into both compression and thermal energy of the gas in the upper chamber and potential energy due to gravity. Alternatively, the upper chamber may be omitted altogether so that all the kinetic energy imparted to the solid piston by the introduction of hot compressed gas into the lower chamber is converted into potential energy due to gravity and then released as kinetic energy in the opposite direction towards the lower chamber to compress the gas therein. Thus, advantageously, this particular embodiment requires only one chamber and does not require auxiliary equipment associated with an adiabatic compression/expansion chamber for replacing lost gas. An advantage of having the isothermal compression done in the lower chamber is that the chamber can be designed to make use of the potential assistance provided by gravity in the removal of spray liquid.

Solid Piston Gas-Driven Compressor

Symmetric Version

Figure 6:
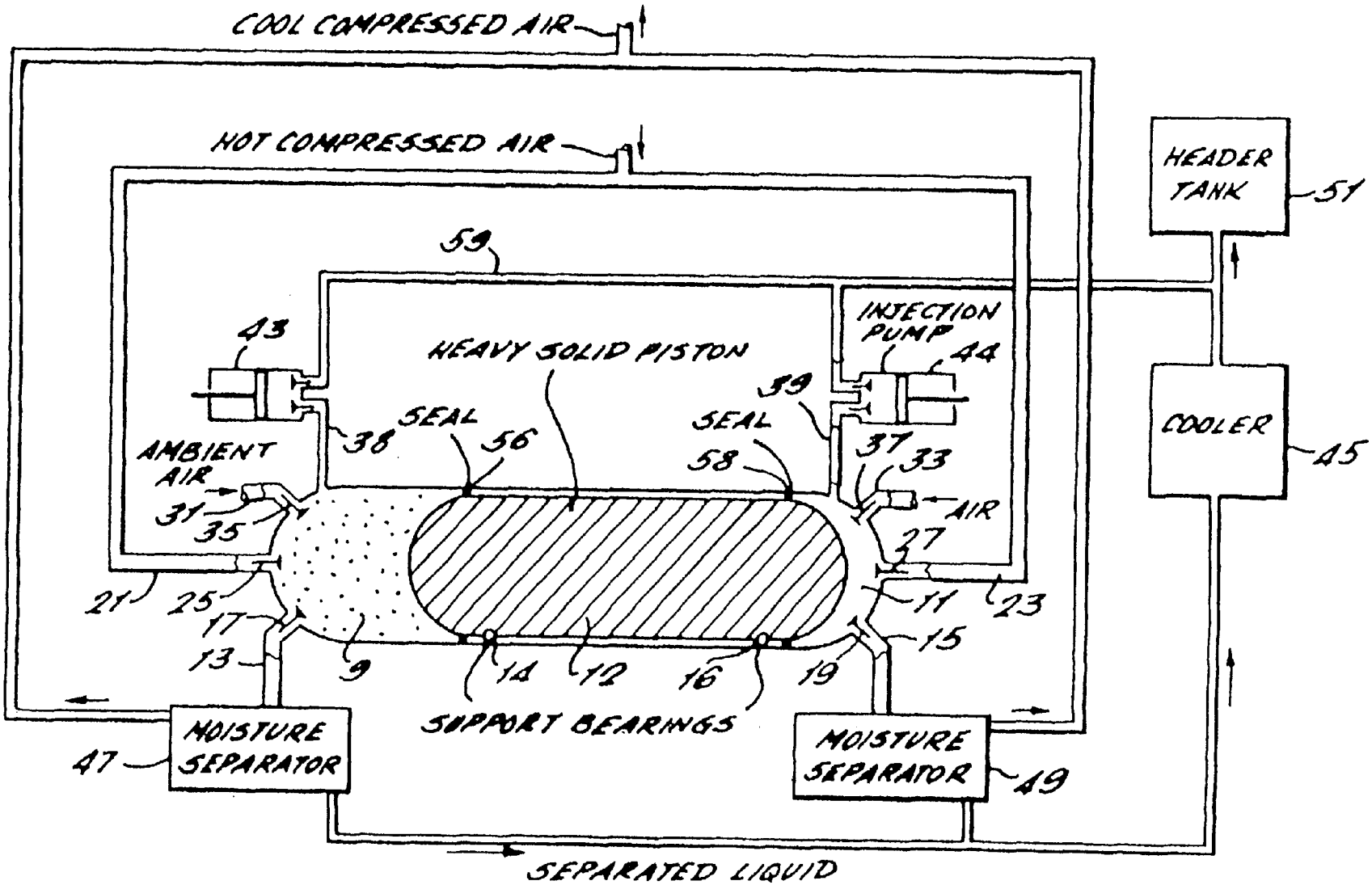
FIG. 6 shows a sixth embodiment of a gas driven compressor including a solid piston.

In another embodiment, the gas compressor may include a solid piston which is arranged to move in the horizontal plane. FIG. 6 shows an example of one such embodiment which includes two horizontally opposed chambers and a massive solid piston arranged to move linearly back and forth into and out of each chamber.

Referring to FIG. 6, the gas compressor comprises two horizontally opposed chambers, 9, 11 each having a hot compressed gas inlet port 21, 23 controlled by a valve 25, 27 to introduce hot compressed gas into each chamber, a compressed gas outlet port 13, 15 controlled by a valve 17, 19 to allow compressed gas to be drawn from each chamber, a gas inlet port 31, 33 controlled by a gas inlet valve 35, 37 to admit additional gas into each chamber, and a spray injection port 37, 39 for injecting a liquid spray into each chamber to control the gas temperature. The gas compressor has a massive solid piston 12 supported by anti-friction bearings 14, 16 and which is free to oscillate between the two chambers 9, 11. A sliding seal 56, 58 is provided between the piston and the wall of each chamber to prevent gas leaking through the gap between the piston 12 and the chamber walls. In this embodiment, each end of the piston 12 is curved as too are the ends of the chambers 9, 11.

A recovery system is arranged to recover liquid used in the spray after the isothermal compression of gas in each chamber, and to process the liquid for re-use in the spray. The recovery system includes moisture separators 47, 49 connected to a respective compressed gas outlet-port 13, 15 to remove spray liquid from the compressed gas. The outlet ports are formed in the lower part of each chamber to facilitate its removal. The moisture separators 47, 49 are connected to a cooling system 45 to cool the spray liquid. A pump 43, 44 for each chamber is connected between the cooling system 45 and the spray injection ports 38, 39, for pumping liquid from the moisture separators 47, 49, through the cooling system and back into each chamber through the spray injection ports.

The operating cycle of this embodiment of the gas compressor proceeds as follows, beginning with the piston 12 at the limit of its travel in the right hand chamber 11, with all the valves in the chamber 11 closed. The right hand chamber 11 contains a small amount of adiabatically compressed gas used to bring the piston to rest. At this point, the left hand chamber contains a mass of gas consisting of a mass of cooled expanded gas previously introduced as hot compressed gas through the hot compressed gas inlet port 21 and an additional mass of relatively low pressure gas previously introduced through gas inlet port 31. All the valves in the left hand chamber 9 are closed.

After the piston has come to rest, the compressed gas remaining in the right hand chamber 11 begins to expand and push the piston 12 out of the chamber. At the same time the hot compressed gas inlet valve 27 opens and a charge of hot compressed gas is introduced into the right hand chamber. After some predetermined time interval, the gas inlet valve 27 closes. The hot compressed gas then expands adiabatically forcing the piston 12 out of the right hand chamber 11 and into the left hand chamber 9. Thus, the energy of expansion is transferred to the kinetic energy of the piston in the direction of the left hand chamber 9. As the piston 12 moves into the left hand chamber 9, the gas is compressed and at the same time liquid in the form of a liquid spray is injected into the chamber to cool the gas during compression.

When the pressure of the expanding gas in the right hand chamber 11 falls below a predetermined value, the gas inlet valve 37 opens and an additional mass of relatively low pressure gas is drawn into the right hand chamber through the gas inlet port 33.

When the gas pressure in the left hand chamber 9 reaches the desired value, the spray injection through port 38 is stopped, the compressed gas outlet valve 17 opens and compressed gas together with the spray liquid is drawn from the chamber through the compressed gas outlet port 13. The compressed gas and spray liquid pass through the moisture separator 47 in which the spray liquid is removed from the gas. The spray liquid is then passed through a cooler 45 before being re-used in the spray.

Before the piston 12 reaches the limit of its travel in the left hand chamber 9, the compressed gas outlet valve 17 closes and the remaining gas in the chamber is compressed adiabatically bringing the piston momentarily to rest. At this time the gas inlet valve 37 in the right hand chamber 11 closes. The piston then reverses direction as the remaining gas expands and at this point, the hot compressed gas inlet valve 25 opens and a fresh charge of hot compressed gas is injected into the left hand chamber 9 through the hot compressed gas inlet port 21. Valve 25 closes after some predetermined time interval has elapsed. The hot compressed gas then expands adiabatically, forcing the piston 12 out of the left hand chamber 9 and back into the right hand chamber 11.

All the inlet and outlet valves in the right hand chamber 11 are closed and the chamber 11 contains a mass of gas consisting of a mass of cooled expanded gas previously introduced as hot compressed gas through inlet port 23 and an additional mass of relatively low pressure gas previously introduced through inlet port 33. As the piston 12 moves into the right hand chamber 11, the gas is compressed and simultaneously a spray of liquid is injected into the chamber through the spray injection port 39 to cool the gas during compression.

When the gas pressure in the left hand chamber 9 has fallen to some predetermined value, the gas inlet valve 17 opens and an additional mass of relatively low pressure gas is drawn into the left hand chamber 9 via gas inlet port 13.

When the gas pressure in the right hand chamber 11 reaches the desired value, the compressed gas outlet valve 19 opens and the compressed gas together with the spray liquid is drawn from the chamber through outlet port 15. The compressed gas and spray liquid are then passed to the moisture separator 49, in which the spray liquid is removed from the compressed gas. The liquid is then passed to a cooler 45 in which it is cooled before being returned for use as liquid in the spray.

Before the piston reaches the limit of its travel in the right hand chamber 11, the compressed gas outlet valve 19 closes, the spray injection stopped and the remaining gas is compressed adiabatically bringing the piston 12 momentarily to rest. At this point all the valves in the left hand chamber 9 are closed and the hot compressed gas inlet valve 27 opens introducing a fresh charge of hot compressed gas into the right hand chamber 11 which expands forcing the piston out of the right hand chamber and into the left hand chamber to repeat the cycle.

Other forms of gas compressor having a horizontally moving solid piston and having different modes of operation to that described above are also contemplated. For example one of the chambers may be used as an adiabatic compression/expansion chamber and contain a sealed body of gas which alternately is compressed and expands adiabatically, converting the kinetic energy imparted to the piston in the direction of the chamber into kinetic energy of the piston in the other direction out of the chamber. Thus the chamber would function in a similar way to the lower chamber shown in FIG. 5.

Because the solid piston is arranged to move in the horizontal plane, some means must be provided to support the piston and at the same time preferably minimise any frictional force tending to oppose horizontal movement of the piston. The support bearings may be mechanical bearings, for example, roller bearings specially designed to support the weight of the piston. The weight of the piston supported by each bearing may be reduced by increasing the number of bearings. Although it is desirable to make the piston as compact as possible the weight of the piston per unit length and width may be varied by sizing the piston accordingly. The piston may be of any shape and may vary in cross sectional geometry and size along its length. Thus, the mass of the piston may also vary along its length and it may be appropriate to concentrate the mass of the piston in one part of the piston than in another. In some applications it may be appropriate to design the support bearings to contribute to a significant proportion of the total mass of the piston. Other types of anti-friction bearings may also be used to support the piston such as those whose operation is based on the principle of magnetic levitation or levitation by forced fluid.

In some applications it may be advantageous to generate the liquid spray which maintains the air or gas in the compression chamber at near isothermal conditions during compression, outside the compression chamber. The spray or mist may be generated in a separate external vessel containing air or other gas. The liquid spray or mist may then be drawn into the compression chamber with the air or other gas prior to compression.

Figure 7:
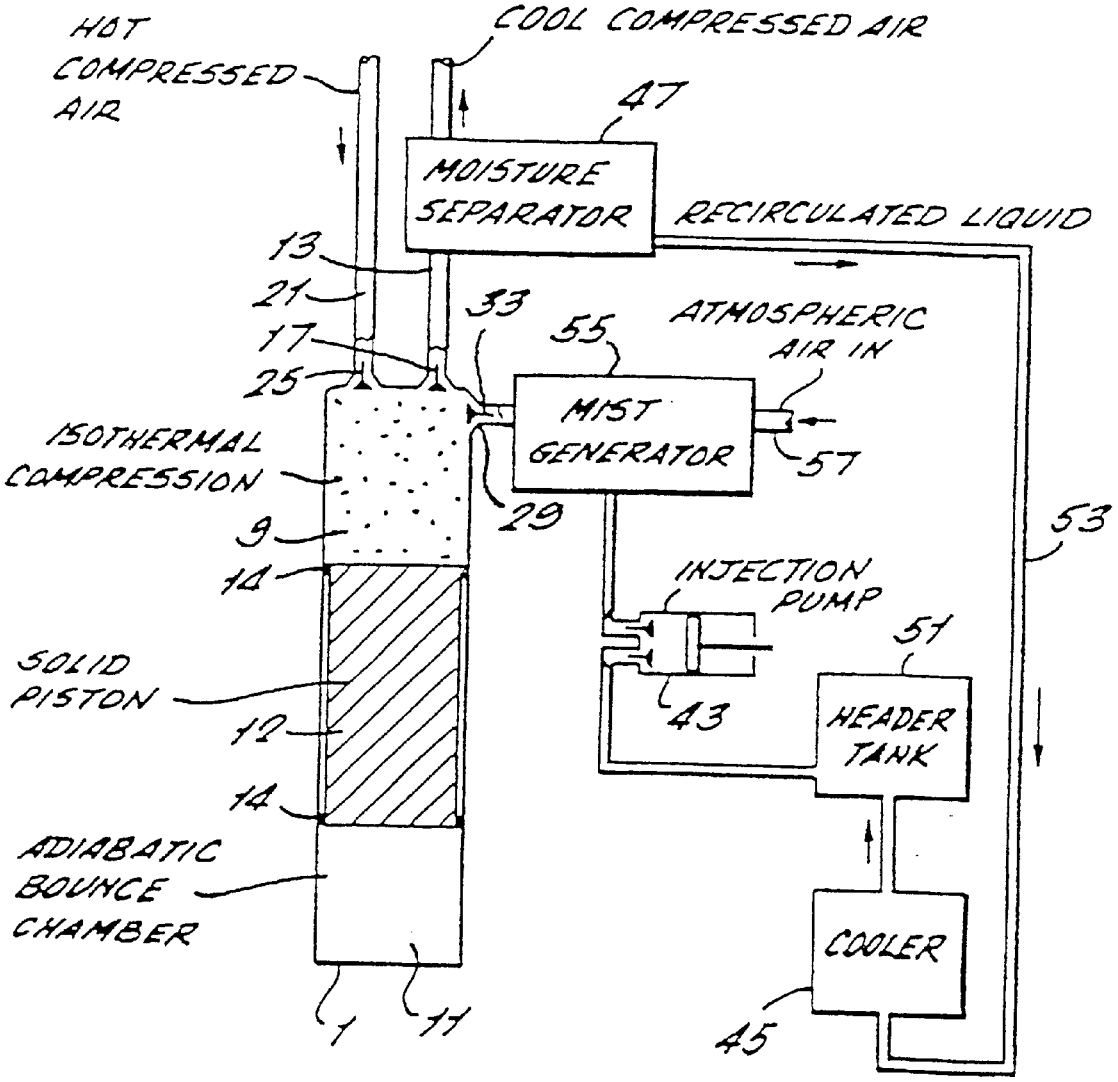
FIG. 7 shows a seventh embodiment of a gas driven compressor including a solid piston.

FIG. 7 shows a linear vertical gas compressor, similar to that shown in FIG. 5, but incorporating a separate vessel external of the compression chamber in which a mist for cooling the gas during compression is generated and mixed with atmospheric air before being admitted into the compression chamber. Referring to FIG. 7, the compressor comprises an upper chamber 9 vertically disposed above a lower chamber 11 and having a solid piston 12 which is free to oscillate vertically into and out of each chamber. The upper chamber 9 has a hot compressed gas inlet port 21 controlled by a valve 25, for admitting hot compressed gas into the chamber to drive the piston 12 downward; a cool compressed gas outlet port 13 controlled by a valve 17 to allow cool compressed gas to be drawn from the chamber 9, and a gas inlet port 29 controlled by a valve 33 to allow the liquid spray to be drawn into the chamber along with the additional relatively low pressure gas. Gas inlet port 29 is connected to a separate vessel 55 in which the mist is generated. A gas inlet port 57 is provided to allow gas to be drawn into the mist generator 55.

Liquid separated from the cool compressed gas leaving the compression chamber is re-circulated by a pump 43 via a cooler 45 and returned to the mist generator 55. The liquid spray or mist may be generated within the mist generator 55 using any conventional means, for example by forcing the liquid through one or more spray nozzles. During downward movement of the piston 12, gas inlet valve 33 opens and gas is drawn into the mist generator 55 through gas inlet port 57 and sweeps the fine liquid droplets into the compression chamber through gas inlet port 29. Because the liquid spray is introduced into the compression chamber when the pressure therein is relatively low and because die spray is admitted prior to rather than during compression, the work of pumping the liquid is reduced and a better distribution of droplets in the gas inside the compression chamber should be achieved. By forming a spray external of the compression chamber, it may also be possible to achieve a finer spray. For example, it may be worthwhile to separate out the larger droplets and re-circulate them rather than to inject them into the isothermal compressor, it may also be desirable to assist the gas flow into the mist generator with low pressure fans. The mist generator may also incorporate a mechanical device such as a rotating disc or rotating blades to break up the droplets into a fine mist.

Apart from the manner in which the liquid spray and atmospheric air are introduced into the compression chamber, the gas compressor shown in FIG. 7 operates in a exactly the same way as that described above with reference to FIG. 5.

Liquid-Driven Compressor

Liquid Piston Version

The embodiments of the compressors described above are all driven by hot compressed gas. An alternative method of driving the compression is to use a head of liquid. The kinetic energy storage means may conveniently be provided by a massive piston, whether solid, liquid or both, arranged to transfer the energy of the liquid into compression energy of the gas. An embodiment of a liquid piston isothermal compressor which operates in this way is shown in FIG. 8.

Figure 8:
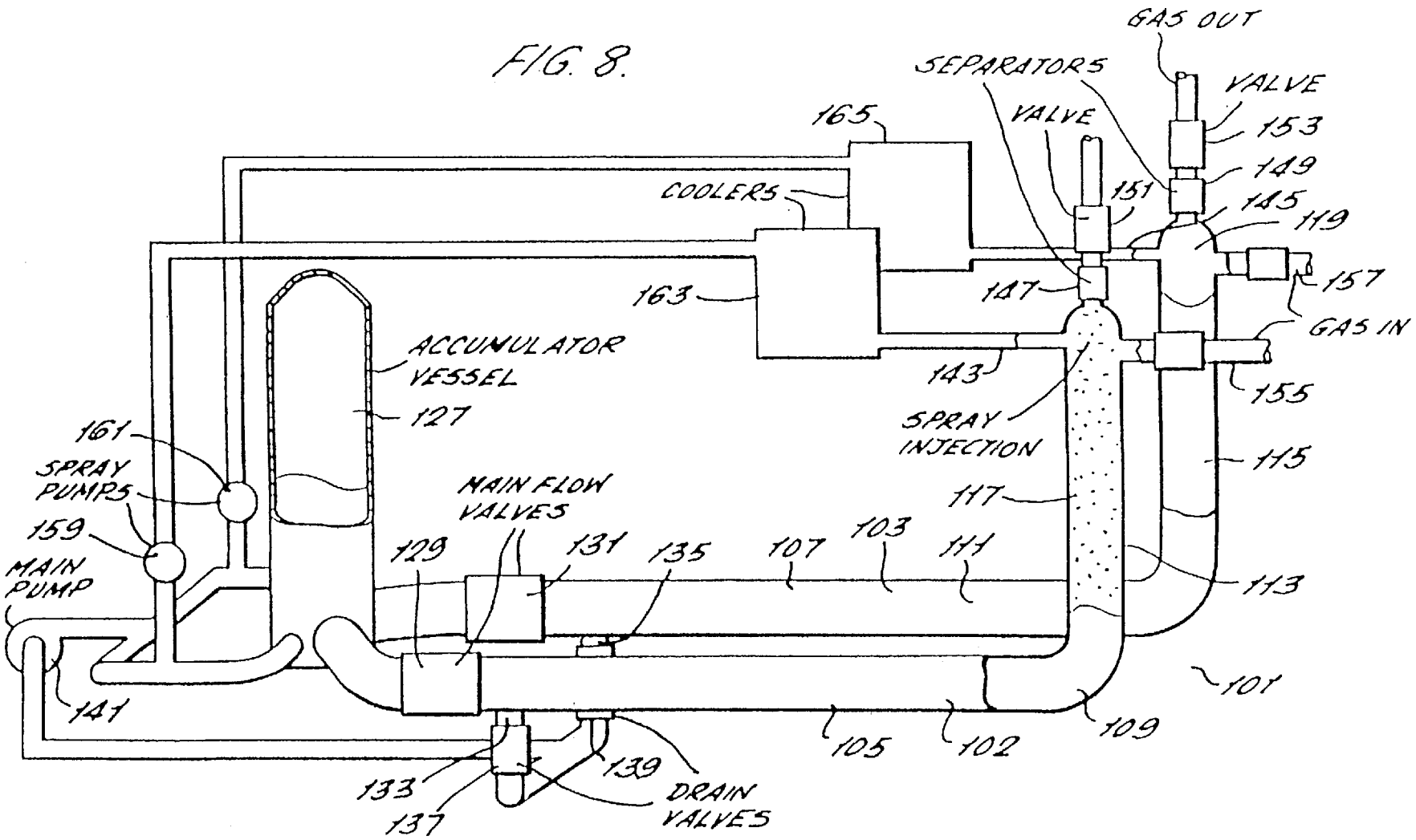
FIG. 8 shows an embodiment of a liquid driven compressor including a liquid piston.

Referring to FIG. 8, the isothermal compressor comprises two pipes 102 and 103, each having a horizontally disposed mid-section 105 and 107 and each containing a liquid piston 109 and 111. One of the end sections 113 and 115 of each pipe 102 and 103 extend vertically upwards and have chambers 117 and 119 respectively formed therein for gas to be compressed. The end section of each of the pipes 102 and 103 are formed as a single large vessel 127.

Main flow valves 129 and 131 are disposed in horizontal sections 105 and 107 of pipes 102 and 103 to control the flow of liquid from the accumulator 127. Outlet ports 133 and 135 are formed in the horizontal sections 105 and 107 between the main flow valves 129 and 131 and the vertical sections 113 and 115 of the pipes 102 and 103. Drain valves 137 and 139 are disposed in outlet ports 133 and 135 to control the flow of liquid draining from the pipes 102 and 103. A main pump 141 is connected between the outlet ports 133 and 135 and the accumulator 127 to re-charge the accumulator with liquid drained through outlet ports 133 and 135.

As before, liquid sprays are provided for each chamber 117 and 119 for cooling the compressed gas. Each chamber 117 and 119 is provided with a gas outlet port 147 and 149 each having a valve 151 and 153 to allow cold compressed gas to be drawn from each chamber 117 and 119. Each chamber has a gas inlet port 155 and 157 to admit gas from an appropriate source into each chamber.

In operation, the accumulator acts as a store of pressurised liquid to provide surges of flow to drive the liquid pistons 109 and 111. The timing of these surges is controlled by the main flow valves 129 and 131 situated in pipes 102 and 103. When a main flow valve is opened a surge of liquid flows through that valve and drives the liquid piston into the chamber and compresses the gas. At the same time, the spray associated with that chamber is activated to cool the gas during compression The compressed gas outlet valve opens when the pressure in the chamber reaches a predetermined value.

When the liquid piston reaches the top of its travel, the main flow valve closes and the drain valve opens. At the same time the gas outlet valve doses and the gas inlet valve opens allowing low pressure gas to take the place of the draining liquid. The draining liquid is re-circulated back to the accumulator by the main pump 141.

Preferably, the timing of operation of the liquid pistons 109 and 111 in each pipe is such that liquid is being returned to the accumulator from one pipe while liquid is flowing out of the accumulator into the other pipe. In a two pipe system, therefore, the liquid piston cycle in each pipe should be in antiphase. In general, the gas above the liquid level is compressed when the inflow exceeds the outflow and expands when the reverse is true. The aim is to minimise variations in the head and flow delivered by the pump 141, so that it can operate close to its best-efficiency point all the time. Preferably the volume of gas expands and contracts adiabatically. The accumulator is insulated to minimise heat losses when the accumulator gas is compressed. The accumulated gas is not connected to the gas being compressed and indeed there is no need for the composition of the two gases to be the same. Advantageously, the flow rate of liquid out of the accumulator is limited by the inertia of liquid piston which prevents too great a variation in the pressure of the gas in the accumulator.

The main flow valves 129 and 131 initiate the movement of the liquid piston. These control valves open when the liquid has been pumped out of the compression chamber. They shut when the liquid piston has reached its maximum point of travel in the compression chamber. The main control valves are a critical item of the liquid driven isothermal compressor. The pipe diameter may be quite large and yet it is important that the valves can open and close rapidly and frequently. The valves will need to hold back a pressure of perhaps eight bars. A further requirement is that the valves must offer a minimal flow resistance when open. A mitigating feature is that the valves only open or close when the liquid flow is reversing in direction and is momentarily at zero velocity. Although other valve designs might be possible for this duty the valve preferably comprises a set of louvres supported on a number of rods which traverse the cross-section of the pipe. The louvres would be profiled to minimise the flow resistance when they are aligned with the flow.

The drain valves 137 and 139 are arranged to open when the liquid piston reaches the maximum extent of its travel and to close when the compression chamber is drained. This means that the valves operate 180° out of phase from the main flow valves 129 and 131. The liquid drain valves are preferably of the same type as the main flow valves.

Spray pumps 159 and 161 are connected between the accumulator vessel and the sprays to supply liquid for the sprays. Preferably, coolers 163 and 165 are connected between the spray pumps 159 and 161 and the sprays to cool the liquid. The spray pumps may be of the positive-displacement type to ensure a constant flow while the pressure in the compression chamber is changing.

The main differences between the gas driven and liquid driven isothermal compressors thus far described are as follows. Although both types of compressor are based on the same physical principles, i.e., using a massive liquid and/or solid piston to perform isothermal compression, the main power is provided by different means. Comparing the liquid piston compressors, the gas-driven system does not have large valves immersed in the liquid in the main pipe-line. The frictional dissipation of the liquid piston is therefore minimised in the gas driven system. The embodiment of the gas-driven liquid piston compressor shown in FIG. 1 compresses two volumes of gas in each cycle of the liquid piston as compared with one volume of gas per cycle in the liquid driven compressor. The liquid-driven compressor normally requires a large pump as the main source of power while the gas-driven compressor requires a conventional gas compressor, such as that which might normally be attached to a gas turbine.

Although with reference to FIGS. 1, 2 and 8 the arms of the pipe forming the liquid piston are substantially vertical, and the pipe has been described as having a near horizontal mid-section, so that the pipe is shaped as a 'U', the arms may be inclined at any angle, and the 'U' may be broad, narrow, shallow or deep. Several 'U'-tubes may be joined so that one of the arms is shared between several tubes, as shown in FIG. 8 although this may apply equally to the gas-driven compressors shown in FIGS. 1 and 2. The pipe may have any cross sectional geometry, and in particular may be circular, oval, elliptical, triangular, square, rectangular, hexagonal, polygonal or irregular. The pipe may be of constant cross-section along its length or the cross-section may vary (e.g. both in area and/or geometry). Thus, the cross-sectional area of the compression chamber(s) may be larger or smaller than that part of the conduit forming the liquid piston. Advantageously, a conduit having a relatively small cross-sectional area may be less expensive and less complicated to construct. The length of the pipe can be between 10 and 500 meters in length and the diameter can be between 0.2 and 10 meters. However, these dimension, are indicative and values outside these ranges could be used for some applications. The pipe may be formed as a tunnel through the ground for the horizontal part of its length, or it may be laid in a trench or simply supported from the ground. However it is preferable to dimension the pipe to house a massive liquid piston so that energy may be stored as kinetic energy of the piston and also so that frictional losses due to the flow of liquid next to the surface of the pipe are kept to a minimum.

Instead of the liquid-driven isothermal compressor having two pipes and two liquid pistons, it could be made to operate with one or more than two pipes and liquid pistons. If a single pipe was used, the main pump would only need to operate for half the duration of a complete cycle of the liquid piston. This situation would be well served by a reciprocating pump comprising a mechanical piston which operated in phase with the liquid piston. Furthermore, the need for a drain valve in the outlet formed in the main pipe would be removed.

Alternatively, embodiments of the compressor having a liquid piston may include a mechanical solid piston disposed in the main pipe, and driven by some external means to drive the liquid piston. The solid piston would preferably oscillate back and forth in the horizontal section of the main pipe and there may be liquid pistons on either side of the solid piston.

Although, with reference to the liquid piston compressors, the liquid spray may be continuously re-circulated by drawing it from the large pipe and circulating it through an external cooler before it is injected into the gas as in the embodiments shown in FIGS. 1, 2 and 8, the liquid spray could be drawn from a large supply or reservoir. In this case, the liquid would be simultaneously drained from the large pipe to keep the inventory approximately constant.

The heat transferred between the spray and the gas may involve some evaporation of the vapour or it may not. This largely depends on the initial temperature of the droplets in the spray, the amount of heat absorbed by the droplets, and the time over which gas is being compressed.

Gas Turbine Plant With Combustion Chamber and Isothermal Compressor

Figure 9:
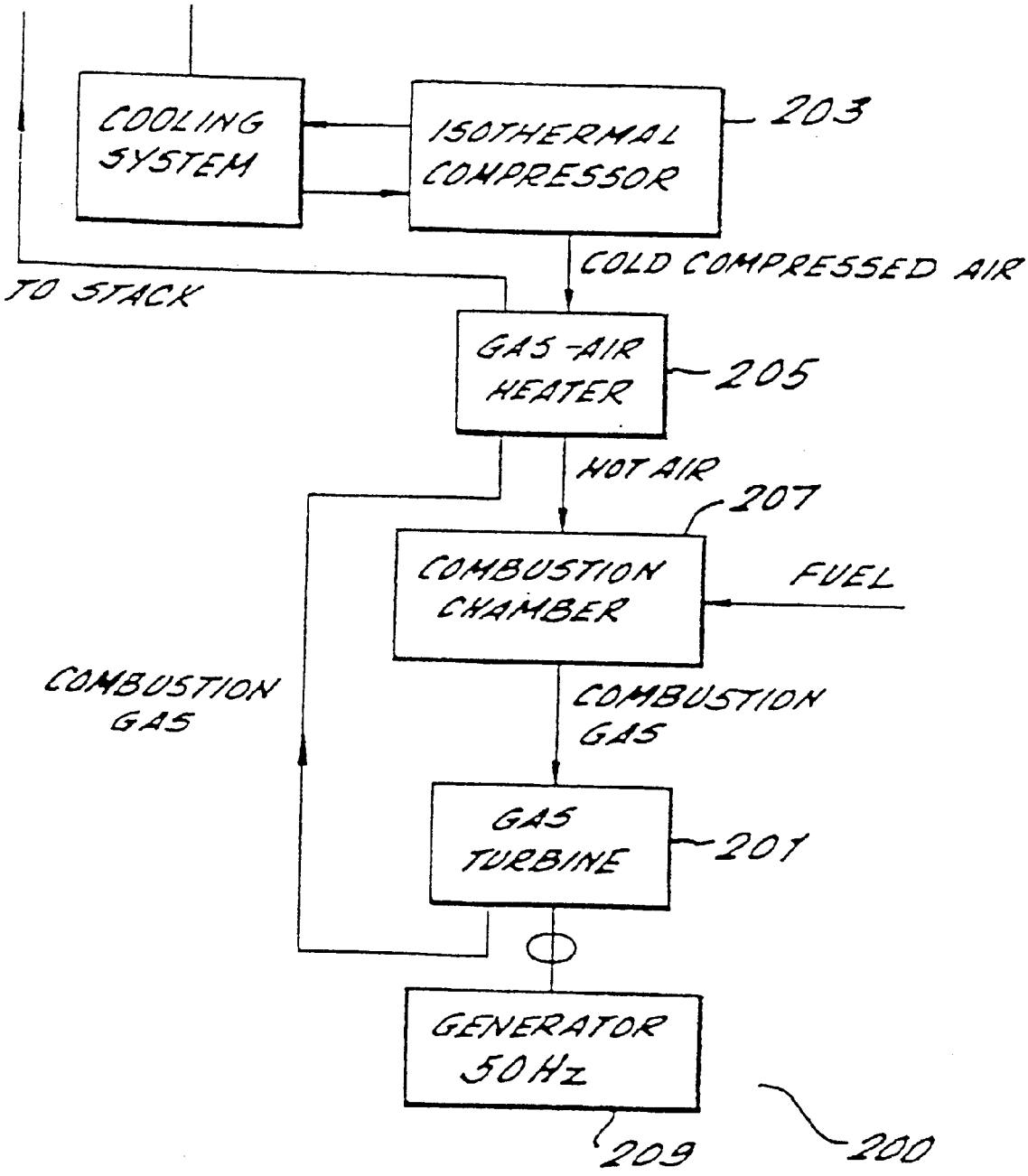
FIG. 9 shows in a block diagram an embodiment of a gas turbine plant including an isothermal compressor.

The main applications of the isothermal gas compressor are expected to be in the area of electricity generation. For example, the compressor might be used in association with a gas turbine. With reference to FIG. 9, a gas turbine plant, generally shown at 200 comprises a gas turbine 201, an isothermal compressor 203, a heat exchanger 205 to pre-heat the cold compressed gas using the hot low pressure gas leaving the gas turbine 201, and a main heater 207 to generate hot high pressure gas from the pre-heated compressed gas to drive the gas turbine 201. The gas turbine 201 is arranged to drive art electricity generator 209. The main heater 207 comprises a combustion chamber for burning fuel in the pre-heated pressurised gas, whereby the hot high pressure gas is combustion gas.

If the isothermal compressor comprises a gas compressor in accordance with the present invention, it will generally be driven by the gas turbine. For example, in the gas-driven compressor, the hot compressed gas may be provided by a conventional compressor. As described above, this type of isothermal compressor produces a larger mass of cold compressed gas than a conventional compressor for a given energy input. However in the liquid-driven isothermal compressor, the same mass of gas will be produced as in a conventional compressor but it will require less energy. Therefore, either less power from the gas turbine will be consumed in driving the compressor, or the energy to drive the isothermal compressor will be the same as for a conventional compressor except that a greater mass of gas will be produced for use in driving the gas turbine.

Because the exhaust heat from the gas turbine is used to pre-heat the inlet gas which will usually be air, there will be no need for a heat recovery steam generator and associated steam turbine which is required in the combined-cycle gas turbine and steam plant. Because a steam plant is not required, the constraints on a gas turbine plant imposed by the steam plant are removed. Therefore, the exhaust temperature from the gas turbine can be increased above the values appropriate to a steam-cycle and optimised to achieve the best performance of the gas-turbine. This could include the use of a gas-turbine with more than one combustion stage (i.e. gas turbine re-heat). Furthermore, a proportion of the cool compressed gas from the isothermal compressor can be used to increase the cooling of the gas turbine blades in order that a higher turbine inlet temperature can be achieved.

Any form of cooling system might be used with the cycle, such as wet, dry or hybrid cooling towers or direct cooling to the atmosphere or to a body of water such as the sea, river or lake.

Figure 10:
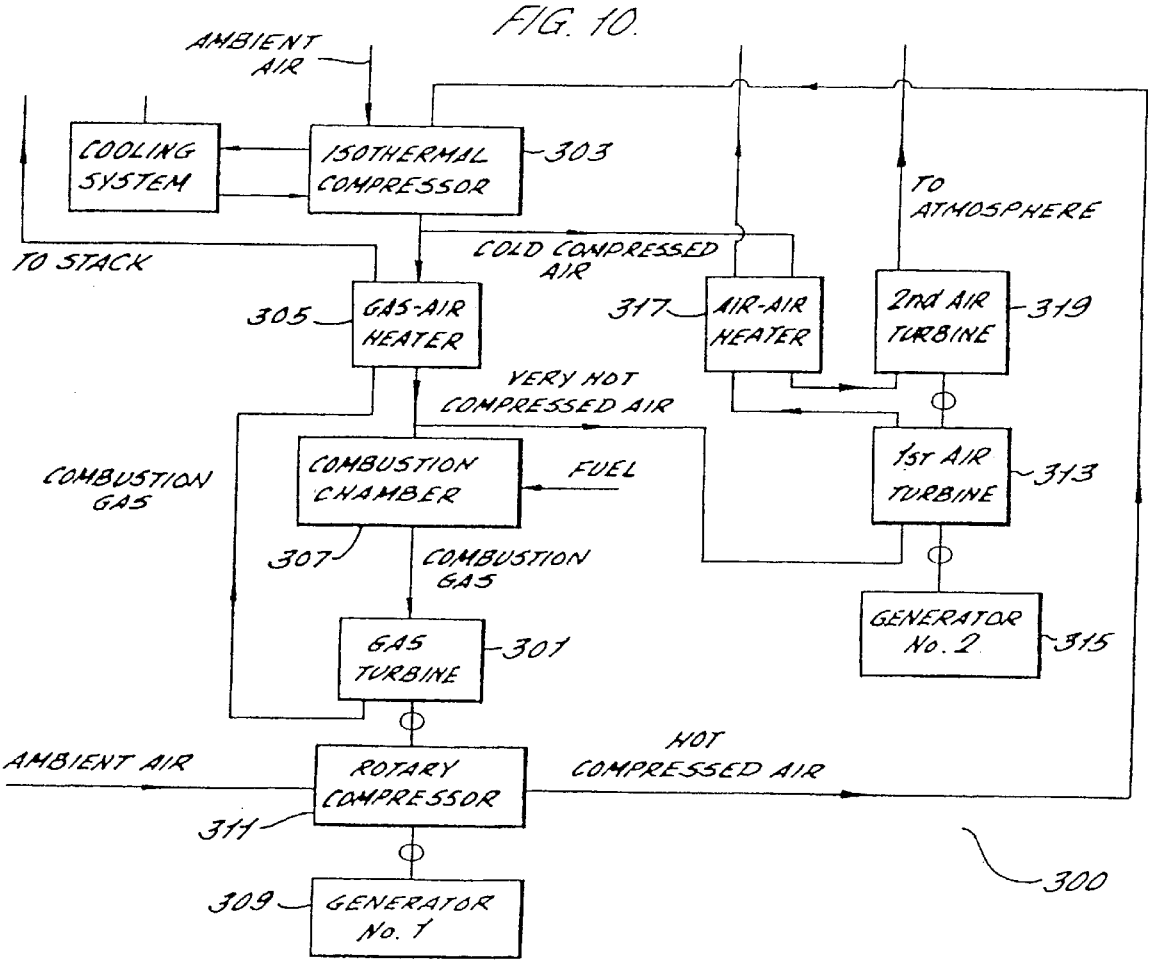
FIG. 10 shows in a block diagram another embodiment of a gas turbine plant incorporating an isothermal compressor.

In a case where die cold compressed gas is air and the hot high pressure gas is the gaseous product of combustion, there will generally be more heat available in the combustion gas than is needed to pre-heat the cold compressed air (by virtue of the differences in the heat capacity of the two gas streams). This excess heat may be used for another purpose such as to heat an additional flow of cold compressed air which is then expanded (without combustion of fuel) through one or more air turbines to generate more power, possibly using one or more auxiliary heat exchangers to achieve this. The additional air turbines and auxiliary heat exchangers would be much smaller than the main components of the system, since the flow through this part of the circuit would only be a fraction of the main flow. Alternatively, the additional heat from the combustion gas may be used to provide process heat, space beating or heat for some other external purpose. FIG. 10 shows a block diagram of a gas turbine plant 300 which implements the first of these alternatives.

Gas Turbine Plant and Auxiliary Air Turbines

A gas turbine plant 300 comprises a gas turbine 301 which drives a first generator 309, an isothermal compressor 303, a heat exchanger 305 for heating the cold compressed air from the compressor by the exhaust gas of the gas turbine 301. Most of the pre-heated compressed air is fed into the combustion chamber for burning with the fuel to provide combustion gas for the gas turbine 301, and a fraction of the pre-heated compressed air is fed to the input of a first air turbine 313 which drives a second generator 315. The exhaust air from air turbine 313 is passed through an air-to-air heat exchanger 317 to pre-heat a portion of cold compressed air from the isothermal, compressor to drive a second air turbine 319. In this embodiment of a gas turbine plant, the isothermal compressor is a gas driven compressor which is driven by a rotary compressor 311, driven by the gas turbine 301.

Air Turbine Plant and Isothermal Compressor

Figure 11:
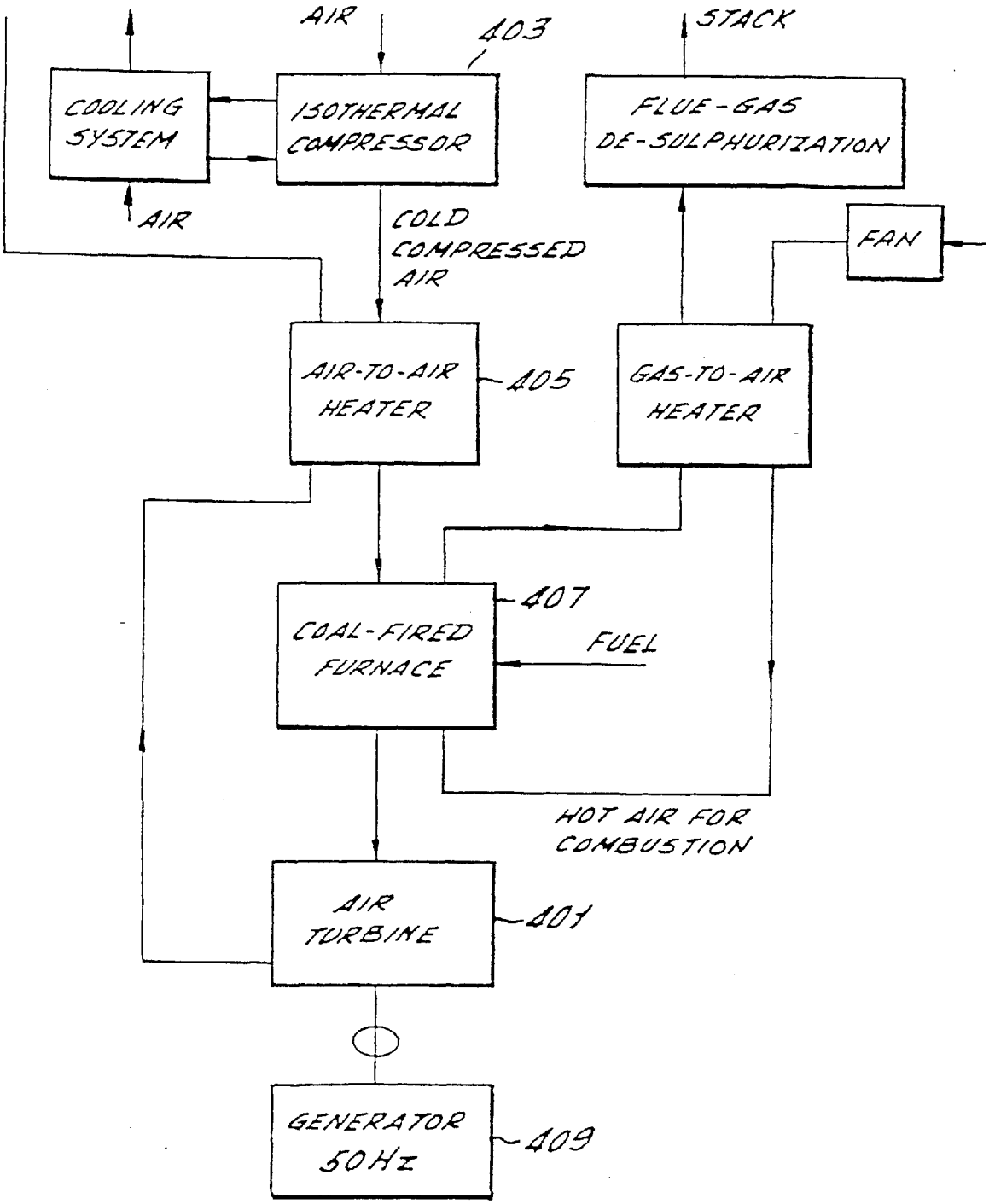
FIG. 11 shows an embodiment of a plant fired by coal or other fuel and incorporating an isothermal compressor and an air turbine.

Instead of the main heater 307 comprising a combustion chamber, it may comprise an external source of heat, which could be a coal or oil fired furnace, heat produced from a chemical or industrial process, a nuclear reactor or a solar furnace. FIG. 11 shows a block diagram of a gas turbine plant comprising an air turbine 401 and in which the main heater 407 is a coal-fired furnace. The arrangement is similar to that shown in FIG. 9 except that the cold compressed air from the isothermal compressor is pre-heated by exhaust air from the air turbine and the pre-heated air from the heat exchanger is heated by the main heater 407 and then expanded in the air turbine. This arrangement would be used in cases where it is undesirable for the combustion products from a combustion chamber to pass through the turbine. A very similar circuit would be used for heat sources (i.e. industrial, chemical, solar, nuclear, geothermal) where there are no combustion products. The essential difference would be that the coal fired furnace would be replaced by another kind of heat exchanger.

As for the gas turbine plant shown in FIG. 9, the externally heated cycle may incorporate re-heating stages during the expansion of the air in the turbine. A feature of any open or closed externally heated cycle, which does not have combustion products as the working fluid, is that the thermal capacity of the exhaust gas from the turbine is essentially the same as that of the inlet gas. Thus, there is no surplus heat which would otherwise be due to a difference in the heat capacity of the two gas streams, and therefore there are no additional turbines in this part of the circuit.

Figure 12:
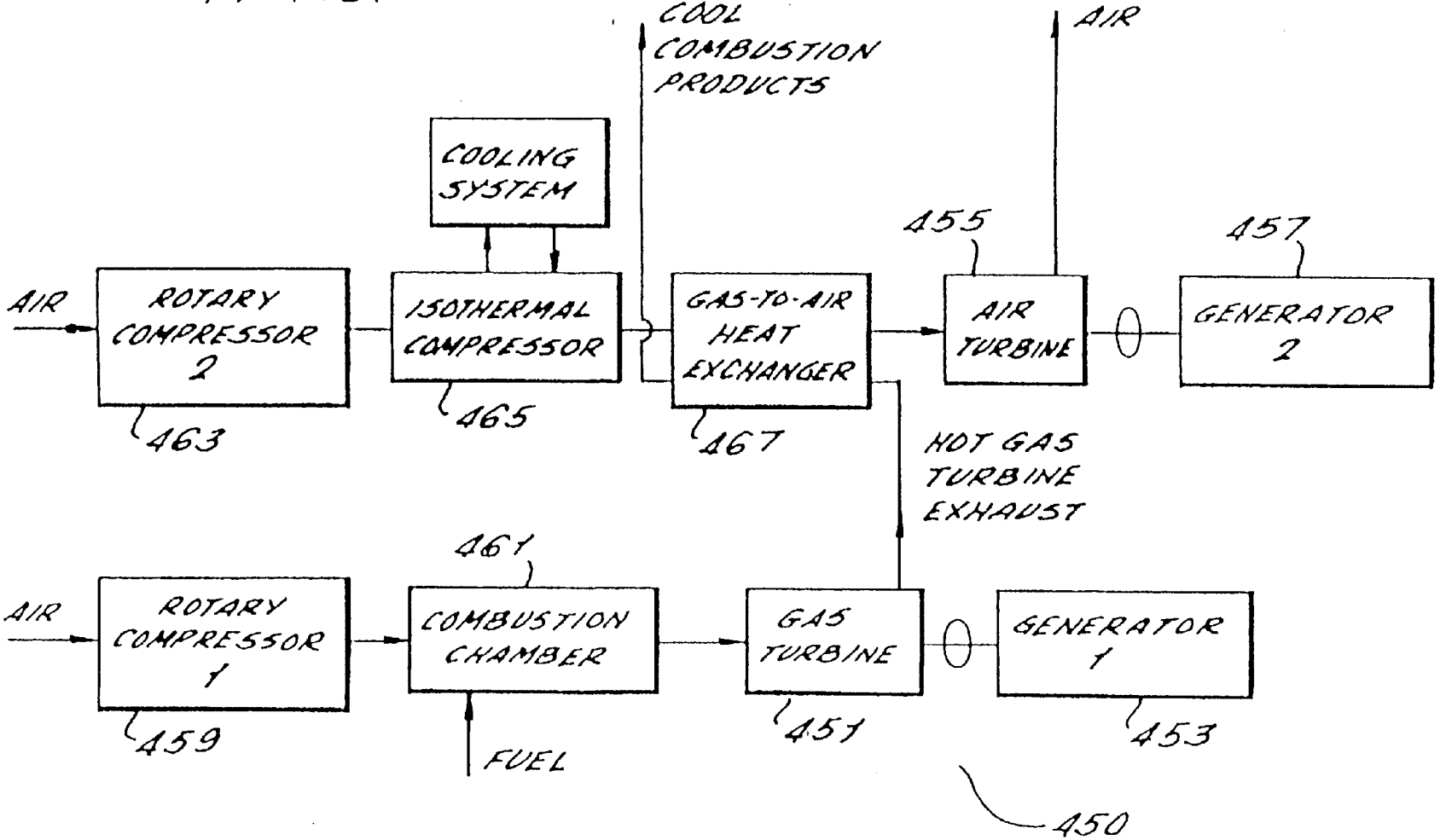
FIG. 12 shows in a block diagram another embodiment of a gas turbine plant including both a gas turbine and an air turbine.

FIG. 12 shows another embodiment of a gas turbine plant generally indicated at 450, which includes both a gas turbine 451 driving a first generator 453 and an air turbine 455 driving a second generator 457. Heat in the exhaust gas from the gas turbine 451 is recovered by heating a supply of cold compressed air which is then expanded through an air turbine 455. Because an air turbine is used at the final low temperature stage of the power generating cycle, the cycle is referred to as an air bottoming cycle.

Gas Turbine Plant With Air Bottoming Cycle

Referring to FIG. 12, hot compressed air from a first rotary compressor 459 is fed to a combustion chamber 461 for combustion with fuel. The combustion gas is then fed to the input of the gas turbine 451 which drives the first generator 453. Hot compressed air from the second conventional rotary compressor 463 is fed to an isothermal compressor 465 which may be a gas driven compressor of the kind described above and shown in any one of FIGS. 1 to 7. Cold compressed air from the isothermal compressor 465 is directed to a heat exchanger 467 in which the compressed air is heated with hot exhaust gas from the gas turbine 451. The hot compressed air from the heat exchanger 467 is fed to the input of the air turbine 455 which drives the second generator 457.

Although the air bottoming cycle with isothermal compressor may not be as efficient as the cycle illustrated in FIGS. 9 and 10, a significant advantage of this cycle is that the gas turbine used in the cycle could be one of those currently implemented in existing gas turbine plants. Therefore, this embodiment avoids the expense of new gas turbine development while also avoiding the capital costs of the steam plant used in a CCGT.

Energy Storage and Recovery Method

The isothermal compressor may be used for the storage of energy in the form of compressed gas such as air. Schemes already exist for storing energy in the form of compressed gas but the use of conventional compressors means that a significant fraction of the energy is dissipated as heat and cannot be recovered. If the air is compressed isothermally, less energy is consumed in the process of compression and a greater fraction of the original energy can be recovered. The cold compressed air could be stored in a suitable large cavity which can tolerate the imposed pressure without undue leakage. For example, a disused mine or oil well might be used for this purpose. An exhausted off-shore oil well would have the advantage that the sea would provide a natural external pressurisation which would inhibit leakage.

In general, to run the isothermal compressor as an isothermal expander, cool compressed gas from the storage vessel is introduced into the compression chamber and allowed to expand, driving the piston out of the chamber. As the gas expands, liquid is sprayed into the chamber to maintain the gas temperature constant or to increase the gas temperature. The pressure (and thermal) energy of the gas is converted into kinetic energy which is available to either a second piston to compress a body of gas in a second chamber or to the same piston to compress the gas on its return stroke into the compression chamber. The gas is compressed adiabatically so that its temperature is raised to the operating temperature of a turbine, e.g. about 300° C. for an air turbine.

Figure 13A:
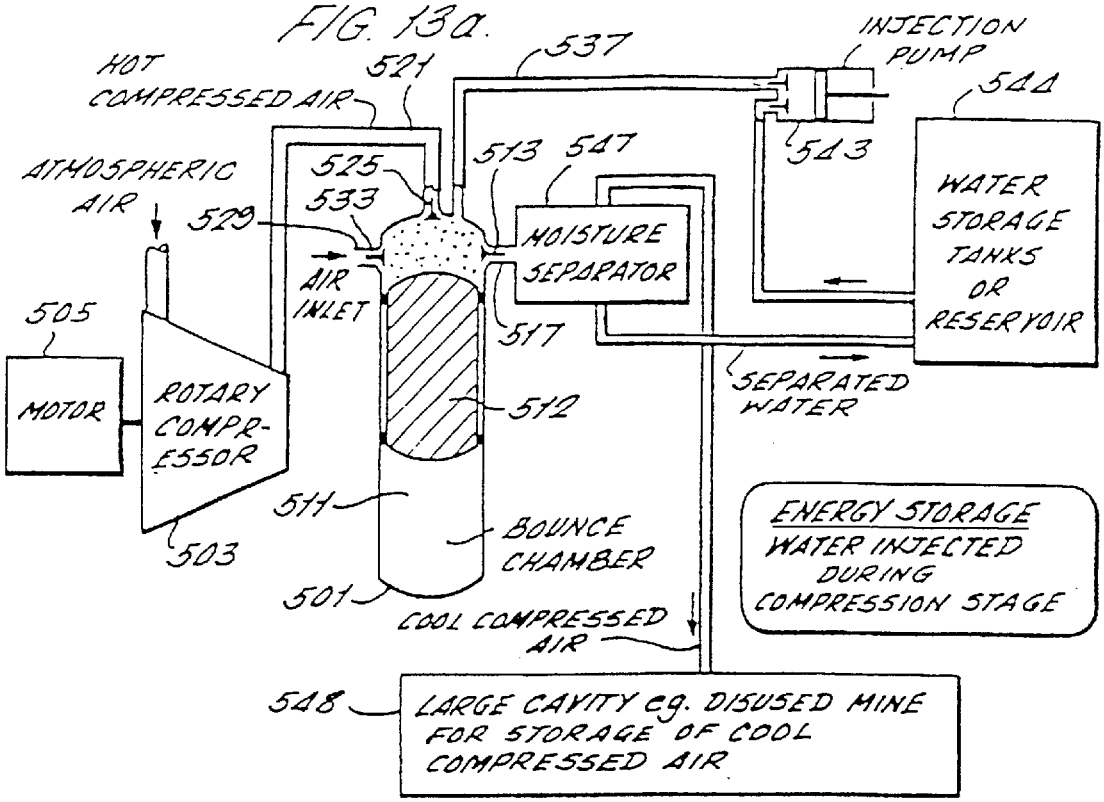
FIG. 13(a) shows an arrangement for storing cold compressed gas.

FIG. 13 shows an energy storage scheme in more detail in which the stored energy is recovered by running an isothermal compressor in reverse as an isothermal expander. Referring to FIG. 13*a*, the energy storage plant comprises an isothermal compressor 501, similar to that shown in FIG. 5 driven by a rotary compressor 503 which is itself driven by a motor 505. The compressor comprises an upper chamber 509 disposed vertically above a lower chamber 511, and a solid piston which is free to move vertically up and down, into and out of each chamber. The lower chamber 511 contains a sealed volume of gas and serves as an adiabatic bounce chamber, to drive the piston back into the compression chamber 509. The upper chamber 509 has a hot compressed, air inlet port 521, controlled by a valve 525 for admitting hot compressed air into the chamber from the rotary compressor. An air inlet port 529 controlled by a valve 533 is provided to admit an additional mass of low pressure air into the upper chamber 509 during outward movement of the piston 512. A compressed gas outlet port 513 controlled by a valve 517 is provided to allow compressed gas to be drawn from the chamber. The compressed gas outlet port 513 is connected via a moisture separator to a large cavity, for example a disused mine, for the storage of cool compressed air. The upper chamber 509 has a liquid spray injection port 537 through which liquid is sprayed into the chamber from an injection pump 543. Liquid is supplied to the spray injection pump from a suitable source, for example a reservoir, river, lake or storage tank 544 and is subsequently returned from the moisture separator to a water storage tank or reservoir 544. Spray liquid expelled from the compression chamber after compression will generally be at a temperature above ambient temperature, and the heat in the liquid may be stored for subsequent use during energy recovery. In this case it is preferable to thermally insulate the water storage tank to prevent heat leakage from the stored water to the surroundings.

Figure 13B:
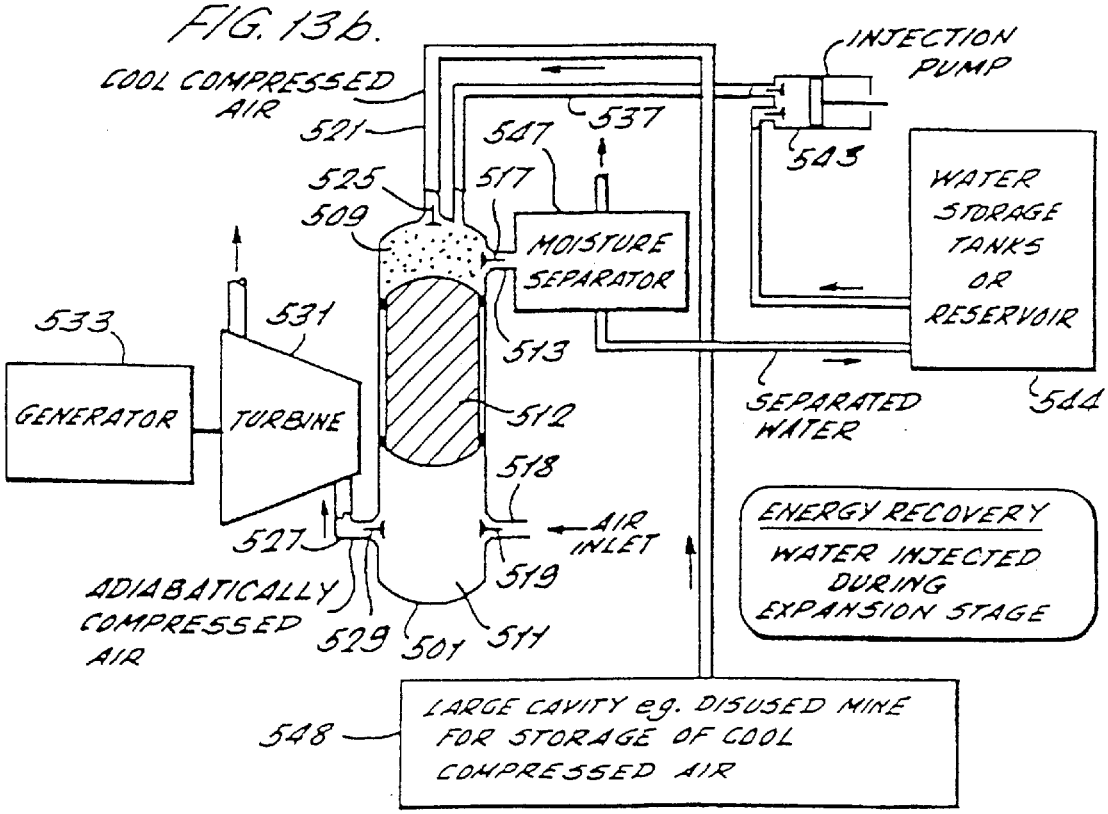
FIG. 13(b) shows an arrangement for recovering stored compressed gas to generate power.

FIG. 13*b* shows one possible scheme for recovering the energy from the stored compressed air, and includes an isothermal expander generally indicated at 501.

The isothermal, expander 501 comprises an upper chamber 509 disposed vertically above a lower chamber 511 and a solid piston 512 free to oscillate vertically into and out of each chamber. The upper chamber has a cool compressed gas inlet port 521 situated at the top of the chamber, controlled by a valve 525 and which is connected to the compressed gas storage vessel 548. The upper chamber also has a liquid spray injection port 537 connected to a water storage tank 544 via a liquid spray injection pump 543. A gas outlet port 513 controlled by a valve 517 is formed in the wall of the upper chamber some distance from the top and which is connected to a moisture separator 547.

The lower chamber 511 has a gas inlet port 518 controlled by a valve 519 to allow air to be drawn into the chamber, and a compressed gas outlet port 527 controlled by a valve 529 which is connected to the input of an air turbine 531. The gas inlet and outlet ports 517 and 527 are situated in the chamber walls some distance above the base of the lower chamber. The air turbine 531 is arranged to drive a generator 533.

A typical operating cycle of the energy recovery plant shown in FIG. 13*b* is as follows, beginning with the piston 512 at its maximum elevation in the upper chamber 509. At this point the lower chamber 511 contains a fresh volume of air to be compressed and both the inlet and outlet valves 519, 529 are closed.

As the piston momentarily comes to rest at the top of its stroke, the compressed gas inlet valve 525 opens to admit a fresh charge of cool compressed air from the compressed air storage vessel 548 into the upper chamber 509 through the gas inlet port 521. The compressed air then expands forcing the piston downward. At the same time warm water from the water storage tank 544 is injected into the upper chamber in the form of a spray. The liquid spray transfers heat to the compressed air as it expands to prevent the air cooling so that expansion may be approximately isothermal.

As the piston moves into the lower chamber, the air in the lower chamber is compressed adiabatically and when the air pressure reaches the desired value, the gas outlet valve 529 opens and hot compressed air flows out of the lower chamber and is expanded in the air turbine 531. As the piston 512 passes the gas inlet and outlet ports 518, 527 the residual air trapped in the chamber below the gas inlet and outlet ports is compressed adiabatically and serves as a temporary store for the remaining energy of the piston to return the piston to the top of its stroke in the upper chamber.

The piston momentarily comes to rest above the base of the lower chamber and is then driven upwards as the trapped hot compressed air expands. As the piston reverses direction, the gas outlet valve 517 in the upper chamber opens and the expanded air together with the spray liquid is expelled from the chamber through the moisture separator 547. The spray liquid is separated from the air and returned to the water storage tank 544 and the air from the moisture separator is expelled into the atmosphere. As the piston travels upwards past the air inlet port 518 in the lower chamber, the air inlet valve 519 opens and a fresh charge of air is drawn into the chamber for compression during the next cycle. The upward motion of the piston is stopped by the residual pocket of air trapped in the upper chamber when the piston passes the gas outlet port 513. Finally, the piston reaches the top of its stroke in the upper chamber to complete the cycle.

Although FIGS. 13*a* and *b* each show a single water storage vessel, the optimum storage method would be to have one or more insulated storage tanks which contained cold water that had been through the isothermal, expander and one or more insulated storage tanks for warm water which had been through the isothermal compressor. In the next storage and recovery cycle, the cold water would be used for isothermal compression and the warm water would be used for isothermal expansion.

The energy storage and recovery scheme illustrated in FIGS. 13*a* and 13*b* and described above does not require any fuel or external source of heat during the energy recovery process. The isothermal compressor and the isothermal expander may be one and the same unit modified as necessary according to its function (either as a compressor or an expander), or two separate units may be implemented, one specifically for compressing gas isothermally for energy storage and the other for expanding gas isothermally for energy recovery. Although isothermal expansion for energy recovery requires the input of heat to prevent the cooling of the air as it expands, this heat could be provided by a water supply at ambient temperature. If a heat source above ambient temperature is available. (eg. from an industrial process or from a cooling system of an existing power station) it would be possible to return more electrical energy than was originally stored.

An alternative approach to energy storage is to employ a cycle similar to those previously described and illustrated in FIGS. 9 to 11, but with the facility to store the cold compressed air. When the demand for power is low, the excess power is used to pressurise the cavity. When demand is high, cool air is drawn from the cavity and maximum power is delivered to the consumer.

Figure 14:
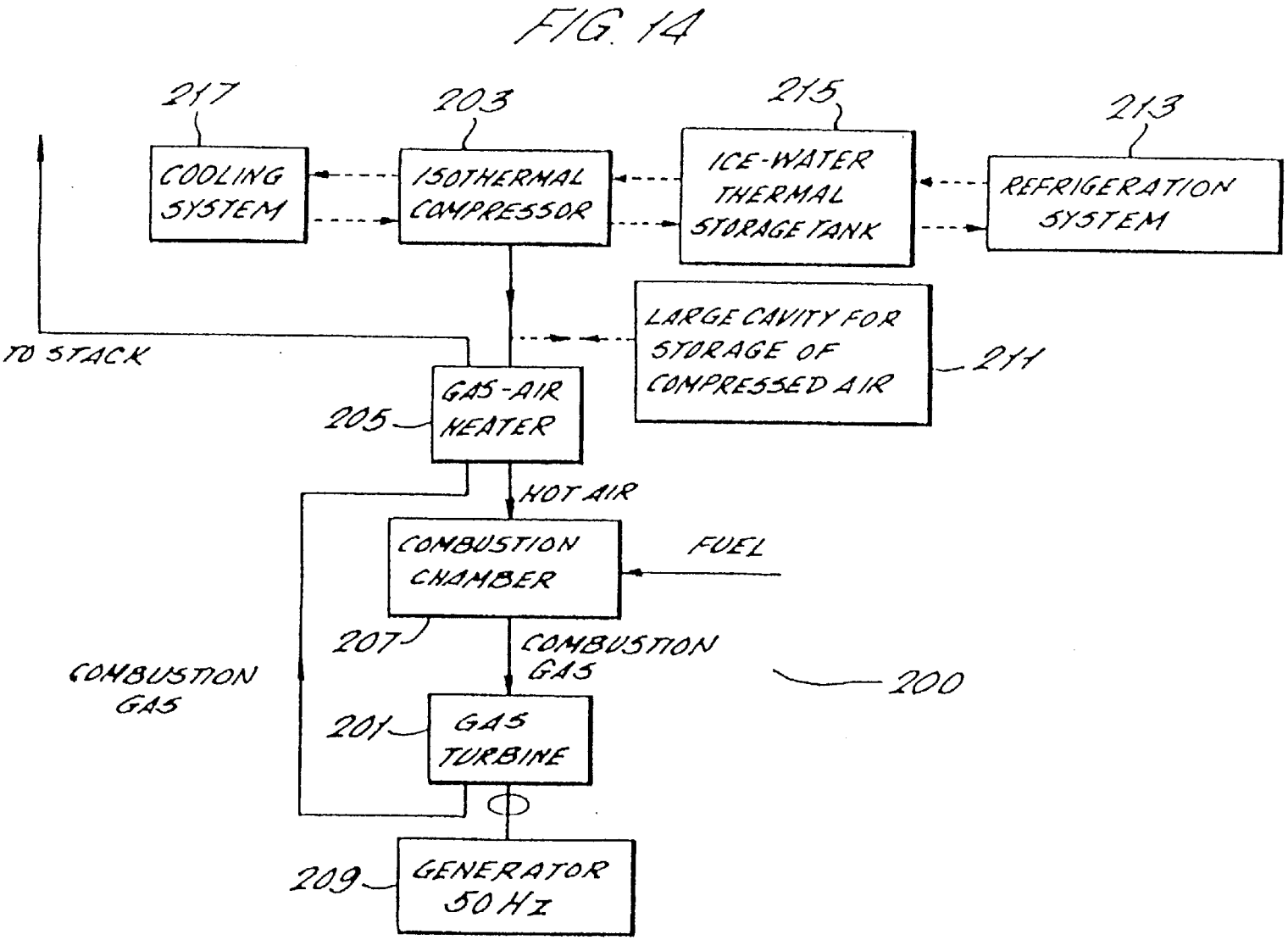
FIG. 14 shows a block diagram illustrating two arrangements for energy storage.

One possible energy storage recovery scheme implemented with the isothermal compressor and gas turbine plant described above in relation to FIG. 9, is shown in FIG. 14. The components of the gas turbine plant shown in FIG. 14 are exactly the same as those in FIG. 9 and like components are designated by like numerals. Two alternative energy storage schemes are shown in FIG. 14, one involving the storage of thermal energy as ice and the other involving the storage of energy in the form of cold compressed air, as described above. In the latter scheme, the output of the isothermal compressor is connected to a large cavity in which compressed air can be stored. At times of low power demand, more isothermal air is produced than is needed to drive the gas turbine plant, and this air is stored. At times of high power demand, the amount of isothermal air produced by the plant is reduced and the air is taken from the storage cavity. The attraction of an isothermal compressor energy storage system relative to conventional compressed air storage systems, is that as the air is compressed at the same temperature as it is stored, energy is not consumed in producing excess heat which would otherwise be wasted.

The second energy storage scheme shown in FIG. 14 includes a refrigeration system 213 connected to a storage tank for storing ice/water. The water from the storage tank 215 may be supplied to the isothermal compressor 203 for use in the spray during compression. The ice/water thermal storage system is an attractive option when there is a large difference between day time and night time temperatures. Typically at night, when the ambient temperature is low, but power demand is also low, the plant may be run at full capacity, with the excess power being used to drive the refrigeration system 213 to freeze water and store it as ice. The external spray water cooling system 217 would be fully utilised during this time. During the day when the power demand is high, the spray water cooling system 217 would be replaced or supplemented by cooling provided by the melting ice.

There are various industrial processes which involve the large scale compression of gases, including air. Examples for these are refrigeration and liquefaction. This is often used as a method of separating and purifying gases. The compression process is energy intensive. The isothermal compressor reduces the power consumption and could be used for refrigerating and/or liquefying a wide variety of gases.

THERMALLY POWERED GAS COMPRESSORS

Combustion-Driven Compressor

Figure 15:
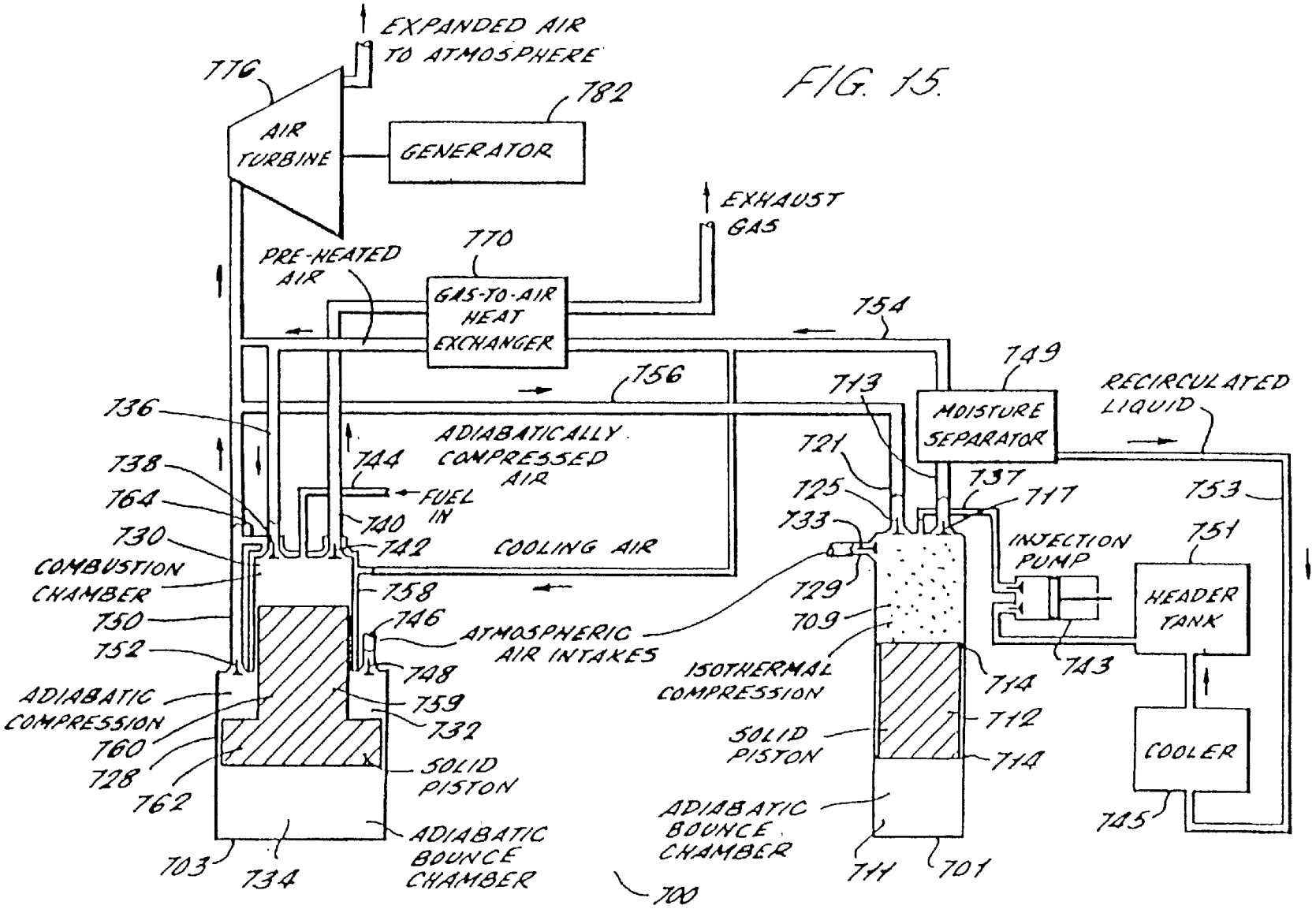
FIG. 15 shows an embodiment of a thermally powered compressor and additional plant for power generation.

FIG. 15 shows an embodiment of a thermally powered gas compressor implemented as a component in a power generating plant. Referring to FIG. 15, the compressor generally indicated at 700 comprises a gas compressor 701 driven by hot compressed gas and a combustion compressor 703 driven by combustion of fuel. The gas driven isothermal compressor 701 is very similar to the isothermal compressor described above with reference to FIG. 5 and like numerals incremented by 700 refer to like parts.

The combustion compressor 703 comprises an upper compartment 726 disposed above a lower compartment 728, each compartment being cylindrically symmetric. The diameter of the upper compartment 726 is less than that of the lower compartment and the compartments are substantially coaxially aligned. A combustion chamber 730 is formed in the upper compartment 726 and has a hot compressed gas inlet port 736 controlled by a valve 738, a fuel inlet port 744 and an exhaust gas outlet port 740 controlled by a valve 742. The hot compressed gas inlet port 736 is connected to the compressed gas outlet port of the gas driven isothermal compressor 701 via a gas-to-air heat exchanger 770, which preheats the cool compressed gas or air from the isothermal compressor 701 with exhaust gas from the combustion chamber 726.

The combustion compressor 703 further comprises an adiabatic compression chamber 732 formed in the upper part of the lower compartment 728, the compression chamber 732 having a gas inlet inlet port 746 controlled via valve 748 and a compressed gas outlet port 750 controlled by a valve 752 and which is connected to an air turbine 776 which drives a generator 782. An adiabatic compression/expansion or bounce chamber 734 is formed in the lower part of the lower compartment 728. The combustion compressor has a massive solid piston 759 consisting of an upper part 760 which is sized to the diameter of the upper compartment 726 and a lower part 762 sized to the diameter of the lower compartment 728.

The adiabatic bounce chamber 734 contains a sealed volume of air or other gas to provide means for converting the downwardly directed kinetic energy of the piston into upwardly directed kinetic energy thereby to drive the return stroke of the piston.

A cooling jacket 758 is formed around the combustion chamber walls and also over the head of the combustion chamber in which the gas inlet and outlet valves are situated, to provide circulation of cooling fluid to cool the combustion chamber walls. Conveniently, part of the cool compressed air from the isothermal compressor 701 provides the cooling fluid and is directed to the cooling jacket 758 after moisture has been removed from the compressed gas by the moisture separator 749. The cooling jacket 758 has an exit port 764 which is connected to the supply line connecting the compressed gas outlet port 750 in the adiabatic compression chamber 732 to the air turbine 776. Thus, the cool compressed gas directed to the cooling jacket recovers heat from the combustion chamber walls, and this energy is usefully converted into mechanical power by expanding the hot compressed gas leaving the cooling jacket in the air turbine 776.

The isothermal gas compressor 701 is driven by part of the hot compressed gas produced by the combustion compressor 703 in the adiabatic compression chamber 732. The function of the gas compressor 701 is to provide large quantities of cool compressed air or other oxidant at a temperature of, for example 40° C. The compressor 701 produces a significantly greater mass of compressed air than is required to drive it. Cool compressed air from the isothermal compressor 701 is heated and used to drive the combustion compressor 703. The function of the combustion compressor 703 is to produce large quantities of hot compressed air which may subsequently be used to drive a turbine for the purpose of generating electricity. As mentioned above, part of the hot compressed air produced by the combustion compressor is used to drive the isothermal compressor 701.

The cold compressed air outlet 713 of the isothermal compressor 701 is connected to the hot compressed air inlet port 736 of the combustion compressor 703 via the moisture separator 749 and a gas-to-air heat exchanger 770. The exhaust gas outlet port 740 of the combustion compressor is connected to the gas-to-air heat exchanger 770 so that heat from the hot exhaust gas leaving the combustion chamber is transferred to the cool compressed air from the isothermal compressor 701. The hot compressed air outlet port 750 of the combustion compressor is connected to the hot compressed air inlet port 721 of the isothermal compressor 701.

A typical operating cycle of the compressor shown in FIG. 15 will now be described starting at the point in time when the piston 712 is at the top of its stroke in the isothermal compression chamber 709 of the isothermal compressor 701. All the gas inlet and outlet valves in the isothermal compression chamber are closed.

As the piston 712 momentarily comes to rest, the hot compressed gas inlet valve 725 opens to admit hot compressed air from the combustion compressor 703 into the chamber 709 via the hot compressed gas inlet port 721. This drives the piston 712 downward from its highest position out of the chamber 709. When the piston reaches a predetermined position, the compressed gas inlet valve 725 closes and the air expands adiabatically and continues to drive the piston downwards. When the pressure of the air in the chamber 709 falls to some predetermined value, the gas inlet valve 733 opens and additional relatively low pressure air (i.e. atmospheric) is drawn into the chamber 709 on continued movement of the piston 712 out of the chamber 709. At this stage, the piston 712 continues its downward motion by virtue of its large inertia.

As the piston moves downward, it compresses the gas in the adiabatic bounce chamber 711 below, this compression being performed adiabatically. Eventually all the kinetic energy of the piston is transformed into energy of the gas in the bounce chamber 711 and the piston 712 momentarily comes to rest. At this point gas inlet valve 733 in the isothermal compression chamber closes.

The piston then reverses direction as the gas in the bounce chamber 711 begins to expand, driving the piston upwards. The piston 712 is driven back into the isothermal compression chamber, compressing the air contained therein, which comprises a mass of cool expanded air previously introduced through port 721 from the combustion compressor 703 and an additional mass of relatively low pressure air introduced through port 729. The initial compression is adiabatic, but when the air reaches the temperature of the available spray liquid, the liquid is injected into the compression chamber 709 through the spray injection port 737. The diameter of the droplets forming the liquid spray is typically about 0.4 mm which gives a large heat transfer area so that the temperature of the air is maintained below about 40° C. Without the spray, the temperature would reach over 300° C.

When the air pressure in the compression chamber 709 reaches the required value, the compressed gas outlet valve 717 opens and cool compressed air together with the spray liquid is drawn from the chamber through the gas outlet port 713. The mixture of cool compressed air and spray liquid is passed to the moisture separator 749 where the spray liquid is separated and returned via the return line 753 to the cooling system 745 in which it is cooled before being re-used in the spray.

Before the piston 712 reaches the top of its stroke, the compressed gas outlet valve 717 may close and the remaining kinetic energy of the piston may be partially absorbed by compressing the residual gas at the top of the chamber 709. As the piston 712 momentarily comes to rest in the chamber 709, the hot compressed gas inlet valve 725 opens and a fresh charge of hot compressed air from the combustion compressor 703 is admitted into the chamber 709 through the hot compressed gas inlet port 721. The piston is then driven downward by the expanding compressed air and the cycle is repeated.

The cool compressed gas from the compression chamber 709 of the isothermal compressor 701, having passed through the moisture separator 749 is then passed to the gas-to-air heat exchanger 770 in which it is heated by heat from the exhaust gases from the combustion compressor, from a temperature of, for example, about 40° C. to about 850° C. or more. This temperature is determined by the materials limitations on the heat exchanger 770 and the pipework from the heat exchanger to the combustion compressor.

Turning now to the combustion compressor 703, when the piston 759 momentarily comes to rest at the top of its stroke in the combustion chamber 730, the hot compressed gas inlet valve 738 opens and a predetermined mass of preheated air from the heat exchanger 770 is introduced into the chamber 730 through the hot compressed gas inlet port 736. The air inlet valve 738 then closes and a predetermined mass of fuel is injected into the chamber 730 through the fuel injection port 744. The fuel ignites and combustion takes place, driving the piston 759 downward and out of the combustion chamber 730 thereby imparting kinetic energy to the piston. The fuel is added in such a way that the gas pressure remains approximately constant during the fuel injection. When the required amount of fuel has been injected, fuel injection stops and the combustion gases expand approximately adiabatically from about 20 or 30 bars down to near atmospheric pressure.

During the constant pressure combustion phase, cool compressed air is injected into the cooling jacket 758 around the combustion chamber 730 to cool the combustion chamber walls.

As the piston 759 moves downward from its highest position, atmospheric air is drawn into the adiabatic compression chamber 732 through the gas inlet port 746. At the same time, the piston moves into the adiabatic bounce chamber 734 and begins to compress the sealed volume of gas. After the compressed gas inlet valve 738 has closed and the fuel injection into the combustion chamber has stopped, the combustion gases expand adiabatically and continue to impart kinetic energy to the piston 712. This energy is absorbed by the gas in the adiabatic bounce chamber 734 and eventually the piston comes momentarily to rest, at which point the gas inlet valve 748 in the adiabatic compression chamber 732 closes. The gas in the adiabatic bounce chamber 734 then begins to expand adiabatically driving the piston upward into both the adiabatic compression chamber 732 and the combustion chamber 730. As the piston moves into the combustion chamber 730, the hot combustion gases are expelled from the combustion chamber through the exhaust gas outlet port 740. As the piston moves upwards into the compression chamber 732, it compresses the air previously drawn into the chamber, adiabatically, so that the heat of compression increases the temperature of the air during this process to, for example, over 300° C. When the air in the adiabatic compression chamber 732 reaches the required pressure, e.g. the operating air inlet pressure of the air turbine, which may be between 20 and 30 bars, the hot compressed gas outlet valve 752 opens and the hot compressed gas leaves the compression chamber 732 via the gas outlet port 750. The piston 759 continues to the top of its stroke, whereupon the hot compressed gas outlet valve 752 closes.

Most of the hot compressed air is used to drive the main air turbine 776, but part of the compressed air is used to drive the isothermal compressor 701.

Because there is more heat available in the exhaust gases from the combustion compressor 703 than is required to heat the isothermally compressed air necessary to drive the combustion compressor, the surplus heat is used to heat additional air from the isothermal compressor and this preheated compressed air, having a temperature of about 850° C. or more is passed directly to the air turbine 776 in which it is expanded to produce additional power.

To maximise energy recovery from the hot exhaust gases, the thermally powered compressor should be designed so that the temperature and pressure of the compressed air leaving the gas-to-air heat exchanger 770 matches or nearly matches the temperature and pressure of the compressed air from the adiabatic compression chamber 732. This is possible by designing the compressor with a high compression ratio (for example between 25 and 40). The optimum compression ratio is determined by the ratio of the absolute combustion temperature to the absolute temperature of the exhaust gases as they leave the combustion chamber. In this case it is convenient to extract all the excess heat in a single expansion by simply adding the surplus air from the gas-to-air heat exchanger to the inflow of the air turbine. By recovering the excess heat in this way, advantageously the need for a separate small air turbine and associated generator is avoided and this will reduce the capital cost of the plant. The heat in the exhaust gas which is not required to pre-heat the cool compressed gas required for combustion, will usually be a small fraction (of the order of 12%) of the total available heat in the exhaust gas. However, in order to maximise the efficiency of the power plant it is important to recover all the surplus heat from any particular process. It will be appreciated that surplus exhaust heat from the combustion chamber can be recovered in a variety of ways, and that the appropriate method will be dependent on the design parameters (such as the gas compression ratio, the air inlet temperature to the combustion chamber and the temperature of combustion) of the particular compressor. For example, in some applications it may be appropriate to incorporate more than one auxiliary air or gas turbine and associated heat exchangers and power generators.

To start the compressor 700 from rest, requires external means to provide the initial energy to start the pistons moving, this may be done by providing a relatively small axial compressor to produce hot compressed air to start the isothermal compressor. Once the isothermal compressor is producing cool compressed air, this may be used to start the combustion compressor.

Although the operation of the isothermal compressor is dependent on the combustion compressor and vice versa, the relative phase between the operating cycle of the isothermal compressor and that of the combustion compressor is entirely arbitrary. Also, the operating frequency of the isothermal compressor can be different from that of the combustion compressor. In general, there will be a finite time interval between the output of cool compressed air from the isothermal compressor and the injection of preheated compressed air into the combustion compressor. Likewise, there will be a finite time interval between the output of hot compressed air from the combustion compressor and the injection of hot compressed air into the isothermal compressor. Thus, the system will have a finite time constant which can be varied depending on the characteristics of the components, for example, the length of pipework used for the passage of compressed gas between the compressors. The construction of the isothermal compressor may be changed to any of those described above in relation to FIGS. 1 to 4 or 6 or with modifications apparent to those skilled in the art.

Furthermore, the combustion compressor may also have a construction similar to that of any of the isothermal compressors described herein and with modifications apparent to those skilled in the art. For example, the combustion compressor may comprise a composite solid/liquid piston arranged in a U-shaped conduit, similar to that described above in relation to FIG. 2, and the operation of the combustion compressor may be symmetric, so that is produces hot compressed air twice per cycle.

COMBUSTION-DRIVEN COMPRESSOR

Solid Piston - Asymmetric

In another embodiment of the thermally powered compressor, both the adiabatic and isothermal compression processes may be directly driven by combustion of fuel via a single massive piston.

A chamber on one side of the piston may serve as a combustion chamber in which a mixture of fuel and air or other oxidant are ignited producing high temperature combustion gas to impart kinetic energy to the piston. A chamber on the other side of the piston contains gas to be compressed, which may subsequently be used to drive a turbine. Because the combustion gas will generally be at a much higher temperature than the gas from a rotary compressor, much greater energy will be imparted to the piston, provided the gas is allowed to expand fully, enabling a greater quantity of gas to be compressed in the compression chamber. The air or other oxidant used for the combustion of fuel may itself be compressed in a part of the compression chamber. The air/oxidant may be cooled during compression using a liquid spray, in order to minimise the work of compression. Advantageously, a heat exchanger can be arranged to preheat at least part of the cool compressed gas with hot exhaust gas from the combustion changer, and part of this preheated gas can be admitted to the combustion chamber for combustion with a suitable fuel.

Part of the gas in the compression chamber may be compressed adiabatically and fed directly to drive a gas turbine. The compressed gas may, for example, be air to drive an air tube, which operates at a relatively low temperature and whose exhaust gas is very close to the ambient temperature of the atmosphere. Thus, the combination of a gas compressor driven by combustion gas at extremely high temperatures enabling the thermal energy to be converted into the compression energy of a large volume of compressed air, and an air turbine driven by the compressed air which rejects heat at relatively low temperatures, can be regarded as a heat engine whose operation approaches that of the ideal Carnot cycle which has an efficiency $\eta$ given by $$\eta=1-t_1/t_2,$$

where $t_1$ is the temperature at which heat is rejected and $t_2$ is the temperature at which heat is absorbed.

The piston may be arranged to move up and down or alternatively back and forth in a horizontal plane. An embodiment in which a solid piston is arranged to oscillate vertically up and down between adjacent upper compression chambers and a lower combustion chamber is shown in FIG. 16 as a component in an electricity generating plant.

Figure 16:
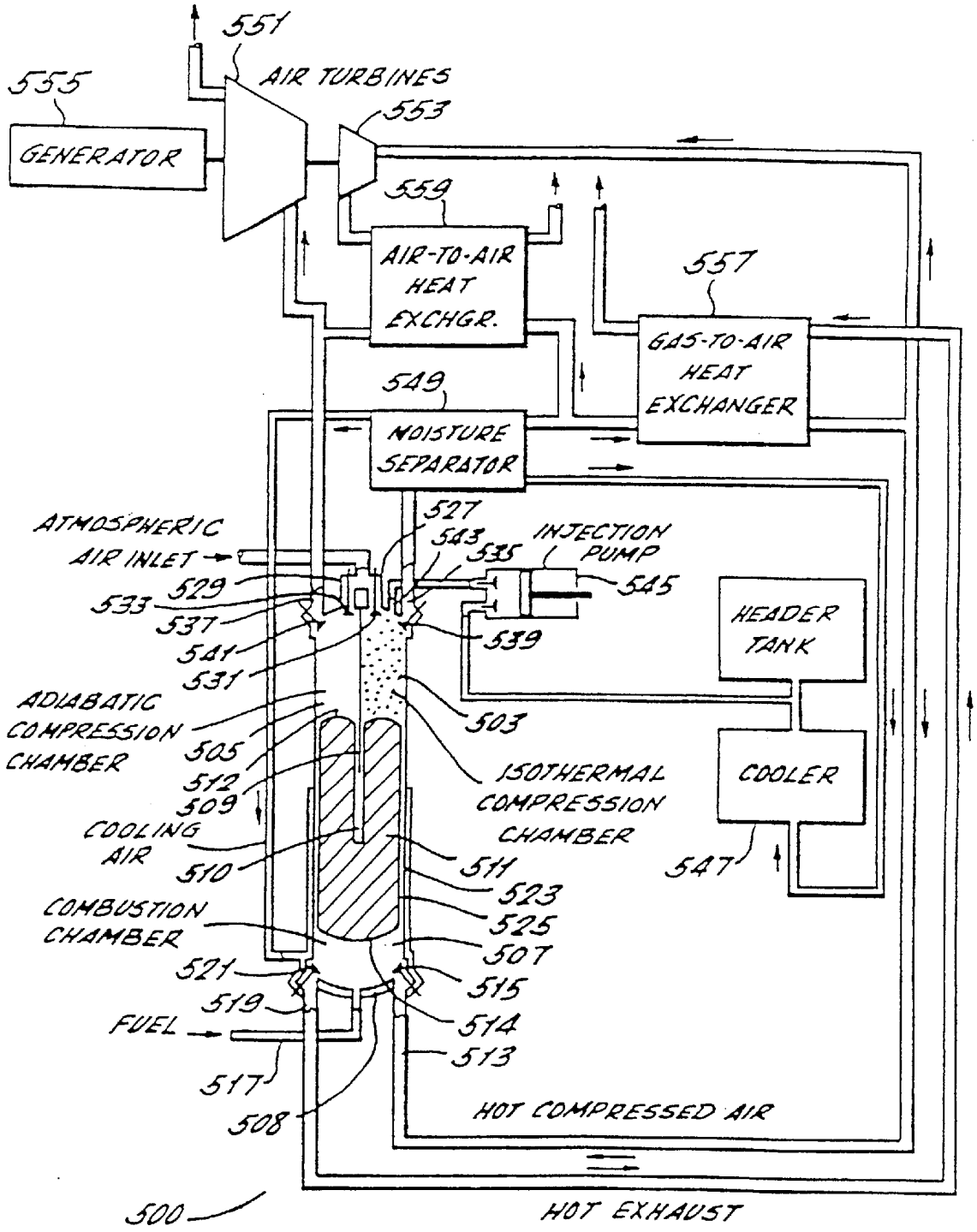
FIG. 16 shows another embodiment of a thermally powered compressor and additional plant for power generation.

Referring to FIG. 16, the thermally powered compressor, generally indicated at 500, comprises an isothermal compression chamber 503 and an adjacent adiabatic compression chamber 505 both arranged above a combustion chamber 507. The compression chambers 503, 505 are separated by a vertical baffle 509 which extends downward from the tap of each chamber. A piston 511 comprising a solid material has a slot 510 formed therein which extends from the top 512 of the piston 511 downwards to accommodate the vertical baffle 509 so that the piston is free to move up and down, into and out of the isothermal and adiabatic compression chambers 503, 505.

The combustion chamber 507 has a hot compressed air inlet port 513 controlled by a hot compressed air inlet valve 515 for the injection of hot compressed air into the chamber, a fuel injection port 517 and a exhaust gas outlet port 519 controlled by an exhaust gas outlet valve 521 to allow hot exhaust gases to be expelled from the chamber 507. The combustion chamber is surrounded by a cooling jacket 522 through which cooling air may be circulated to cool the combustion chamber walls 525. Each of the isothermal and adiabatic compression chambers 503, 505 has an air inlet port 527, 529 controlled by a valve 531, 533 to allow air to be drawn into each chamber, and a compressed air outlet port 535, 537 controlled by a compressed air outlet valve 539, 541 to allow compressed air to be drawn from each chamber. The isothermal compression chamber 503 also has a liquid spray injection port 543 for the injection of a cool liquid spray. The spray is injected by means of a pump 545 which draws spray liquid from a cooling system 547.

The compressed air outlet port 535 of the isothermal compression chamber 503 is connected to a moisture separator 549 in which spray liquid, entrained in the compressed air, is separated. The compressed air outlet port 537 of the adiabatic compression chamber 505 is connected to the input of a main air turbine 551 which, together with a second air turbine 553, drives an electricity generator 555.

Cool compressed air from the moisture separator 519 is directed three ways. Part of the air is passed to the gas-to-air heat exchanger 557 in which it is heated with heat from the exhaust gases from the combustion chamber 507. Part of the cool compressed air from the moisture separator 549 is passed to the cooling jacket 523 of the combustion chamber 507 to effect cooling of the combustion chamber walls 525. Another part of the cool compressed air from the moisture separator is passed to an air-to-air heat exchanger 559 in which it is pre-heated with exhaust air from the second air turbine 553 to be passed to the input of the main air turbine 551 along with the main flow of hot compressed air from the adiabatic compression chamber 505.

A typical operating cycle of the compressor 500 will now be described beginning with the piston 511 momentarily at rest just above the base 508 of the combustion chamber 507 and supported by a pocket of compressed air in the combustion chamber. Each of the adiabatic and isothermal compression chambers 503, 505 contain air drawn in through their respective gas inlet ports 529, 527 during the previous part of the cycle, and their respective gas inlet valves 533, 535 and gas outlet valves 539, 541 are now closed.

After the piston comes to rest in the combustion chamber 507, the piston may reverse its motion as the trapped air begins to expand adiabatically. Simultaneously, the hot compressed gas inlet valve 515 opens and a charge of hot compressed air is introduced into the chamber through the compressed gas inlet port 513. Fuel is injected into the chamber through fuel injection port 517 mixes with the hot inlet air and ignites producing combustion gas at temperatures in excess of 2000° C. The combustion gas then expands at constant pressure, driving the piston upward and out of the combustion chamber.

If the fuel is natural gas this will ignite spontaneously if the air temperature is above about 550° C. External ignition will be needed if the air is heated to a lower temperature, for example in start up. Some fuels may require ignition on every cycle even when the air temperature is very high. The rate of fuel injection is controlled so that the pressure in the combustion chamber 507 remains approximately constant. The advantage of this is that the peak pressures achieved in the vessel are quite moderate. This avoids the need for very thick pressure vessel walls and limits the noise and vibration during operation. The penalty is a small reduction in efficiency.

The pressure in the combustion chamber remains approximately constant during the combustion stage. At the same time, the piston 511 starts to compress the air contained in the isothermal and adiabatic compression chambers 503, 505. During compression of the air in the isothermal compression chamber, a liquid spray is injected into the chamber to cool the gas and to absorb the heat of compression. Injection of the liquid spray into the chamber may commence when the temperature of the air in the compression chamber reaches the temperature of the spray liquid. The spray liquid may be injected at a constant rate. At a certain point during the upward travel of the piston 511, the compressed air inlet valve 515 in the combustion chamber is closed and the fuel injection stopped. This may be when predetermined amount of fuel has been injected. Thereafter, the combustion gases expand adiabatically down to perhaps atmospheric pressure. The expansion of the combustion gases does work on the piston 511 which gains kinetic and potential energy as a result, and continues its motion to the top of its stroke in each of the compression chambers 503, 505.

When the pressure of the compressed air in the adiabatic compression chamber 505 reaches the required value, the compressed gas outlet valve 541 opens and hot compressed gas flows out of the chamber through the compressed gas outlet port 537. The hot compressed gas is then directed to the input of the main air turbine 551 in which it expands, producing mechanical power to drive the generator 555. Preferably the inlet temperature of the main air turbine and the outlet temperature of adiabatically compressed air from the compressor are matched. The temperature of exhaust air from the main air turbine is close to the ambient temperature of the atmosphere.

When the pressure of air in the isothermal compression chamber 503 reaches the required value, the compressed gas outlet valve 539 opens and cool compressed air along with the spray liquid is drawn out of the chamber through the compressed gas outlet port 535 and passes into the moisture separator 549, in which the spray liquid is separated from the compressed air. The spray liquid from the moisture separator is then circulated through the cooling system 547 before being re-used in the spray.

Part of the cool compressed air is passed from the moisture separator 549 to the gas-to-air heat exchanger 557 in which it is pre-heated with heat from the exhaust gases expelled from the combustion chamber during a previous part of the cycle. Some of the pre-heated compressed air leaving the gas-to-air heat exchanger 557 is directed to the combustion chamber 507 and some is directed to the input of the second air turbine 553 in which is expands producing mechanical power to drive the generator 555.

Some of the cool compressed air from the moisture separator 549 is passed through the air-to-air heat exchanger 559 in which it is heated with exhaust air from the second air turbine 553 and then this pre-heated compressed air is directed to the main air turbine 551 to supplement the main flow of hot compressed air from the adiabatic compression chamber 505.

Cool compressed air from the moisture separator 549 is also directed to the cooling jacket 523 surrounding the combustion chamber to cool the combustion chamber walls. Some of this cooling air may also be used to cool the piston head 514 in the combustion chamber. This may be achieved by forming a plurality of holes in the combustion chamber walls through which air can flow from the cooling jacket 523. Holes or slots are formed in the sides of the piston which correspond in position to the holes in the chamber walls. The inside of the piston is designed to allow air to flow from the slots or holes to the piston head to effect cooling thereof. Alternatively, passages may be formed in the piston which allow a direct, but restricted flow of air from one or both of the compression chambers to the piston head 514.

The cooling air eventually passes from the cooling jacket 523 into the combustion chamber through holes in the combustion chamber walls. The air also circulates through air passages formed in the base 508 of the combustion chamber 507 to cool the base, the valves and the valve seats. Alternatively the equipment can be designed so that the cooling air does not enter the combustion chamber but is added to the air flowing to the main air turbine. This allows a more efficient recovery of the heat given to the cooling air.

When the piston 511 has reached the top of its stroke, the compressed gas outlet valve 539, 541 in each of the compression chambers 503, 505 closes, so that some of the compressed air remains in each chamber. The piston 511 reverses direction under the influence of gravity and by virtue of the expansion of the trapped compressed air and begins to move out of the compression chambers and into the combustion chamber 507. When the pressure in the compression chambers reaches the pressure of the inlet air, the respective gas inlet valves 527, 533 open and air is drawn into the chambers through a respective gas inlet port 535, 537.

When the pressure of the combustion gases in the combustion chamber reaches a value sufficient to push the gases through the gas-to-air heat exchanger 557 and eventually out into the atmosphere, the exhaust valve 521 opens, and the exhaust gases are expelled from the combustion chamber through the exhaust gas outlet port 519. Low pressure cooling air may be circulated around the combustion chamber jacket and introduced into the combustion chamber during this part of the cycle. The air admitted into the combustion chamber will serve to displace and flush out the remaining exhaust gas. The low pressure cooling air may be provided by fans drawing air directly from the atmosphere.

Before the piston 511 reaches the base of the combustion chamber 508 and before all the cooling air is forced out of the combustion chamber 507, the exhaust valve 521 closes, and the remaining air and any exhaust gases are compressed adiabatically, retarding the piston and eventually bringing the piston 511 to rest just above the base of the combustion chamber. The timing of the closure of the exhaust valve 521, is such that the pressure in the combustion chamber at the point of piston reversal is approximately equal to the pressure of the hot compressed air delivered by the heat exchanger at the start of the combustion stage.

As the piston comes to rest in the combustion chamber, the gas inlet valves 527, 529 in the compression chambers 503, 505 close. The hot compressed gas inlet valve 515 in the combustion chamber opens and a predetermined amount of hot compressed air from the gas-to-air heat exchanger 557 is introduced into the combustion chamber. Fuel is injected into the chamber through the fuel injection port 517, the fuel ignites and the resulting combustion of the fuel/hot compressed air mixture drives the piston 511 upward, to start the next cycle.

With reference to FIG. 16, the additional air turbine 553 and the air-to-air heat exchanger 559 are provided to maximise the recovery of heat from the hot gases leaving the combustion chamber 507. In general, there is more heat in the exhaust gases than is needed to heat the incoming compressed combustion air. The excess heat is used to heat more compressed air which is diverted to the second smaller air turbine 553, which operates at a higher inlet temperature than the main air turbine 551. The outlet air from the second air turbine 553 is still hot enough for additional heat recovery. This heat is transferred in a small heat exchanger 559 to a separate stream of cool compressed air. The system can be designed in such a way that the resulting hot compressed air is at a suitable temperature and pressure for the expansion in the main air turbine, in which case this flow can be added to the main flow of adiabatically compressed air.

A range of moisture separator designs are available, most of which have been used for many years in the power generation industries and elsewhere. Common examples are cyclone separators, axial swirl vane separators and corrugated plate separators. However, whichever separator is used, it is important that the pressure loss due to the separator is minimised, since this will affect the efficiency of the compressor.

The heat exchangers are a critical component of the system because of the high temperatures of the exhaust gases. Indeed the exhaust temperature will be one of the critical parameters which determines the design as the whole system. There will be a pressure difference of at least 10 bars across the walls of the heat exchanger. This implies that a rotary regenerative heat exchanger would not be a suitable choice on account of the sealing difficulties with such a pressure difference. A valve regenerator could be used but there would still be substantial cross-leakage of flow from the high to the low pressure as a consequence of the volumetric capacity involved. Therefore, the best choice is probably a counter-current recuperative heat exchanger. To keep the costs to a minimum, it would be possible to have different materials for the high and low temperature parts of the exchanger.

A facility for the periodic cleaning of the heat exchanger surfaces will be needed. This would probably be done when the system is off load, but an on load cleaning system might be considered.

With reference to FIG. 16, the gas to air heat exchanger 557 must have the capacity to either store heat from the hot exhaust gas or to store the compressed gas since the production of exhaust and compressed gas does not happen simultaneously but is separated by a time interval equal to half the period of one complete cycle of the liquid piston.

Furthermore, the thermally powered compressor shown in FIG. 16 whose power is extracted by compressing adiabatically a large volume of gas to be expanded through an air turbine, only provides compressed air at discrete time intervals, which would normally be a few seconds apart. However the power turbine requires an approximately continuous flow of compressed air. This mismatch between the timing of the air flows in the different parts of the system can be overcome by the use of accumulator vessels (not shown) which store the air temporarily. However, in large installations the need for accumulator vessels can be avoided by providing several compressor units (perhaps about 8 or 12 of them) manifolded together in a convenient way. A similar manifolding option would exist in relation to the gas-to-air heat exchanger, though in this case it may be advantageous to have a smaller group of compressors (perhaps 4) linked to one of the main gas to air heat exchangers.

The use of manifolding as an alternative to accumulator vessels implies the need for controlled phasing of the compressor units. This can be achieved by a microprocessor control of the air and combustion gas valves.

The embodiment of the thermally powered compressor shown in FIG. 16 has a combustion chamber on one side of the piston and both adiabatic and isothermal compression chambers on the other side of the piston. Combustion and subsequent expansion of the combustion gases impart kinetic energy to the piston which then moves into the compression chambers to compress the gas contained therein. After the gas has been compressed and drawn from each of the compression chambers, the piston reverses direction and moves back into the combustion chamber. The return motion of the piston is driven by gravity and the expansion of any compressed gas remaining in the compression chambers. The forward and return strokes of the piston are driven by different mechanisms and gas is compressed on movement of the piston in one direction only. This embodiment is therefore an asymmetric device.

It is important that the downward return stroke of the piston occurs at a reasonable speed and this is achieved by arranging for the entire mass of the piston to travel in the direction of the restoring force applied by gravity over the entire period of the return stroke. Thus, the maximum restoring force due to gravity is applied to the piston during the return motion, which implies a maximum downward acceleration of about 1 g. The downward acceleration may be increased further by expanding residual air or other gas in at least one of the adiabatic and isothermal compression chambers.

An important feature of the thermally powered compressor is that the piston has enough mass to temporarily store combustion gas expansion energy as kinetic or potential energy of the piston. A solid piston can achieve the same mass as a liquid piston in a much more compact assembly. Furthermore, the friction due to the piston will be generally less if a solid piston rather than a liquid piston with one or more bends, is used. Therefore, the acceleration of the piston by the combustion process may be greater for a solid piston than for a liquid piston, although the acceleration is ultimately limited by the rate of heat transfer between the droplets in the liquid spray and the gas in the isothermal compression chamber.

It is expected that the dew point of the exhaust gas will be reached at the cold end of the gas-to-air heat exchanger leading to condensation in either the heat exchanger itself or in the chimney plume. The chimney plume and, if necessary, the condensation within the heat exchanger, can be avoided by mixing the exhaust gas with some of the warm air exiting from either of the two air turbines. A power generating plant may include a number of compressors all arranged to drive a single pair of air turbines. The compressors may be arranged to operate out of phase from one another. This may enable hot compressed air to be supplied to the turbines continuously as well as facilitating the operation of each individual compressor. For example, due to the finite time constant in the system, cool compressed air produced in one compressor may be used to drive the combustion process in another compressor. Cooling air for cooling the combustion chamber walls during the exhaust stroke in one compressor may be supplied from the isothermal compression chamber of another compressor. Also, arranging the compressors to operate out of phase may assist in reducing vibration produced by acceleration and deceleration of the massive solid pistons.

In another embodiment of the thermally powered compressor having a single solid piston, the adiabatic and isothermal compression chambers may be separated in a direction parallel to the motion of the solid piston rather than transverse to its motion, as shown in FIG. 16. An embodiment which incorporates this feature is shown in FIG. 17 as a component in a power generating plant.

Figure 17:
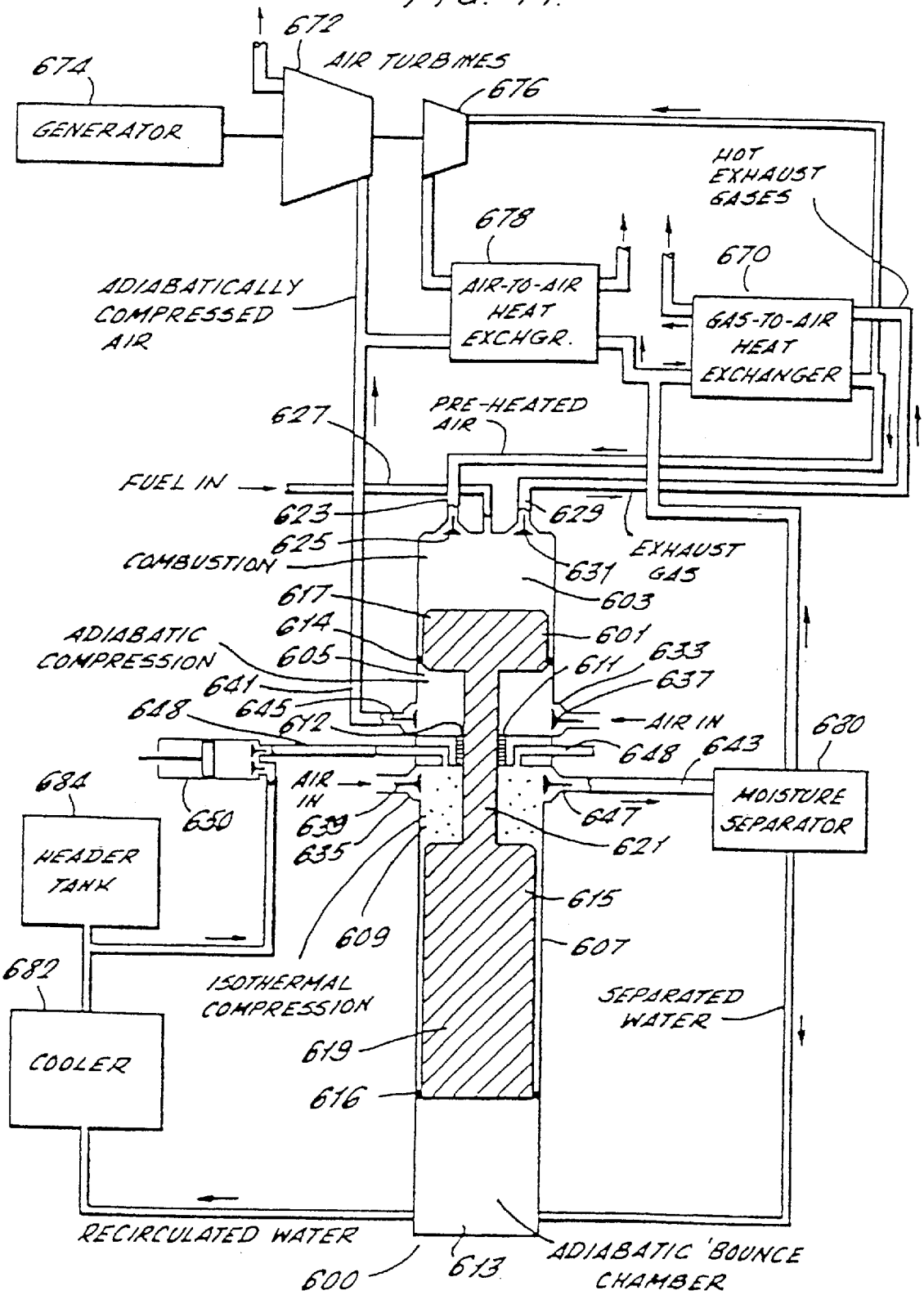
FIG. 17 shows another embodiment of a thermally powered compressor together with additional plant for power generation.

Referring to FIG. 17, the thermally powered compressor generally indicated at 600 comprises essentially two compartments disposed vertically one above the other. A combustion chamber 603 is formed in the upper part of the upper compartment 601 and an adiabatic compression chamber 605 is formed in the lower part of the upper compartment 601. An isothermal compression chamber 609 is formed in the upper part of the lower compartment 607, and an adiabatic compression/expansion chamber 613 is formed in the lower part of the lower compartment 607.

The combustion chamber 603 has a hot compressed air inlet port 623 controlled by a valve 625 to admit hot compressed air into the chamber, a fuel injection port 627 for the injection of fuel into the chamber and an exhaust gas outlet port 629 controlled by a valve 631, to allow exhaust gases to be expelled from the combustion chamber 603. The compressed air inlet port 623 and the exhaust/gas outlet port are connected to the same side of a gas-to-air heat exchanger 670.

The adiabatic compression chamber 605 and the isothermal compression chamber 609 each have an air inlet port 633, 635, controlled by a valve 637, 639 to allow air to be drawn into each chamber 605, 609, and a compressed air outlet port 641, 643, controlled by a valve 645, 647 to allow compressed air to be drawn from each chamber.

The isothermal compression chamber 609 also has a number of liquid spray injection ports 648 for the injection of a liquid spray into the chamber. The spray nozzles are preferably arranged in such a way as to provide a uniform spray throughout the annular volume. The compressed air outlet port 643 in the isothermal compression chamber 609 is connected to a moisture separator 680 which separates spray liquid entrained in the compressed air. The moisture separator 680 is connected to the spray injection port 648 via a cooling system 682 and a spray injection pump 650. The cooling system 682 cools the spray liquid from the moisture separator before the liquid is re-used in the spray. The pump 650 effects continuous circulation of liquid from the moisture separator 680 to the isothermal compression chamber. A header tank 684 containing reserve spray liquid is provided to replace any liquid which is lost from the circuit.

The compressed air outlet port 641 in the adiabatic compression chamber 605 is connected to the input of a main air turbine 672, which drives a generator 674. Hot compressed air from the compressor is expanded in the turbine 672 to provide mechanical power to generate electricity. Part of the cool compressed air from the moisture separator is directed to a gas-to-air heat exchanger 670 in which it is preheated with heat from exhaust gases from the combustion chamber. Some of the preheated air is then directed to the combustion chamber 603 for use in combustion.

However, there will usually be more heat available in the exhaust gases than is necessary to preheat the cool compressed air required for combustion. To recover this excess heat, the compressor is designed to produce a greater quantity of compressed air than is actually required to drive the combustion. A proportion of this surplus compressed air is passed through the gas-to-air heat exchanger 670 to absorb the excess heat in the exhaust gases, and is then directed to a second air turbine 676 in which it is expanded to produce useful mechanical power.

The temperature of the exhaust air from the second air turbine 676 is significantly higher than the ambient temperature of the atmosphere, and heat in the exhaust air may be recovered by transferring the heat to a proportion of cool compressed air leaving the moisture separator 680, in an air-to-air heat exchanger 678. The pre-heated compressed air is then directed to the main air turbine 672 in which it is expanded along with the hot compressed air from the adiabatic compression chamber 605.

The adiabatic/compression chamber 613 contains a mass of gas e.g. air which, during operation of the compressor, is alternately compressed and expanded. The gas is effective as a spring whose purpose is to convert kinetic energy of the piston in one direction into kinetic energy of the piston in the opposite direction. The gas provides the means by which the piston is returned to the top of its stroke to complete the operating cycle of the compressor. Thus, this chamber does not require gas inlet and outlet ports controlled by valves which open and close during the normal operating cycle of the compressor. However, means to replace any gas which leaks from the chamber (not shown) may be required.

A piston 615 comprising a solid material has upper, middle and lower parts and is free to oscillate linearly and vertically. The upper part 617 of the piston 615 is sized to the diameter of the upper compartment 601 and is free to move up and down between the vertical extremities of the compartment into and out of both the combustion and adiabatic compression chambers 603, 605. The lower part 619 of the piston 615 is sized to the diameter of the lower compartment 607 and is free to move up and down between the vertical extremities of the compartment, into and out of both the isothermal compression chamber 609 and the adiabatic compression/expansion chamber 613. The upper and lower parts 617, 619 of the piston 615 are connected together and vertically spaced apart by a middle part 621 which comprises a shaft having a diameter less than that of the upper and lower compartments. The shaft passes through an aperture 623 formed in the partition 611 separating the upper and lower compartments. A sliding seal 612 is provided in the aperture 611 which seals to the shaft to prevent air passing through the aperture 611 between the adiabatic compression chamber 605 and the isothermal compression chamber 609. The sliding seal 612 is designed to enable the shaft to slide freely in either direction through the aperture 611. Seals 614, 616 are provided between the piston and the walls of the chambers to prevent gas leaking from one chamber to another.

In this embodiment, when the upper part 617 of the piston 615 is at its highest level in the combustion chamber, the free volume inside the adiabatic compression chamber 605 and the adiabatic compression/expansion chamber 613 is at a maximum, while the free annular volume in the isothermal compression chamber 609 is at a minimum. Conversely, when the upper part 617 of the piston 615 is at its lowest level, the free volume in both the combustion and isothermal compression chambers 603 and 609 is at a maximum and the free volume in both the adiabatic compression chamber 605 and the adiabatic compression/expansion chamber 613 is at a minimum. Thus, in this embodiment the combustion process directly drives the adiabatic compression process, the induction of air into the isothermal compression chamber and adiabatic compression of the gas in the adiabatic compression/expansion chamber. The adiabatic expansion of gas in the adiabatic compression/expansion chamber 613 drives the isothermal compression process, the induction of air into the adiabatic compression chamber 605 and the expulsion of exhaust gas from the compression chamber 603.

A typical operating cycle of the compressor 600 shown in FIG. 17 proceeds as follows, beginning with the piston 615 at its maximum elevation in the combustion chamber 603 and about to reverse direction. At this point the gas outlet valves 645, 647 in each of the compression chambers 605, 609 are closed. The adiabatic compression chamber 605 contains air drawn in through the gas inlet port 633 during the previous part of the cycle, and the gas inlet valve 637 is now closed. The lower part 619 of the piston 615 is at its uppermost level in the isothermal compression chamber 609, so that the free volume in the compression chamber is at a minimum, and the gas inlet valve 639 is open, to allow air to be drawn into the chamber during the downward stroke of the piston. The lower part 619 of the piston 615 is withdrawn from the adiabatic compression/expansion chamber 613 so that the free volume therein is fully extended.

As the piston 615 momentarily comes to rest in the combustion chamber 603 and reverses direction, the hot compressed gas inlet valve 625 opens and a predetermined amount of hot compressed air is introduced into the combustion chamber. Fuel is injected into the combustion chamber through the fuel injection port 627, and ignites resulting in combustion of the hot compressed air/fuel mixture. The combustion gases expand at constant pressure driving the piston 615 downward out of the combustion chamber 603 and into the adiabatic compression chamber 605, and the upper part of piston starts to compress the air contained therein. At the same time, the lower part 619 of the piston 615 moves out of the isothermal compression chamber 609 and into the adiabatic compression/expansion chamber 613. As the piston moves downward, air is drawn into the expanding volume in the isothermal compression chamber. 609 through the gas inlet port 635. At the same time the lower part of the piston compresses the gas contained in the adiabatic compression/expansion chamber 613.

When the piston 615 reaches a certain level, the fuel injection is stopped. The combustion gases continue to expand adiabatically until the piston 615 reaches the bottom of its stroke.

When the pressure of air in the adiabatic compression chamber 605 reaches the required value, the compressed gas outlet valve 645 opens and hot compressed gas flows out of the adiabatic compression chamber 605, through the compressed gas outlet port 641 and is passed to the input of the main air tube 672. The hot compressed air is expanded in the turbine, producing mechanical power to drive the generator 674.

On continued downward movement, the piston 615 is gradually retarded as its kinetic energy is transferred to compression energy of the gas contained in the adiabatic compression/expansion chamber 613. Eventually the kinetic energy of the piston reaches zero and the piston comes momentarily to rest at the bottom of its stroke. As the piston 615 comes momentarily to rest and reverses direction, the compressed gas outlet valve 645 in the adiabatic compression chamber 605 closes and the gas inlet valve 637 opens, to allow air to be drawn into the chamber during the upward movement of the piston 615. At the same time the gas inlet valve 639 in the isothermal compression chamber 609 closes.

The hot compressed gas in the adiabatic compression/expansion chamber 613 begins to expand adiabatically, driving the piston 615 upward, the lower part being driven out of the chamber 613 and into the isothermal compression chamber 609. As the piston starts to compress the air in the isothermal compression chamber 609, liquid is sprayed into the chamber 609 through the spray injection port 648 to cool the air, so that the compression process may be approximately isothermal. At the same time, the upper part 617 of the piston 615 begins to move out of the adiabatic compression chamber 605 and into the combustion chamber 603. Consequently, air is drawn into the adiabatic compression chamber through the gas inlet port 633. When the pressure of the combustion gases reaches a value sufficient to push the exhaust gases through the gas-to-air heat exchanger 670 and eventually out into the atmosphere, the exhaust gas outlet valve 631 opens to allow the exhaust gases to be expelled from the combustion chamber 603.

When the pressure of air in the isothermal compression chamber 609 reaches the desired value, the compressed gas outlet valve 647 opens and cool compressed air is drawn out of the isothermal compression chamber 609 together with the spray liquid. The cool compressed air and spray liquid are then passed to the moisture separator 680 in which the liquid is separated from the compressed air. The separated liquid is then passed to the cooling system 682 which cools the liquid before it is re-used in the spray.

Part of the cool compressed air from the moisture separator is passed through the gas-to-air heat exchanger 670, in which it is pre-heated with heat from the exhaust gases leaving the combustion chamber 603. Some of the preheated compressed air is directed to the combustion chamber 603 for use in the next cycle and some is passed to the input of the second air turbine 676 which drives the generator 674. Part of the cool compressed air leaving the moisture separator 680 is passed through an air-to-air heat exchanger 678 in which it is pre-heated with hot exhaust air leaving the second air turbine 676. The preheated compressed air from the air-to-air heat exchanger 678 is then passed to the main air turbine 672 in which it is expanded along with the hot compressed air from the adiabatic compression chamber 605.

When the piston 615 reaches the top of its stroke, the exhaust valve 631 in the combustion chamber 603, the gas inlet valve 637 in the adiabatic compression chamber 605, the compressed gas outlet valve 647 in the isothermal compression chamber 609 are all closed and the gas inlet valve 639 in the isothermal compression chamber 609 is opened. The hot compressed gas inlet valve 625 in the combustion chamber 603 is then opened to admit a fresh charge of hot compressed air into the combustion chamber from the gas-to-air heat exchanger 670. Fuel is injected into the combustion chamber through the fuel injection port 627 which ignites in the hot compressed gas. The resulting combustion drives the piston downward and the cycle is repeated.

By incorporating an adiabatic compression/expansion chamber to retard and reverse the motion of the solid piston at the bottom of its stroke, the need for more complex methods which involve the movement of gas to and from a chamber and which require valves to open and close with very precise timing are avoided.

As with any of the previously described embodiments in which cooling of the chambers walls is desirable, a cooling jacket may be arranged around the walls of the combustion chamber in the embodiment shown in FIG. 17, through which cooling fluid can circulate to absorb the heat from the chamber walls. The cooling fluid may comprise a proportion of cool compressed gas produced in the isothermal compression chamber. The combustion chamber walls may have a plurality of apertures formed therein to allow the compressed air (or other gas) to eventually pass into the combustion chamber, and expand with the combustion gases. However, even after the cooling fluid has absorbed heat from the combustion chamber walls, it will still be relatively cool compared to the temperature of the combustion gases. Thus, the introduction of relatively cool gas into the combustion chambers may cause a loss in the efficiency of the system (for example due to a relatively large change in entropy). Thus, a transpiration cooling method is not necessarily the most efficient method of recovering heat from the combustion chamber walls.

Alternatively, cooling fluid may be circulated around the combustion chamber walls to absorb heat, and may then be passed to another part of the system in which the absorbed heat may be released in a part of the cycle whose temperature more closely matches that of the heated cooling fluid. For example, if the cooling fluid is isothermally compressed, air from the isothermal compression chamber, part of the compressed air may be caused to circulate around the combustion chamber walls and the heated compressed air may then be directed to an air turbine whose inlet temperature is matched to the temperature of the heated compressed air.

Figure 18:
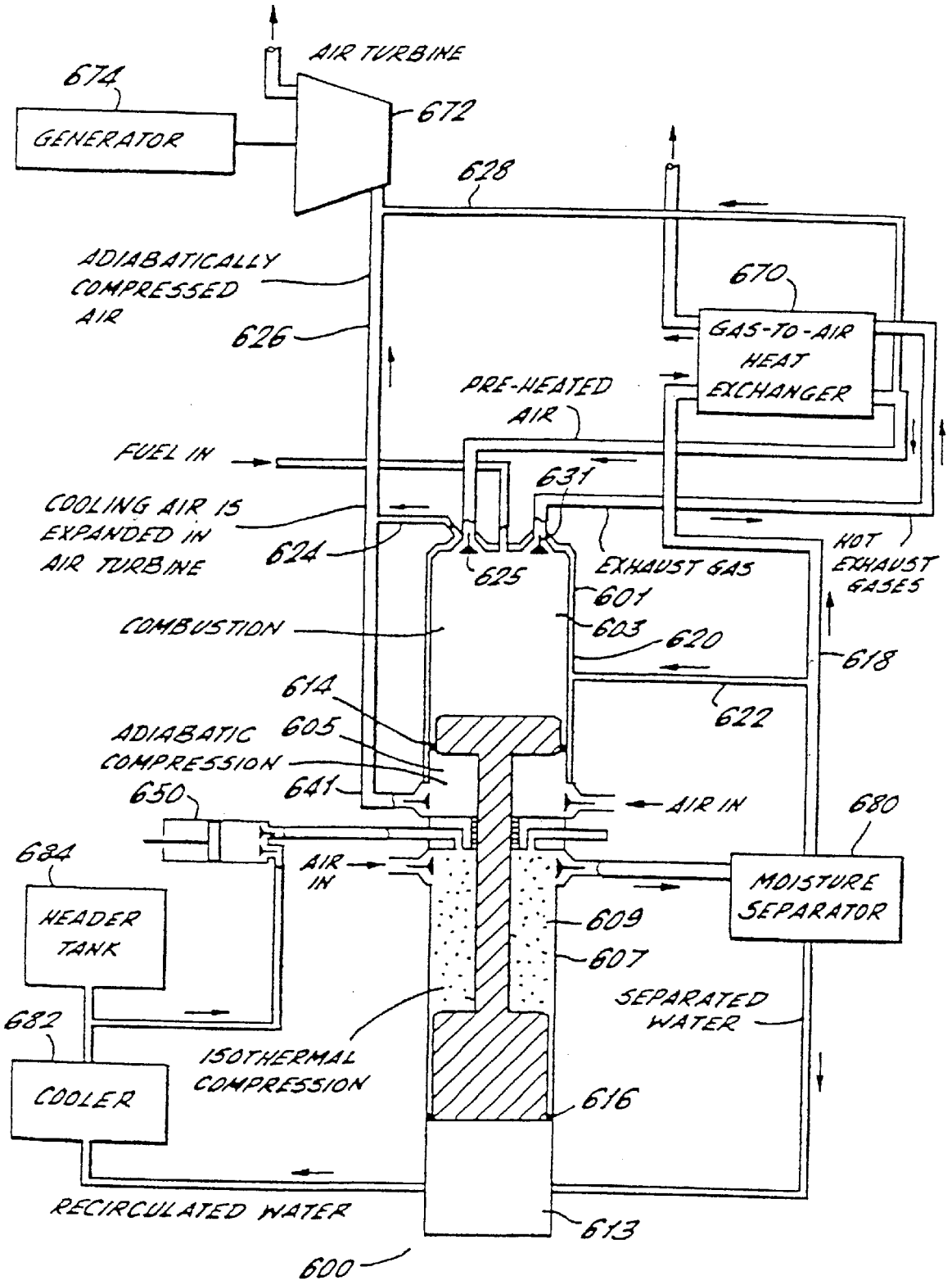
FIG. 18 shows another embodiment of the thermally powered compressor and additional plant for power generation.

An embodiment incorporating this method of recovering heat lost to the combustion chamber walls, is shown in FIG. 18. The embodiment shown in FIG. 18 is similar in many respects to that shown in FIG. 17 and like features are designated by like numerals. Referring to FIG. 18, the upper compartment 601 is surrounded by a cooling jacket 620 to effect cooling of the walls of the combustion chamber 603 and possibly the adiabatic compression chamber 605. The moisture separator 680 is connected to the cool side of the gas-to-air heat exchanger 670 via a main cool compressed gas supply line 618. A cooling fluid supply line 622 connects the cooling jacket 620 to the main supply line 618. The connection of the cooling fluid supply line 622 to the cooling jacket is made near the lower end of the upper compartment 601 where the temperature of the combustion chamber walls is relatively cool. The cooling jacket 620 extends to the top of the combustion chamber and is arranged so that cooling air can flow around the top of the combustion chamber in which both the hot compressed gas inlet valve 625 and the exhaust gas outlet valve 631 are situated.

The hot compressed gas outlet port 641 in the adiabatic compression chamber 605 is connected to the input of the air turbine 672 via a gas supply line 626. The cooling fluid outlet port in the cooling jacket 620 is connected to the gas supply line 626 via a supply line 624. The cooling fluid exit port from the cooling jacket is situated at the top of the combustion chamber 603 where the temperature is highest. This positioning of the cooling fluid exit port ensures that the compressed air leaving the cooling jacket has absorbed sufficient heat so that the temperature of the compressed air matches that of the hot compressed air leaving the adiabatic compression chamber 605.

The embodiment shown in FIG. 18 is designed to drive a single air turbine 672, avoiding the need for a second air turbine and associated heat exchanger incorporated in the power generating plant shown in FIG. 17. In the embodiment shown in FIG. 18, cool compressed gas used to recover excess heat from the exhaust gas in the gas-to-air heat exchanger 670 is passed directly to the input of the air turbine 672 via gas supply line 628. This aspect of the embodiment shown in FIG. 18 has already been described in relation to the embodiment shown in FIGS. 15.

In operation, cool compressed gas from the isothermal compression chamber 609 passes through the moisture separator 680, the main proportion of the compressed gas then being directed to the gas-to-air heat exchanger 670. The cool compressed gas is pre-heated in the heat exchanger 670, and part of the pre-heated compressed gas which is required for combustion is directed to the combustion chamber 603. That part of the pre-heated compressed gas which is used to recover excess heat from the exhaust gas is passed directly to the air turbine 672, in which it is expanded along with the adiabatically compressed gas from the adiabatic compression chamber 605.

Part of the cool compressed gas from the moisture separator is passed to the cooling jacket 620 to effect cooling of the combustion chamber walls. The compressed gas circulates through the cooling jacket, gaining heat from the combustion chamber walls, and eventually leaves via the cooling fluid exit port and joins the main flow of adiabatically compressed gas flowing to the air turbine 672. Valves (not shown) may be required to control the flow of cooling air from the moisture separator through the cooling jacket and into the supply line 626 carrying the main flow of adiabatically compressed gas.

Figure 19:
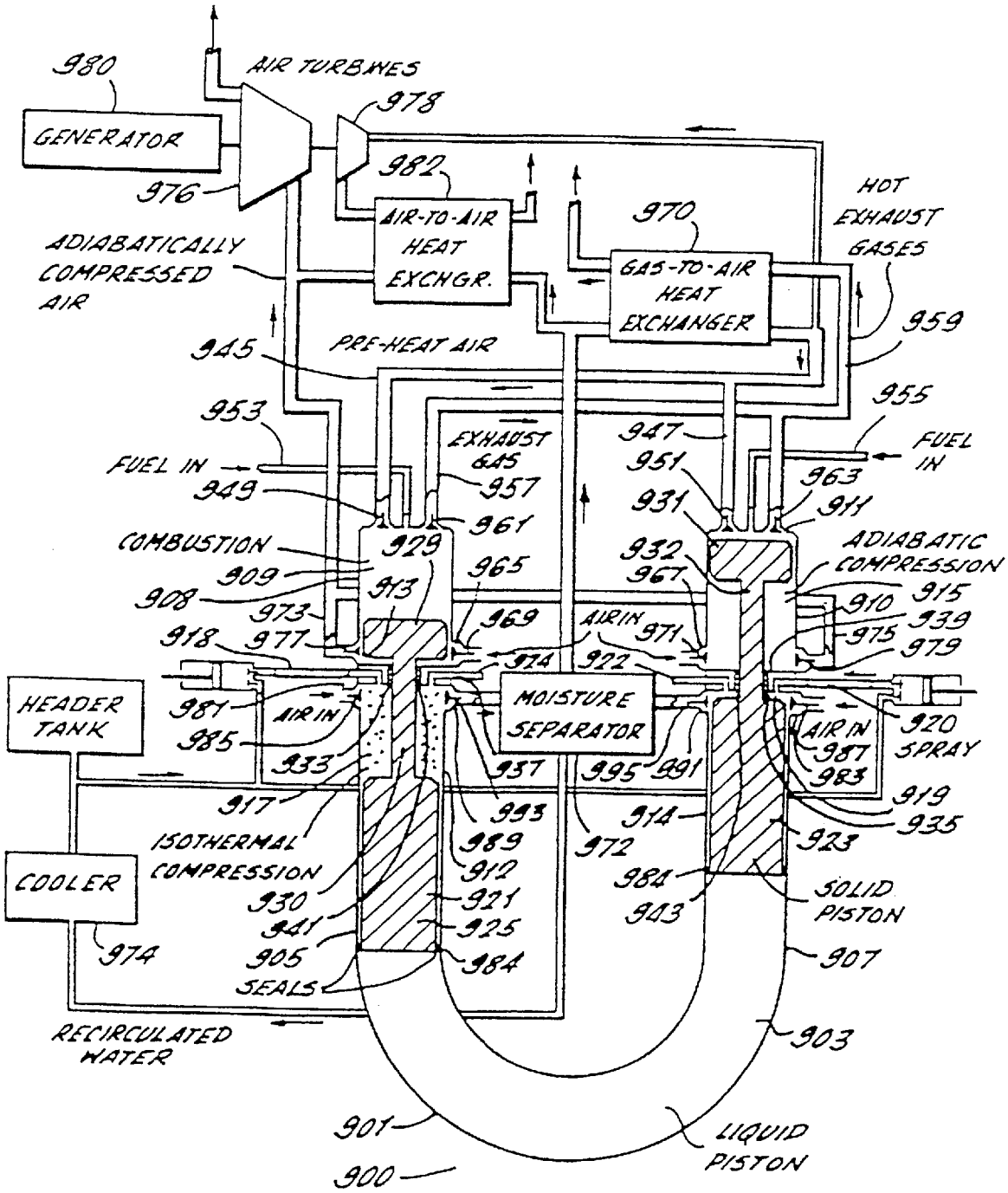
FIG. 19 shows another embodiment of a thermally powered compressor and additional plant for power generation.

An embodiment of a symmetric thermally powered compressor incorporating vertically separated chambers is shown in FIG. 19, in conjunction with electricity generating plant arranged in a similar way to that described above in relation to FIGS. 16 and 17. Referring to FIG. 19, the compressor, generally indicated at 900, comprises a U-shaped conduit 901 partially filled with liquid forming a liquid piston 903. The arms 905 and 907 of the conduit 901 are linear and extend vertically upwards. A compartment 908, 910 is formed adjacent to the top of each arm 905, 907, the upper part of which serves as a combustion chamber 909, 911 and the lower part of which serves as an adiabatic compression chamber 913, 915. A lower compartment 912, 914 is formed in each arm 905, 907 below each upper compartment 908, 910. The lower compartments each serve as an isothermal compression chamber 917, 919. The adiabatic compression chamber in each arm is arranged between the combustion and isothermal compression chambers in order to reduce, as far as possible, the thermal gradient down the length of the arm and therefore to minimise the thermal conductance from the combustion chamber to the isothermal compression chamber.

A solid piston 921, 923 having a higher density than the liquid piston 903 is disposed in each arm 905, 907 of the conduit 901 and comprises essentially three parts: upper, middle and lower. The lower part of each piston 921, 923 is sized to the diameter of the arm 905, 907 of the conduit 901, is supported from below by the liquid piston 903 and is free to move up and down, into and out of the isothermal compression chamber 917, 919. Seals 984 are provided adjacent the lower edge of the pistons to prevent liquid leaking between the piston and the chamber walls. The upper part 929, 931 of the solid piston 921 and 923 is sized to the diameter of the upper compartment 908, 910 and is free to move vertically between the upper and lower extremities of the upper compartment 908, 910. The upper and lower parts of the solid piston 921, 923 are connected together and spaced apart vertically by a middle part 930, 932 in the form of a shaft and having a diameter less than the diameter of both the upper and lower parts. The middle part 930, 932 passes from the upper to the lower compartment through an apperture 933, 935 formed in the partition 937, 939 which separates the upper and lower compartments. A sliding seal 941, 943 is provided between the aperture 933, 935 and the shaft to prevent gas leaking between the isothermal and adiabatic compression chambers.

When each of the solid pistons is at its lowest level in a respective arm of the conduit, the free volume inside both the combustion and isothermal compression chambers is fully extended and at a maximum. Simultaneously, the free volume inside the adiabatic compression chamber is at a minimum, the upper part of the piston being at the lower limit of its travel in the upper compartment. Conversely, when each of the solid pistons is at its highest level, the free volume inside the combustion and isothermal compression chambers is at a minimum, whereas the free volume inside the adiabatic compression chamber is at a maximum, the upper part of the piston being at the upper limit of its travel in the upper compartment.

Each combustion chamber 909, 911 has a hot compressed gas inlet port 945, 947 controlled by a valve 949, 951 for the introduction of pre-heated compressed air or other oxidising gas into the chamber; a fuel injection port 953, 955 for the injection of fuel into the chamber, and an exhaust gas outlet port 957, 959 controlled by a valve 961, 963 for the expulsion of hot exhaust gases from the combustion chamber. Each adiabatic compression chamber 913, 915 has gas inlet port 965, 967 controlled by a valve 969, 971 to allow gas to be drawn into the chamber and a compressed gas outlet port 973, 975 controlled by a valve 977, 979 to allow adiabatically compressed gas to be drawn from the chamber. Each isothermal compression chamber 917, 919 includes a gas inlet port 981, 983 controlled by a valve 985, 987 to allow gas to be drawn into the chamber, and a compressed gas outlet port 989, 991 controlled by a valve 993, 995 to allow isothermally compressed gas to be drawn from the compression chamber. Each isothermal compression chamber also includes a number of spray injection ports 918, 920, 922, 924 arranged to provide a uniform spray of liquid throughout the annular volume of each chamber during compression.

In the operating cycle of the compressor shown in FIG. 19 the combustion process in one arm of the conduit drives simultaneously the adiabatic compression process in the same arm, and the isothermal compression process in the other arm.

A typical operating cycle of the thermally powered compressor shown in FIG. 19 proceeds as follows beginning with the piston 923 at the top of its stroke in the combustion chamber 911 and the piston 921 at the bottom of its stroke in the combustion chamber 909. The combustion chamber 909 contains hot expanded combustion gases from the previous combustion and both the hot compressed gas inlet valve 949 and exhaust gas outlet valve 961 are closed. The isothermal compression chamber 917 contains air previously drawn in through the gas inlet port 981 during the previous part of the cycle, and the gas inlet and outlet valves 985, 993 are closed. The adiabatic compression chamber 915 in the other arm 907 of the conduit 901 also contains air previously introduced through the gas inlet port 967 and the gas inlet and outlet valves 987, 995 are closed.

As the solid piston 923 momentarily comes to rest at the top of its stroke and reverses direction, the hot compressed gas inlet valve 951 opens and a predetermined amount of hot compressed gas from the gas-to-air heat exchanger 970 is introduced into the combustion chamber 911. Fuel is injected through the fuel injection port 955 into the combustion chamber 911. The fuel ignites, resulting in combustion of the fuel-air mixture which drives the piston 923 downwards and out of both the combustion chamber 911 and the isothermal compression chamber 919. Initially, fuel continues to be admitted into the combustion chamber, so that the combustion occurs at approximately constant pressure. The compressed gas outlet valve 995 in the isothermal compression chamber 919 is closed and the gas inlet valve 987 is open, to allow air to be drawn into the compression chamber 919 as the piston moves out of the chamber.

As the upper part 931 of the piston 923 moves downward out of the combustion chamber 911, it moves into the adiabatic compression chamber 915 and compresses the air previously introduced into the chamber during the last part of the cycle.

Downward movement of the solid piston 923 is accompanied by upward movement of the other piston 921, this movement being driven by the combustion process in the opposite arm 907. During upward movement of the solid piston 921 in the arm 905, the compressed gas outlet valve 977 in the adiabatic compression chamber 913 is closed and the gas inlet valve 969 is open allowing air to be drawn into the chamber. Both the gas inlet and outlet valves in the isothermal compression chamber 917 are closed and the lower part 925 of the piston 921 begins to compress the air contained in the isothermal compression chamber. During compression, a cool liquid spray is injected into the isothermal compression chamber through the spray injection ports 918, 924, to cool the air so that the compression may be approximately isothermal. The exhaust valve 961 in the combustion chamber 909 opens when the pressure is sufficient to drive the combustion gases out of the combustion chamber, through the gas-to-air heat exchanger 970 and eventually out into the atmosphere.

At some point during the downward travel of the solid piston 923, the fuel injection is stopped. The piston 923 continues to be driven downward to the bottom of its stroke by the adiabatic expansion of the combustion gases.

When the air pressure in the isothermal compression chamber 917 reaches the desired value, the compressed gas outlet valve 993 opens and compressed air along with the spray liquid is drawn out of the chamber through the compressed gas outlet port 989. The mixture of compressed gas and spray liquid passes through the moisture separator 972 in which the spray liquid is separated. The spray liquid is then returned to the cooling system 974, where it is cooled before being re-used in the liquid spray. Part of the cool compressed air is passed from the moisture separator to the gas-to-air heat exchanger 970 in which it is pre-heated by heat from the hot exhaust gases from the combustion process. Part of the pre-heated compressed air is then passed from the gas-to-air heat exchanger 970 for use in combustion, and another part is passed to the input of a small air turbine 978.

When the air pressure in the adiabatic compression chamber 915 reaches the required value, the compressed gas outlet valve 979 opens and hot compressed air flows out of the chamber through the compressed gas outlet port 975 and is passed to the main air turbine 976 in which it expands, producing mechanical power to drive the generator 980. Heat from the exhaust gas of the second air turbine 978 is recovered by transferring this heat to part of the cool compressed air from the moisture separator 972 in the air-to-air heat exchanger 982. The hot compressed air leaving the air-to-air heat exchanger is then passed to the main air turbine 976 in which it is expanded along with the main flow of adiabatically compressed air. When the solid piston 923 reaches the bottom of its stroke and piston 921 reaches the top of its stroke, the exhaust gas outlet valve 961 in the combustion chamber 909, the gas inlet valve 969 in the adiabatic compression chamber 913, and the compressed gas outlet valve 993 in the compression chamber 917, the compressed gas outlet valve 979 in the adiabatic compression chamber 915 and the gas inlet valve 987 in the isothermal compression chamber 919, all close. The hot compressed gas inlet valve 949 in the combustion chamber 909 then opens and then closes shortly after admitting a charge of hot compressed gas into the chamber. Fuel is injected into the combustion chamber through the fuel injection port 953. The fuel ignites and the resulting combustion of the pre-heated compressed air and fuel mixture drives the piston 921 downward, out of both the combustion chamber 909 and out of the isothermal compression chamber 917, commencing the return stroke of the piston and the second half of the operating cycle.

Because the embodiment of the compressor shown in FIG. 19 is a symmetric device, the second half of the cycle is similar to the first, with compression of air in adiabatic and isothermal compression chambers 913 and 919, induction of air in adiabatic and isothermal compression chambers 915 and 917 and expulsion of combustion gases from combustion chamber 911. These processes are all driven by combustion in combustion chamber 909. By having the various combustion and compression chambers separated vertically, the construction of the compressor is relatively simple and also robust.

In alternative embodiments, the liquid and solid pistons may be replaced by a single solid piston. In this case the U-shaped conduit whose primary function is to contain liquid and to convert downward motion of one part of the piston into upward motion of another part and vice versa would not be required. The piston may be arranged to move linearly, and the combustion chambers may be arranged with one combustion chamber below the other or with both in the same horizontal plane, with the solid piston oscillating between them. The compression chambers may be similarly arranged.

In any embodiment of the gas compressor which has a solid piston, there is the possibility that the piston may over run and cause a damaging impact at the end of the chamber. Sensors and control mechanisms which operate valves to inject gas into the chamber can be provided to prevent this occurrence. In addition, it may be desirable to construct the solid piston in such a way as to mitigate the effect of such an impact. For example, the end or head of the piston may be designed to be collapsible, so that the energy of impact is absorbed. This may be achieved by forming the end of the piston as a crumple zone. Alternatively the end of the piston may be designed to telescope inwards on impact. The collapsible end portion should be as light as possible so that the kinetic energy of this part of the piston is minimised.

In all the embodiments shown in FIGS. 15 to 19, heat is supplied to the thermally powered compressor by internal combustion of fuel. However other heat sources such as nuclear, solar, chemical and industrial process heat can also be used and embodiments using alternative sources of heat are described in detail below. To distinguish compressors using internal and external heat sources, they shall be referred to as internal combustion and externally heated compressors respectively. FIGS. 15 to 19 illustrate embodiments of the internal combustion compressor together with the components of a circuit suitable for the generation of electrical power, including at least one air turbine. Such systems will be referred to as ICCAT (Internal Combustion Compressor and Air Turbine).

The fuel for an ICCAT system may be gaseous, liquid or solid. In the case of solid fuel such as coal, it is necessary to either gasify the fuel or to grind it to fine particles (i.e. pulverised fuel) as is done in existing coal-fired power stations. Other alternatives are to have fluidised bed combustors as in some modern power plant or to have chain-grate combustors as was done in the past. For some fuels it will be necessary to provide means to remove particulates and sulphur dioxide from the exhaust gases and from the compressor itself. For most fuels, measures to control the emission of nitrogen oxides will be needed, either by control of the combustion process or by treatment of the exhaust gas.

The exhaust gas from the combustion chamber will generally contain a quantity of water vapour. Water vapour will be produced in the combustion process itself due to the presence of hydrogen in the fuel. The amount of water vapour produced will depend on the combustion fuel. For example natural gas or methane ($CH_4$) will produce more water vapour than coal.

METHOD OF WATER RECOVERY FROM EXHAUST GAS

The recovery of water from the combustion gases may be important for various reasons. Conservation of water, particularly if the water has been demineralised, is one important reason. Also, the presence of water vapour could cause an unsightly plume above the chimney from which the exhaust gas is finally emitted. If water could be removed from the combustion gases prior to their release into the atmosphere no plume would form above the chimney. Condensation of water vapour is an effective method of removing some undesirable pollutants from the exhaust gas, and this method might be used on its own or as a supplement to other methods of control. Depending on the type of fuel, these pollutants may include sulphur oxides, nitrogen oxides, ammonia, mercury and other heavy metals and particulates. If the water vapour is condensed, a proportion of these pollutants will be removed from the exhaust gas by dissolving in the condensate. In some cases, it may be necessary to add certain chemicals to the condensate to assist in the solution of the pollutant into the water phase. For example, the capture of sulphur oxides can be achieved by the addition of limestone or some other alkali, as is done in conventional flue gas de-sulphurisation systems. Other additives may be used to facilitate the capture of other pollutants.

Some pollutants, such as ammonia, are very soluble in water and no additive is necessarily required to achieve efficient capture. Ammonia may be injected into the heat exchanger, in the combustion chamber or into the connecting pipe work in order to reduce the nitrogen oxides which are formed at high temperatures. Depending on the conditions and the amount of ammonia injected, there may be circumstances when the combustion gases have excess ammonia and it will be desirable to remove this before the gases are released to the atmosphere. Condensation is also an effective method of removing particulates including ash particles from the exhaust gas. For fuels with a significant ash content, such as coal, conventional electrostatic precipitation may be used in addition to condensation.

Figure 20:
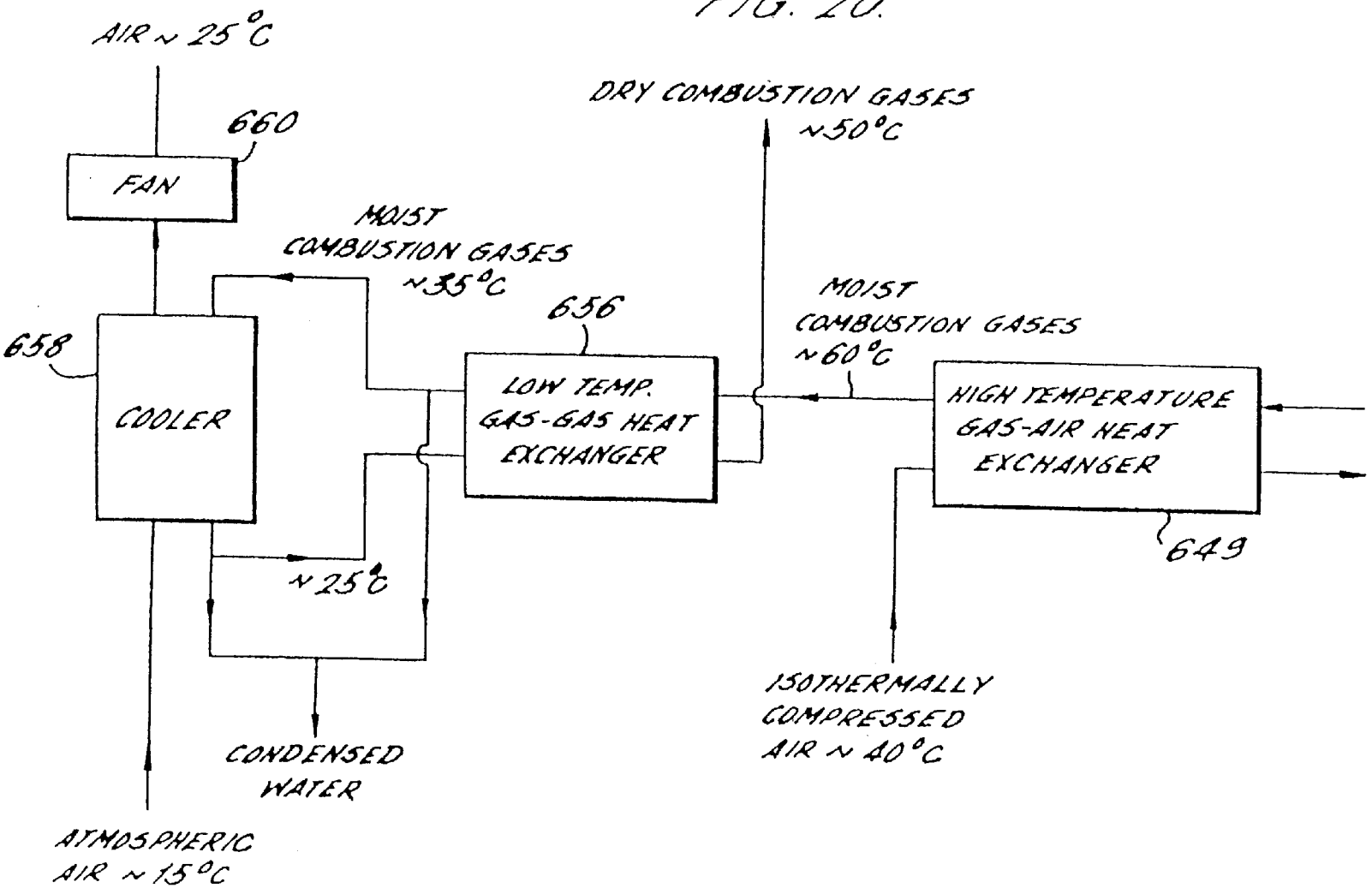
FIG. 20 shows a block diagram of a system for recovering vapour from exhaust gases.

An apparatus for condensing water vapour from the exhaust gas is shown schematically in FIG. 20. The apparatus shown may be directly added to the cool exhaust gas outlet side of the high temperature gas-to-air heat exchanger shown in any one of FIGS. 15 to 19. However the apparatus may be implemented in other systems where it is desirable to recover water from exhaust or other gas.

Referring to FIG. 20, a low temperature gas-to-gas heat exchanger 656 is connected to the exhaust gas outlet side of the high temperature gas-to-air heat exchanger 649 which serves to heat isothermally compressed air with the exhaust gas from the combustion chamber of the compressor. A cooler 658 is connected to the gas-to-gas heat exchanger 656 such that exhaust gas from the gas-to-gas heat exchanger 656 passes through the cooler 658 and returns to the low temperature side of the gas-to-gas heat exchanger 656. A fan 660 is arranged to force air through the cooler for cooling the exhaust gas. The fan could be situated either upstream or downstream of the cooler.

For the purposes of illustrating the operation of the water recovery apparatus, various temperatures will be assumed at different points in the apparatus, although in practice these temperatures may well be different. Exhaust gas from the combustion chamber passes through the high temperature gas-to-air heat exchanger 649 in which it is cooled to about 60° C. by the isothermally compressed air from the isothermal compression chamber which has a temperature of about 40° C. The exhaust gas from the gas-to-air heat exchanger 649 passes through the low temperature gas-to-gas heat exchanger 656 in which it is cooled further, to about 35° C., by cool exhaust gas returned from the cooler 658. The exhaust gas is then directed to the cooler where it is cooled to a temperature of about 25° C. by a stream of atmospheric air with an initial temperature of about 15° C. and is then returned to the gas-to-gas heat exchanger 656. Water which has condensed from the exhaust gas as a result of cooling in the gas-to-gas heat exchanger 656 is removed before the exhaust gas is passed to the cooler 658 and water condensed as a result of further cooling in the cooler 658 is removed after this stage and before the exhaust gas is returned to the gas-to-gas heat exchanger 656. The cooled exhaust gas is returned to the gas-to-gas heat exchanger 656 so that some of the removed heat is restored. The dry exhaust gas whose temperature is raised to about 50° C. in the gas-to-gas heat exchanger 656 is then expelled into the atmosphere. Reheating the exhaust gas avoids the formation of the unsightly vapour plume above the chimney and also increases the buoyancy of the exhaust gas to aid in its dispersal in the atmosphere.

Although the cooler 658 shown in FIG. 20 uses air to cool the combustion gases, other methods of cooling such as by water from a lake, river, cooling tower or the sea are also possible and contemplated. If the combustion fuel is natural gas, the recovery of water can be achieved at relatively high temperatures because the flue gases produced by combustion have a dew point of about 60° C.

INTERNAL COMBUSTION COMPRESSORS

The ICCAT system has a number of advantages over the combined cycle gas-turbine system (CCGT) and conventional coal and oil-burning steam plant. The ICCAT does not have a gas turbine driven by hot combustion gases from a separate combustion chamber. In a CCGT the maximum temperature is limited by the maximum temperature that the gas turbine blades can withstand, which is about 1300° C. Because heat in the combustion gas in the ICCAT system is directly transferred to the kinetic energy of the piston (or some other means to store kinetic energy coupled to the piston), the maximum temperature limit is very much greater and should be in excess of 2000° C.

The exhaust gas from the gas turbine in a CCGT is at a temperature of about 500° C., and this gas is used to raise steam to drive a steam turbine. However, in the ICCAT system the temperature of the exhaust gas can be of the order of 800° C. and is used to preheat the inlet air to the combustion chamber via a heat exchanger. Thus, the ICCAT system does not require a steam plant which reduces the capital cost.

In a CCGT plant a conventional rotary compressor provides hot compressed inlet air at a temperature of about 350° C. This temperature is achieved as a result of heat transferred to the compressed air during the adiabatic compression process. The heat transferred to the inlet gas is provided by mechanical energy of a rotary compressor. However, in the ICCAT system the inlet air is at a temperature of about 800° C. and is not heated by mechanical energy but by the heat in the exhaust gas from the compressor. Thus, in the CCGT the temperature is raised by 350° C. to 1200° C. whereas in the ICCAT system the temperature is raised from 800° C. to 2000° C. Therefore, in the ICCAT system the average temperature at which heat is added to the system is much higher than it is in the CCGT system. This is very beneficial from the point of view of the Carnot efficiency defined previously. Furthermore, because the inlet air is compressed isothermally, much less energy is required to compress a given mass of gas than is required by the rotary compressor in the CCGT.

Most of the compressed air used to drive the thermally powered compressor in the ICCAT system is consumed in the combustion process, whereas in the CCGT large amounts of compressed air are required for cooling of the turbine components and to dilute the combustion gases so that the gas temperature does not exceed about 1300° C.

In a CCGT the outlet temperature of the steam plant to atmosphere is about 80° C. It should be possible to achieve lower exhaust temperatures of the air and combustion gases in the ICCAT system, implying less wasted heat and higher efficiency. Furthermore, in the ICCAT system power is extracted using an air turbine which operates at a comparatively low temperature and whose outlet temperature is close to ambient. Because the air turbine operates at a comparatively low temperature, cooling should not be needed and materials problems should not arise.

The ICCAT system also has advantages over the power generation plant shown in FIG. 9 because higher temperatures can be achieved, although cooling the gas turbine blades with cold compressed air may enable the gas turbine to operate at a temperature of the order of 1500° C. as opposed to 1200° C.

With a carefully designed ICCAT system, waste heat should be kept to a minimum, and ideally the only part of the cycle in which a significant amount of heat is rejected is during isothermal compression. In addition to the cooling strategy outlined above, any form of cooling can be used with the cycle, such as wet, dry or hybrid cooling towers or direct cooling to the atmosphere or to a body of water such as the sea, a river or lake.

EXTERNALLY HEATED COMPRESSOR AND AIR TURBINE

Alternative sources of heat may be used to drive the thermally powered compressor other than heat from a combustion process. In this case the heat source would generally be external to the thermally powered compressor. Systems in which such a thermally powered compressor is effective as a component in a power generating plant driving an air turbine, shall be referred to as EHCAT(Externally Heated Compressor and Air Turbine). As mentioned above, the heat may be provided by a chemical or industrial process, by solar energy or by nuclear heat. An external heat exchanger may also be preferred for combustion of certain fuels, which might not be easily gasified or burnt inside the compressor itself. Examples could be the incineration of waste and possibly biomass and coal.

Figure 21:
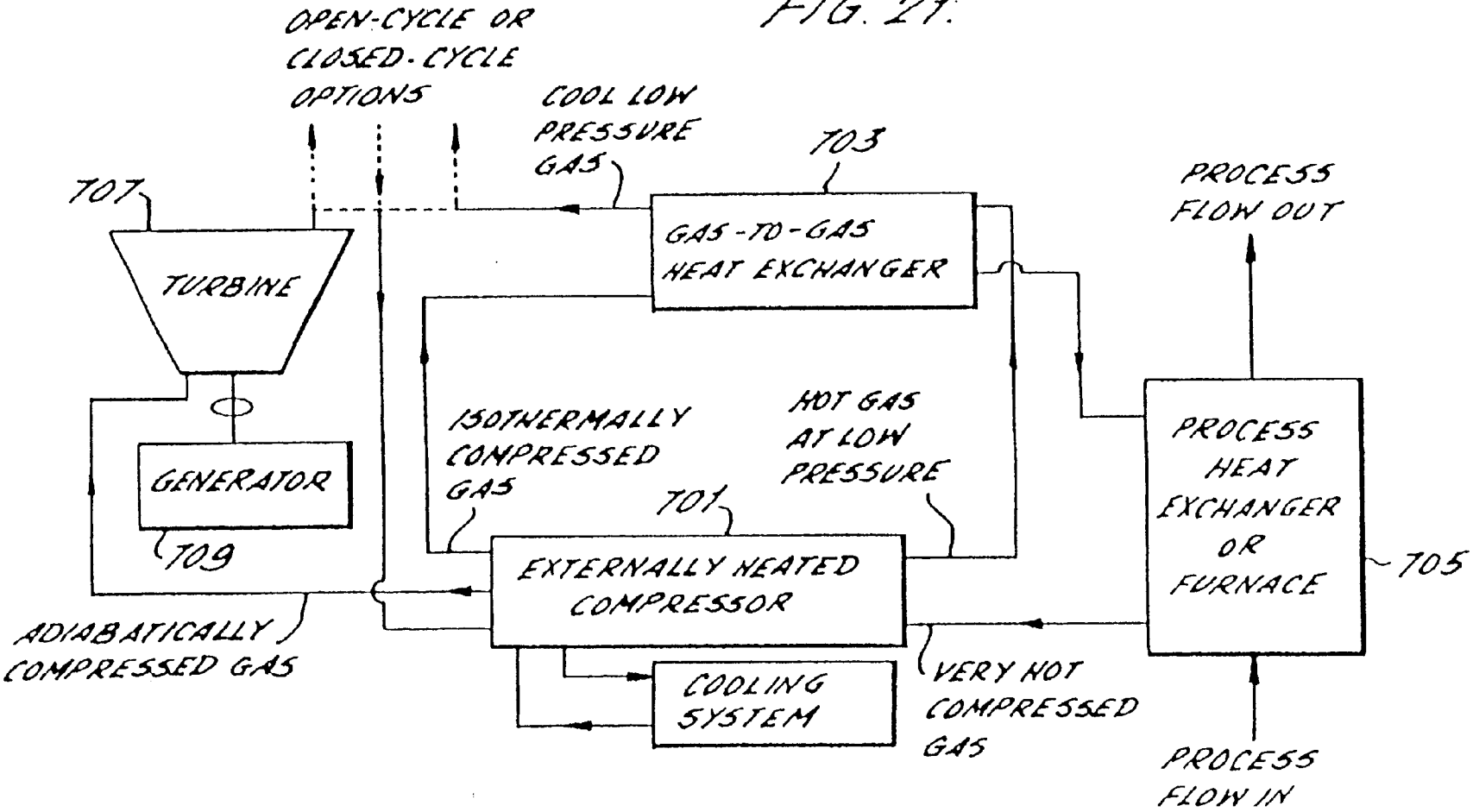
FIG. 21 shows in a block diagram an embodiment of a closed cycle gas turbine plant including a thermally powered compressor.

FIG. 21 shows diagrammatically one embodiment of the externally heated compressor operative in an EHCAT system. The compressor 701 comprises an isothermal compression chamber producing cool compressed gas, and an adiabatic compression chamber producing hot compressed gas. In this respect the compressor may be similar to the internal combustion compressor shown in any one of FIGS. 15 to 19.

However, in the externally heated compressor the combustion chamber of the internal combustion compressor is replaced by an expansion chamber into which very hot compressed gas is injected without fuel. The very hot compressed gas expands and cools without combustion, imparting kinetic energy to the piston or other kinetic energy storage means. Hot exhaust gas is expelled from the expansion chamber and is fed to a gas-to-gas heat exchanger 703 to preheat the cool compressed gas drawn from the isothermal compression chamber. This preheated gas is fed to a process heat exchanger 705 in which the gas is heated to its final temperature with heat generated by some thermal process. The very hot compressed gas from the process heat exchanger 705 is fed into the expansion chamber of the externally heated compressor to drive the piston. In this embodiment, power is extracted from the externally heated compressor by compressing a quantity of gas adiabatically and expanding this gas through a gas turbine 707 to drive an electricity generator 709.

If the heat to drive the thermally powered compressor is provided via an external heat exchanger, it is possible to arrange the working gas to circulate in a closed cycle. The advantages of a closed-cycle system are that the pressure of the working gas can be increased in order to achieve a higher output for given plant size, and that a gas other than air can be selected to improve heat transfer.

A closed-cycle system is also shown in FIG. 21 with the necessary modifications from the open cycle system being indicated by the dotted lines.

Cool exhaust gas emitted from the gas to gas heat exchanger 703 is combined with the cool low pressure exhaust gas from the main gas turbine 707 and this gas is admitted to the compression chambers of the compressor, part of which is compressed adiabatically to drive the main gas turbine 707 and part of which is compressed isothermally, preheated by the gas-to-gas heat exchanger 703, passed to the process heat exchanger 705 to be heated with heat from some external thermal process and then injected as very hot compressed gas into the expansion chamber to drive the compressor.

Figure 22:
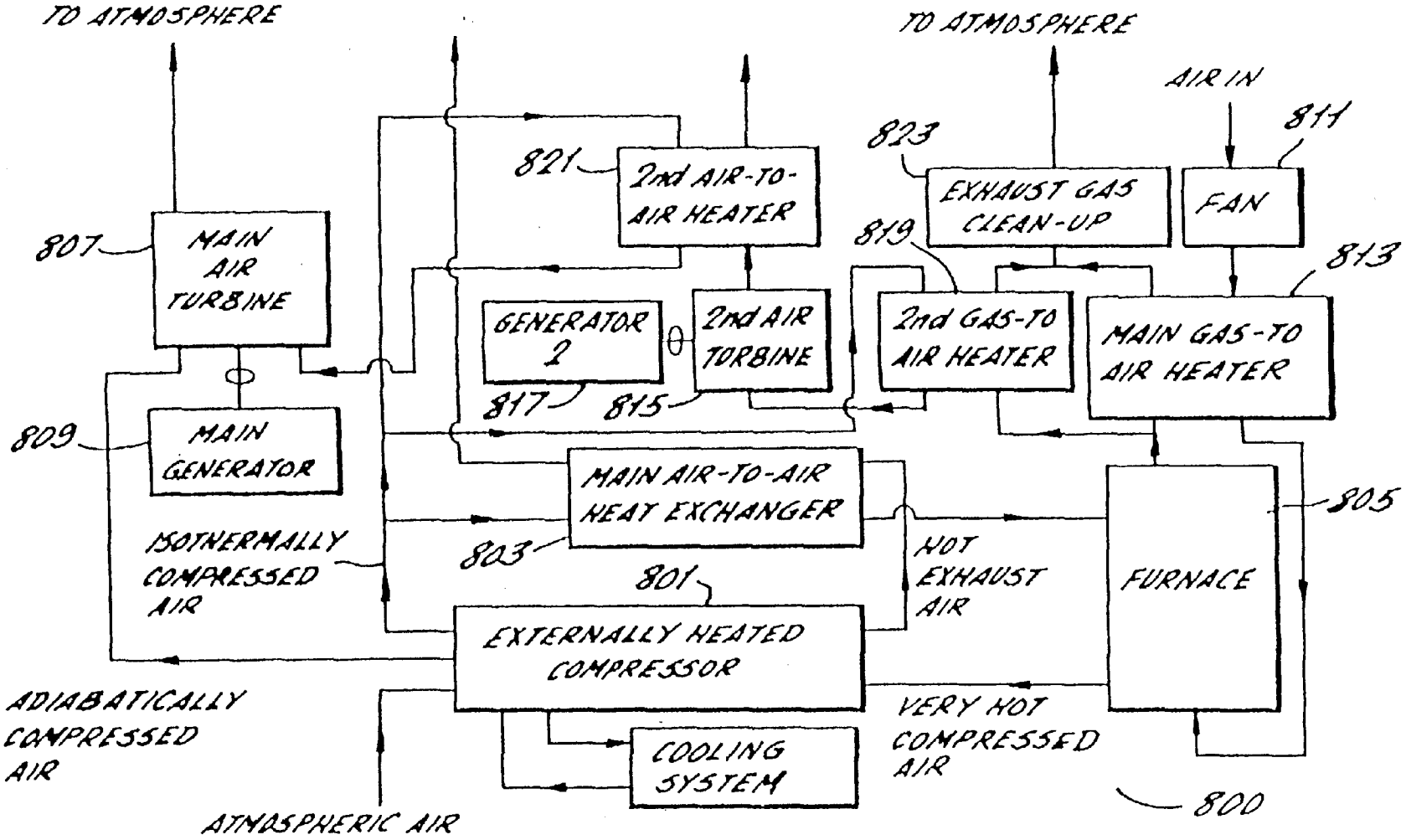
FIG. 22 shows in a block diagram an embodiment of a power generating plant including a thermally powered compressor and a second air turbine arranged for recovery of excess heat.

The thermal capacity of the exhaust gas from the externally heated compressor 701 is the same as the inlet gas from the isothermal compression chamber. Thus there is no surplus heat in the compressor exhaust gas, in contrast to the situation with the internal combustion compressor. In this case, a second gas turbine and second heat exchanger which in some applications are desirable in the ICCAT system may not be required in the EHCAT system, as shown in FIG. 21. However, the external process heat may be available over a considerable temperature range and under these circumstances, two or more gas turbines might be used. For example, if the external heat exchanger is a furnace burning a fuel, then depending on the exhaust gas temperature, there could be surplus heat. FIG. 22 shows one embodiment of an externally heated compressor implemented in an EHCAT system in which surplus heat of the exhaust gas from an externally fired furnace is converted to useful power.

The power generating plant shown in FIG. 22 comprises a furnace 805 which serves as the main heater to heat the compressed air for driving the externally heated compressor 801. A fan 811 supplies air to the furnace 805 via a main gas-to-air heat exchanger 813. The gas-to-air heater 813 preheats the inlet air to the furnace 805 with part of the exhaust gas expelled from the furnace. The power plant further includes a second air turbine 815 driving a second generator 817 and a second gas-to-air heat exchanger 819. Part of the isothermally compressed air from the externally heated compressor is fed to the second gas-to-air heat exchanger 819 which is arranged to preheat this air with part of the exhaust gas from the furnace 805. The preheated compressed air is then fed as inlet air to the second air turbine 815 for generating additional power. The operating temperature of the second air turbine 815 is considerably higher than that of the main turbine 807, so that exhaust air from the second air turbine 815 will contain a considerable amount of heat. A second air-to-air heat exchanger 821 is provided to recover this heat by way of preheating a further part of the isothermally compressed air from the externally heated compressor 801 which is then added to the flow of adiabatically compressed air to drive the main air turbine 807. Depending on the composition of the exhaust gas from the furnace, means to clean the exhaust gas 823 may be added before the exhaust gas is released into the atmosphere.

A second air turbine may also be used when the source of external heat is not combustion of a fuel, but is an industrial process, a waste heat stream or some other heat source. The particular arrangement would depend on the heat source and how it is matched to the externally heated compressor circuit.

EXTERNALLY HEATED HOT LIQUID INJECTION COMPRESSOR

Figure 23:
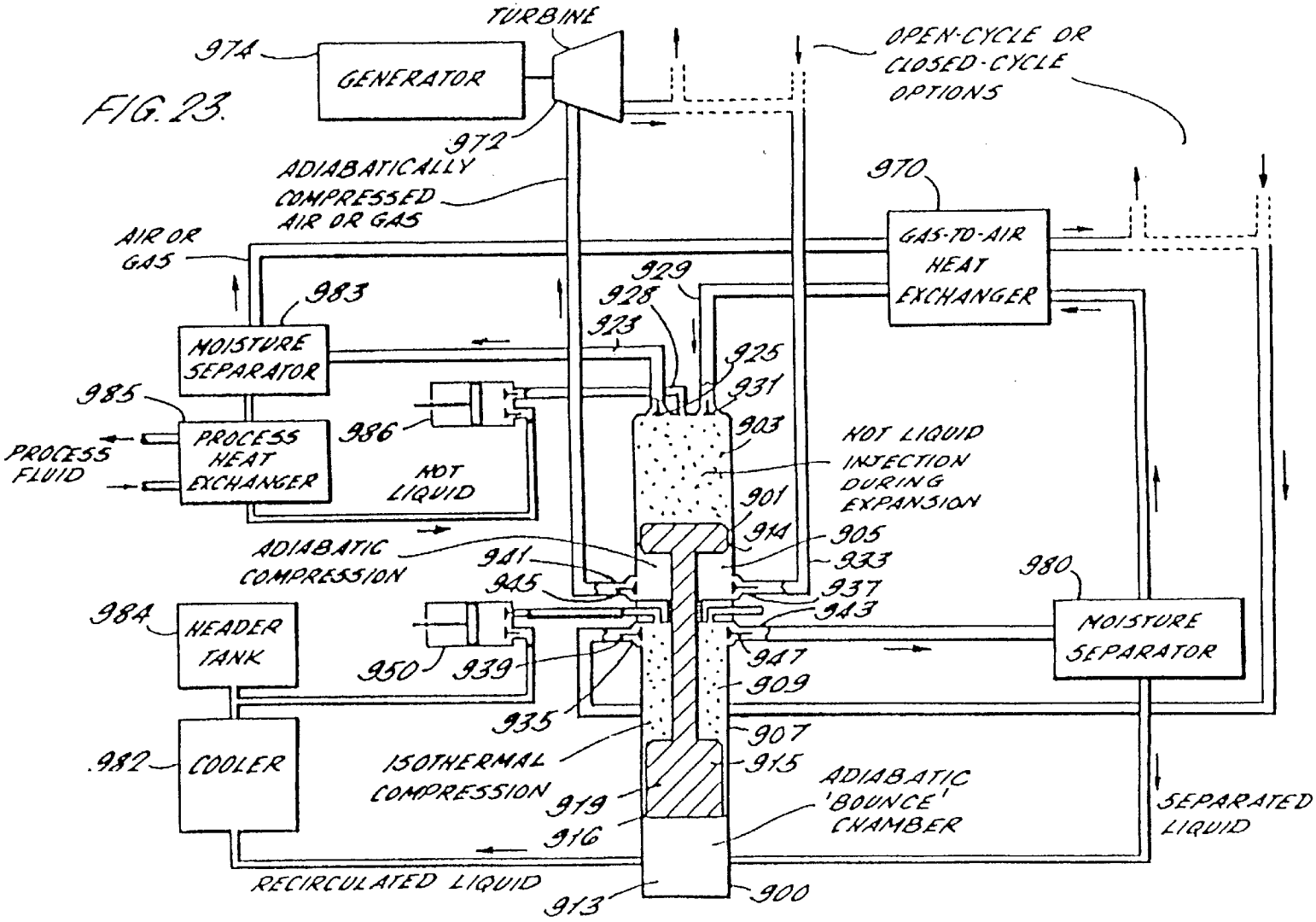
FIG. 23 shows embodiments of closed and open cycle thermally powered compressor in which heat is supplied by injection of hot liquid.

FIG. 23 shows an embodiment of the externally heated compressor in which heat is transferred to liquid rather than gas in the external heat exchanger. The thermally powered compressor indicated at 900 has many similarities to the combustion compressor described above with reference to FIG. 17 and like numerals incremented by 300 refer to like parts. Therefore, the description of those components including the solid piston, the adiabatic and isothermal compression chambers and the lower bounce chamber together with the water recovery system, the air turbine and generator of the combustion compressor apply equally well to the thermally powered compressor shown in FIG. 23. The main differences between the internal combustion compressor and the externally heated compressor concern the function of the upper chamber and the way in which heat is transferred into the upper chamber, and these will now be described.

The upper chamber 903 of the externally heated compressor has a compressed gas inlet port 929 controlled by a valve 931, a exhaust gas outlet port 923 controlled by a valve 925 and a spray liquid injection port 928. The hot compressed gas inlet port 929 is connected to the compressed gas outlet port 943 in the isothermal compression chamber 909 via a moisture separator 980 and a gas-to-gas heat exchanger 970. The exhaust gas outlet port 923 is connected to the gas-to-gas heat exchanger 970 via a second moisture separator 982. The liquid spray injection port situated at the top of the expansion chamber 903 is connected to the spray liquid output of the moisture separator 983 via a process heat exchanger 985 and a second liquid spray injection pump 986.

The manner in which the compressor is driven will now be described beginning with the piston 915 at the top of its stroke in the expansion chamber 903. As the piston comes to rest at its point of maximum elevation, the gas inlet valve 931 opens and preheated compressed gas is introduced into the expansion chamber 903 through the gas inlet port 929. At the same time, hot liquid from the process heat exchanger 984 is injected into the expansion chamber 903 by the spray injection pump 986. The preheated compressed gas is heated further by the liquid spray and expands driving the liquid piston downwards. Heat is transferred from the injected droplets to the gas as the gas continues to expand in order that the gas temperature is maintained throughout the expansion process.

As the piston reaches the bottom of its stroke in the expansion chamber 903 and reverses direction, the exhaust gas outlet valve 925 opens and the low pressure exhaust gas together with the spray liquid is expelled from the expansion chamber through the exhaust gas outlet port 923 and flows through the moisture separator 983 in which the spray liquid is removed. The low pressure exhaust gas then flows through the gas-to-gas heat exchanger 970 in which compressed gas from the isothermal compression chamber 909 is preheated before being introduced into the expansion chamber 903. The spray liquid separated in the moisture separator 983 is returned to the process heat exchanger 985 in which it is re-heated before being re-used in the spray.

In an open-cycle system, in which air is the gas, exhaust air leaving the heat exchanger 970 is expelled to the atmosphere. In a closed-cycle system, the gas leaving the heat exchanger 970 is directed to the isothermal compression chamber 909 for compression. In this way the gas may be continuously recycled in a closed circuit. Furthermore, in an open-cycle system exhaust air from the turbine 972 is expelled, but in a closed-cycle system the gas is directed back to the adiabatic compression chamber 905. In the latter case the gas used to drive the turbine 972 is also continuously recycled. Thus, the externally heated compressor may either operate in an open-cycle or a closed-cycle as indicated by the dotted lines. In FIG. 23 it is seen that the gas which passes through the adiabatic compression chamber and the turbine does not mix with the gas in the remainder of the system. Therefore it is possible to have different gases in these two circuits and indeed one circuit can be open-cycle while the other is closed-cycle.

The use of injected liquid as ,the medium of heat transfer is advantageous in that the external heat exchanger 970 can be more compact and more efficient. Another advantage of using liquid is that the heat can continue to be supplied to the injected gas throughout the expansion, which improves the thermodynamic efficiency. The use of liquid as the heat transfer medium limits the maximum temperature of the heat source to that which can be accommodated by a suitable liquid. Preferably, the liquid to be used will have acceptable physical and conical properties, will be non toxic, enviromentally acceptable and relatively inexpensive.

An externally heated compressor with hot liquid injection may be suitable for power generation with low temperature heat sources such as solar energy, geothermal energy or low temperature waste heat.

In a closed cycle operation case, it may be necessary to provide some additional cooling to the gas after it leaves the turbine in order to maintain a stable temperature.

Advantageously, the thermally powered compressor can operate using a wide range of different fuels including natural gas, light and heavy oils, orimulsion, coal, biomass or domestic waste. Various schemes for using combustible fuels will now be described.

Natural gas and light oils are in a suitable form for direct injection and firing inside the heated combustion chamber. Alternatively, these fuels may be burnt inside a combustion chamber external of but attached to the heated chamber. Conveniently, the fuel may ignite spontaneously depending on the temperature of the inlet air and/or pressure in the chamber; as for example happens in diesel engines. The combustion products contain essentially no particulates and very little sulphur dioxide, although a certain amount of nitrous oxides (NOX) will be present. The emission of NOX can be limited by either catalytic or non-catalytic reduction with ammonia. There are a number of schemes for burning heavy oils, orimulsion or coal.

With reference to the ICCAT system, heavy oils and orimulsion could be atomised into fine droplets by heating, then injected into the expansion chamber at the required intervals, and burned by internal combustion. The droplets may ignite in the high temperature air from the heat exchanger and be rapidly burned. If necessary, an ignition system could be used which for example may involve the injection of another fuel to initiate the combustion process. Coal may also be injected into the combustion chamber in the form of fine dust (pulverised fuel) which is transported to the expansion chamber along a pipe in a flow of air or another suitable transporting medium. It is important to ensure that there is no risk of premature explosion of the coal dust in the transporting fluid. This may or may not lead to the choice of fluid other than air to convey the coal dust.

In another embodiment, the heavy oil, orimulsion or coal could be gasified using air or oxygen in a suitable gasification plant. Liquid fuel i.e. orimulsion or heavy oil is simpler to handle in a gasification process than coal, since there is no requirement for mills to grind the fuel or for a suitable gaseous transport medium.

In another embodiment, an external pressurised furnace burning of heavy oils, orimulsion coal or gasified fuel, could be used to produce hot combustion gases which enter the expansion chamber of the compressor under the control of high temperature valves.

With reference to the EHCAT system, orimulsion, heavy oil or coal could be burnt in a main heater to heat the working fluid for the thermally powered compressor. The main heater may include an unpressurised furnace arranged to burn the fuel in preheated atmospheric air and may further include a heat exchanger through which the working fluid, which may be preheated compressed air from the thermally powered compressor, is passed. The preheated compressed air is heated by heat from the furnace, and then injected as very hot compressed air into the expansion chamber to drive the piston.

If the fuel undergoes some form of gasification, then preferably the sulphur would be removed prior to the combustion stage. Removal of sulphur after gasification but before combustion is advantageous because the gas volumes are very much less. Also, the sulphur is likely to be extracted in its elemental form rather than as gypsum. This means that the mass of product material is also very much less. On the other hand, if the fuel is not gasified, then exhaust gas from the combustion process should undergo desulphurisation before being admitted to the atmosphere.

Where possible, direct combustion of fuel in the combustion chamber of the thermally powered compressor would generally be preferred over the use of an external furnace whether or not the fuel is gasified. The combustion gas produced by gasified fuel is generally cleaner than from direct combustion of a solid or heavy liquid fuel. However, the choice between these two methods will largely depend on relative cost and environmental acceptability.

Biomass and domestic waste may also be used as fuels if prepared in a suitable form. Although generally it is not practical to chop domestic waste or most forms of biomass into particles of sub-millimeter sizes, as is done in the case of pulverised coal, biomass could be burned in a suitably designed internal combustion system if the particles are small enough to achieve a significant degree of burn-up. Alternatively the biomass could be gasified. For example, in one embodiment, biomass could be gasified externally in a fixed bed or possibly in a fluidised bed where gasification could occur as a continuous process. Either oxygen, or air could be used. It would be desirable to maximise the chemical energy of the gasification product and minimise the heat production of the gasification stage. The heat of the gasification could be transferred by a heat exchanger to isothermally compressed air and then expanded to increase the power output of the system. The gas would be combusted in an ICCAT system similar to that used for natural gas.

THERMALLY POWERED GAS COMPRESSOR WITH GASIFICATION

Figure 24:
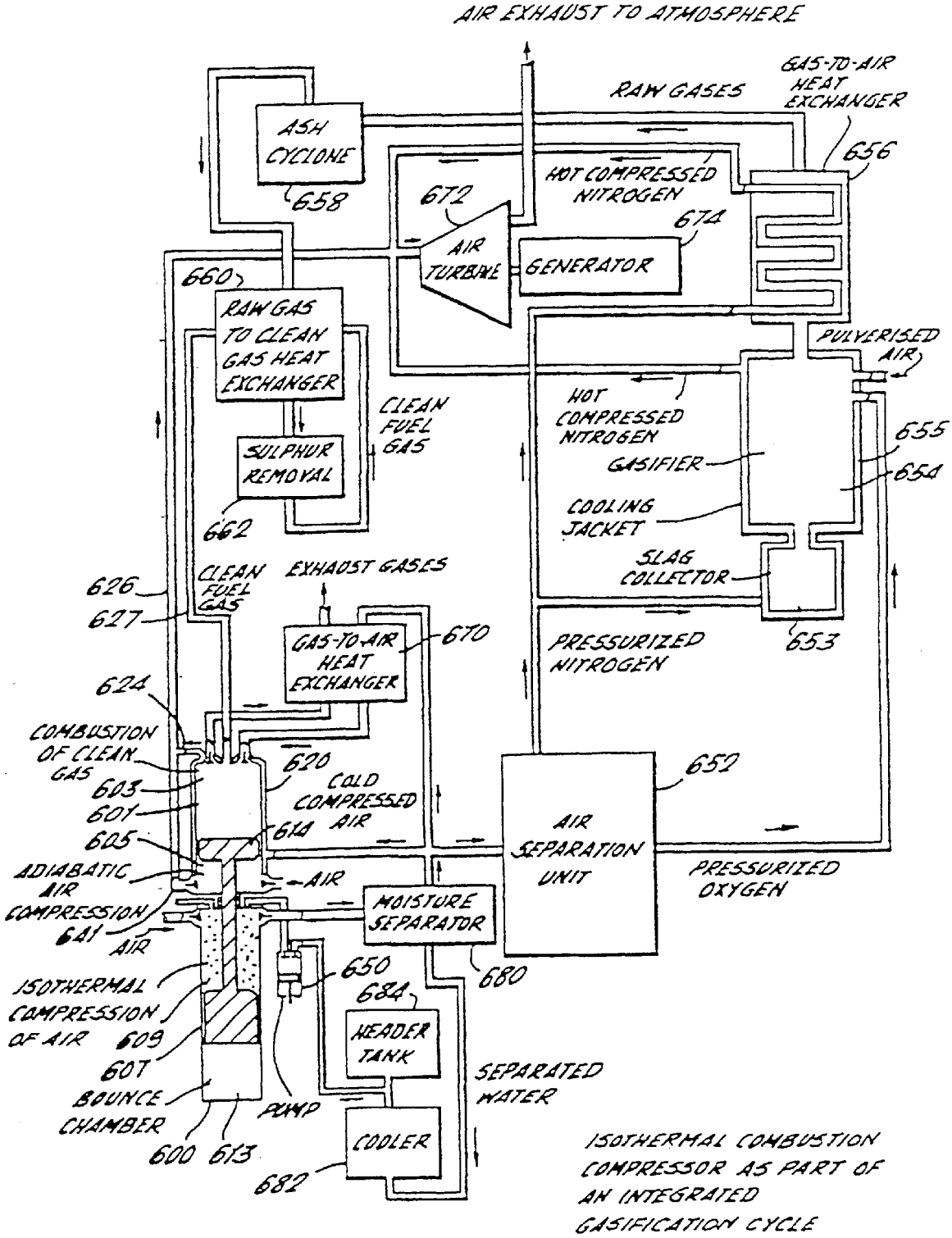
FIG. 24 shows an embodiment of a thermally driven compressor incorporated in a power generation and gasification cycle.

As mentioned above, gasified fuels such as coal, heavy oils, orimulsion or biomass for use in a combustion compressor may be an attractive option. FIG. 24 shows the application of one embodiment of the internal combustion compressor and air turbine to an integrated gasification and power cycle. Referring to FIG. 24, the thermally powered compressor together with spray liquid recovery and cooling system has previously been described with reference to FIGS. 17 and IS and comprises a massive vertically reciprocating solid piston. Like components are designated by like numerals.

The gasification plant includes an air separation unit 652 connected to the output of the moisture separator 680 to receive part of the cool compressed air produced by the combustion compressor 600. The air separation unit produces both pressurized nitrogen and pressurized oxygen. The air separation unit 652 is arranged to supply pressurized oxygen to a gasifier 654 in which the oxygen is used to convert pulverised coal (or other fuel) to a raw fuel gas which contains among other gases, carbon monoxide and hydrogen. A vessel 653 is connected below the gasifier 654 to collect slag produced by the gasification process. A cooling jacket 655 is arranged around both the gasifier 654 and the slag collection vessel 653 to allow cooling fluid to circulate around the walls of the gasifier to enable heat generated by the gasification process to be recovered. In this embodiment, pressurized nitrogen produced in the air separation unit 652 serves as the cooling fluid and the nitrogen output from the air separation unit 652 is connected to a lower part of the cooling jacket 655. A hot compressed nitrogen exit port is provided near the top of the gasifier cooling jacket and is connected directly to the input of the air turbine 672. Thus, heat from the gasifier is recovered in a form in which it can be conveniently converted into useful power.

The raw fuel gas output of the gasifier 654 is connected to a gas-to-air heat exchanger 656 in which the raw gases are cooled by a further supply of pressurized nitrogen from the air separation unit 652. The hot compressed nitrogen leaving the gas-to-air heat exchanger 656 is directed to the air turbine 672 in which it is expanded to produce useful mechanical power. The raw gas output of the gas to air heat exchanger 656 is connected to an ash cyclone 658 in which the raw gases are treated to remove any ash. Treated gas from the ash cyclone 658 is then directed to a sulphur removal unit 662 via a raw-gas-to-clean-gas heat exchanger 660 in which the raw gas is cooled prior to its introduction into the sulphur removal unit 662, with clean fuel gas leaving the sulphur removal unit. The clean fuel gas leaving the raw-gas-to-clean-gas heat exchanger 660 is then directed to the combustion chamber of the combustion compressor 600 via the fuel injection port 627 for combustion in the combustion chamber 603. Part of the isothermally compressed air produced in the combustion compressor may be used to supplement the pressurized nitrogen for recovering heat from the gasification process, if necessary.

This gasification scheme is expected to deliver significantly higher efficiences than current designs as a result of the following factors. Because the pressurized air required for the air separation unit, for combustion and for cooling is compressed isothermally, less compression work is required. The heat of gasification is recovered is such a way that it is used at a higher temperature than is usually possible in current designs for integrated gasification power plants. Furthermore, the use of the gasified fuel in an ICCAT combustion chamber increases the efficiency of conversion of clean fuel gas to electrical power.

In an alternative embodiment, the gasification cycle can be implemented without air separation, by using isothermally compressed air in the gasification process and for the removal of heat in the heat exchanger 656 downstream of the gasifier 654. However, the conversion of fuel to fuel gas is less effective if air is used, and it would be essential to preheat the isothermally compressed air prior to its introduction into the gasifier.

The main advantage of using oxygen in the gasification cycle is that a higher temperature of gasification makes it possible to achieve a more complete conversion of the carbon in the fuel to carbon monoxide. The higher temperatures of gasification may also permit a more efficient conversion of heat to mechanical and electrical energy through the heat recovery process from the gasifier to the air turbine. In another embodiment it may be advantageous to use oxygen in the combustion process rather than air. This would limit the amount of NOX formation to that which is caused by the nitrogen in the fuel. For combustion products of coal burnt in air, the dew point for condensation of water is about 38° C. which provides very little possibility of condensing this water and recovering any of the latent heat. In the case of coal burnt in oxygen, the dew point is about 67° C. and there is an opportunity to use the latent heat to preheat some of the compressed nitrogen from the air separation unit, for example, in the air turbine. Furthermore, for the case of coal burnt in oxygen, with contaminants such as sulphur removed and the water condensed, the combustion products consist almost entirely of carbon dioxide. If it is considered necessary to recover the carbon dioxide for enviromental reasons, then the gas is in a suitable form.

Gasification of fuel may also be implemented in the isothermal compressor and gas turbine cycle. FIG. 25 shows an embodiment of a gas driven isothermal compressor in an integrated gasification and power plant. The particular embodiment of the isothermal compressor has been previously described with reference to FIG. 5 and like numerals incremented by 800 refer to like parts. In particular, the isothermal compressor comprises an upper chamber 809 disposed vertically above a lower chamber 811 and a massive solid piston which is free to oscillate vertically into and out of each chamber. The upper chamber has a hot compressed air inlet port 821 controlled by a valve 825; a compressed air outlet port 813 controlled by a valve 817, and a spray injection port 837. The lower chamber contains a sealed volume of gas which provides the means for converting the kinetic energy of the piston in the downward direction to kinetic energy in the upwward direction. The water recovery and cooling system is identical to that described above in relation to FIG. 5 and comprises a moisture separator 847 connected to the compressed gas outlet port a cooler 845 connected to the moisture separator via a return line 853 and an injection pump 834 connected between the cooler 845 and the spray injection port 837. The compressed gas inlet port 821 in the isothermal compression chamber 809 is connected to the output of a rotary compressor 861 which supplies hot compressed air to drive the isothermal compressor 801.

Cool compressed air produced in the isothermal compressor is drawn from the compressed air outlet port 813 via the moisture separator 847 and is directed essentially three ways. Part of the cool compressed air is used for gasification and is initially directed to an air separation unit 869 in which the compressed air is separated into pressurized nitrogen and oxygen. Part of the cool compressed air is directed to a combustion chamber 857 in which it is burnt to provide hot high pressure gas to drive a gas turbine 859. The gas turbine is arranged to drive a main generator 863. Before being introduced into the combustion chamber 857, the cool compressed air from the isothermal compressor is preheated in a gas-to-air heater 855 with exhaust gas from the gas turbine.

Generally, there will be more heat available in the exhaust gas from the gas turbine than is required to preheat the cool compressed air for combustion in the combustion chamber 857. Therefore, a further part of the cool compressed air from the isothermal compressor is preheated in the gas-to-air heater 855 to recover this excess heat, and this preheated compressed air is directed to an air turbine 865 in which it is expanded to drive a second generator 867.

The gasification plant is similar to that described above in relation to the embodiment shown in FIG. 24 and comprises an air separation unit 869 connected to the output of the moisture separator 847. Pressurized oxygen produced in the air separation unit 869 is directed to a gasifier 871 in which pulverised coal or other fuel is gasified. A vessel 873 is connected below the gasifier to collect slag from the gasification process. Both the gasifier 871 and the slag collection vessel 873 are surrounded by a cooling jacket 872. The gasifier has a gasified fuel outlet port which is connected to a gas-to-air heat exchanger 875. Pressurized nitrogen from the air separation unit 869 is directed to both the cooling jacket surrounding the gasifier 873 for cooling the walls of the gasifier and recovering excess heat, and is also passed through the gas-to-air heat exchanger 875 to cool the raw fuel gas from the gasifier. Heat compressed nitrogen from both the cooling jacket and the heat exchanger are directed to the input of the air turbine 865 in which it is expanded along with hot compressed air from the gas-to-air heater 855. The cool raw gas outlet side of the gas-to-air heat exchanger 875 is connected to the combustion chamber 857 via a fuel gas clean up system comprising an ash cyclone 877, a raw-gas-to-clean-gas heat exchanger 879 and a sulphur removal unit 881. Raw gas from the gas-to-air heat exchanger 875 is passed to the ash cyclone 877 to remove any ash from the raw gases. The fuel gas is then passed to the sulphur removal unit 881 via the raw-gas-to-clean-gas heat exchanger 879 in which the fuel gas is cooled by clean fuel gas having the sulphur removal unit. This clean fuel gas after passing through the raw-gas-to-clean-gas heat exchanger 879 is fed directly to the combustion chamber 857 in which it is combusted with preheated compressed air from the gas-to-air heat exchanger 855.

The ISOGT integrated gasification cycle may be preferred to the ICCAT integrated gasification cycle if the costs are lower. The air turbine 865 and its associated generator 867 implemented in the ISOGT gasification cycle will produce a large fraction of the total power, since the heat of gasification is recovered in the air turbine. As with the ICCAT integrated gasification cycle, the air separation unit may also be omitted in the ISOGT integrated gasification cycle.

METHOD OF ENERGY STORAGE AND RECOVERY USING THERMALLY POWERED COMPRESSOR

As described above in connection with the gas driven and liquid driven isothermal compressors, it may also be advantageous to include provision for energy storage in the power generating plant incorporating a thermally driven compressor. During periods of low demand for power, a large fraction of the isothermally compressed gas (which may or may not be air) could be stored in a large cavity such as a disused mine or oil well. When the power demand is high, cool compressed gas is then released from the cavity to supplement that produced by the compressor. An alternative method of energy storage is to refrigerate and freeze water during periods when the external power demand is low and then to use this store of "cold" to increase the power output when demand is high.

Figure 26:
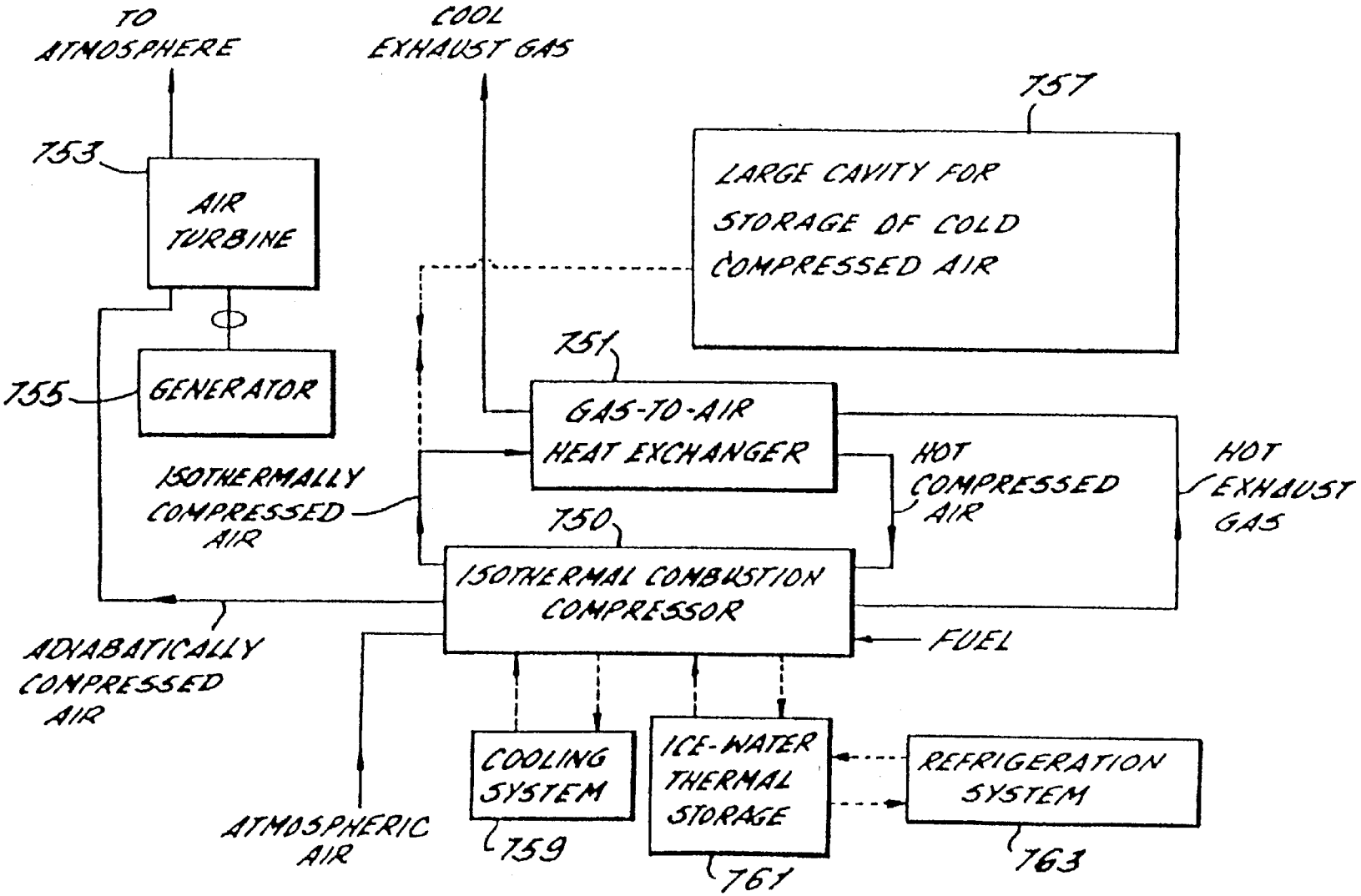
FIG. 26 shows an embodiment of a thermally powered compressor including two alternative arrangements for energy storage.

FIG. 26 shows one embodiment of a combined power generation and energy storage plant which includes the facility to store energy either in the form of compressed gas or in the form of ice. In this embodiment, the compressed gas is air and the compressor is an internal combustion compressor.

The combustion compressor 750 produces cool compressed air, at least some of which is fed to a gas-to-air heat exchanger 751 in which it is preheated with hot exhaust gas from the compressor before being injected into the combustion chamber. Power is extracted from the compressor by compressing atmospheric air adiabatically and expanding the compressed air through an air turbine 753 which drives the power generator 755. The combustion compressor 750 includes means to control the relative proportions of gas which are compressed adiabatically and isothermally. If the combustion compressor has the form described above with reference to FIGS. 17 or 18, the amount of air compressed adiabatically can be controlled simply by adjusting the timing of the adiabatic air outlet valve. If this is closed early, then less air goes to the air turbine and a greater fraction of the available energy can be used for isothermal compression. To increase the air flow to the air turbine the reverse adjustment to the adiabatic outlet valve can be made. To maintain the same piston stroke, it will be necessary to reduce the mass of gas in the bounce chamber, and this may be achieved relatively easily, for example by including a valve in the bounce chamber controlled to release or admit gas from or into the chamber.

During periods of low demand, a larger proportion of isothermally compressed air is produced than is needed to drive the combustion compressor, and the excess cold compressed air is directed to a large cavity 757 in which it is stored. Then, during periods of high demand, most of the power available in the combustion compressor 750 is used to compress air adiabatically for driving the air turbine 753. The isothermally compressed air required for combustion is provided by both the combustion compressor and the large cavity 757.

The power generating and energy storage plant also includes an ice/water storage tank 761 and a refrigeration system 763 which cools or freezes the stored water. As described above, heat transferred to spray liquid during isothermal compression is normally extracted from the compressor by a cooling system 759. In periods of low demand, the refrigeration system 763 cools the water in the thermal storage tank 761 preferably to temperatures below the freezing point of water so that ice is formed. When the power demand is high, the refrigeration system may be turned off to maximise the net power output and the cooling of the liquid spray is provided partly by the external cooling system 759 and partly by melting the stored ice. Maximum demand would normally be during the day and if the ambient temperatures are high the ice could be melted to provide cool water for isothermal compression. The external plant cooling system, 759, which would have to reject heat to a high ambient temperature may not be used or may be used at reduced capacity during this time. An attraction of this system is that the ice store can be built up at night when the power demand is low and the ambient temperature is also low in this case the compressor may be run at full capacity, the excess power being used to freeze water to produce ice. This gives a dual advantage, since not only is energy stored for release at a time of maximum demand but also the overall thermal efficiency of the system is improved by the reduction in the temperature of the cold spray at the time of maximum demand.

The dotted lines in FIG. 26 indicate that the particular component in the energy storage or cooling plant may only be used part of the time. The compressed air storage method and the ice-water storage method are independent of each other. The plant may incorporate either storage system or both.

Features which have been described in relation to specific embodiments may be included in other embodiments. Furthermore, the principles of the various operating cycles including the various methods of driving the gas compressor which have been described in relation to specific embodiments may be applied to other embodiments. Modifications to the embodiments described and to their operating cycles will be apparent to those skilled in the art.

I claim:

1. A gas compressor comprising:

a compression chamber to contain gas to be compressed;

a first piston to compress the gas by movement of the first piston into said compression chamber;

a sprayer to form a spray of liquid in said compression chamber to cool the gas during compression;

a first valve to allow compressed gas to be drawn from said compression chamber;

an expansion chamber;

a second piston arranged to drive said first piston;

a feeder to feed compressed gas from said compression chamber to said expansion chamber;

a second valve to allow expanded gas to be drawn from said expansion chamber;

a heat exchanger arranged to pre-heat the compressed gas from said compression chamber with expanded gas from said expansion chamber;

a heater to add heat to the pre-heated compressed gas from said heat exchanger for expansion in said expansion chamber;

a turbine; and a feeder to feed pre-heated compressed gas from said heat exchanger directly to said turbine for expansion therein.

2. A gas compressor as claimed in claim 1, wherein said first and second pistons are coupled together to form a unitary body.

3. A gas compressor as claimed in claim 1, wherein said heater comprises means to provide a combustible fuel in said expansion chamber for mixing with the pre-heated compressed gas, whereby combustion and expansion thereof drives said second piston.

4. A gas compressor as claimed in claim 1, wherein said heater comprises means to form a spray of hot non-volatile liquid droplets to heat the gas by conduction of heat from said droplets to said gas.

5. A gas compressor as claimed in claim 1, wherein said heater comprises means to admit a gas producing medium into said expansion chamber for gasification by reaction of said medium with the pre-heated compressed gas.

6. A gas compressor as claimed in claim 1, wherein said heater comprises an external heat exchanger arranged to heat the pre-heated compressed gas from said heat exchanger with heat from an external process and means to feed the hot compressed gas from said external heat exchanger to said expansion chamber.

7. An apparatus for recovering heat from a heat source, the apparatus comprising:

an isothermal gas compressor for producing cold compressed gas;

*a sprayer to form a spray of liquid in a compression chamber of said isothermal gas compressor to cool the gas during compression;*

*a separator to separate the liquid from the compressed gas;* a heat exchanger arranged to heat said cold compressed gas *from which the liquid has been separated by the separator* with heat from said heat source;

a turbine; and means for feeding heated compressed gas from said heat exchanger directly to said turbine for expansion therein.

8. A method of recovering heat from a heat source, the method comprising[;]*:* compressing gas isothermally to produce cold compressed gas;

*spraying liquid into the compression chamber to cool the gas during compression;*

*feeding the cold compressed gas and liquid to a separator to remove the liquid from the compressed gas;* feeding the cold compressed gas *from which the liquid has been separated by the separator* to a heat exchanger;

absorbing, in the heat exchanger, heat from said heat source into said cold compressed gas;

feeding the heated compressed gas directly into a turbine; and expanding the heated compressed gas in the turbine.

* * * * *